(12) United States Patent
Sato

(10) Patent No.: US 8,515,991 B2
(45) Date of Patent: Aug. 20, 2013

(54) CONTENT PRESENTING DEVICE, CONTENT PRESENTING METHOD, AND CONTENT PRESENTING PROGRAM

(75) Inventor: Hideki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 722 days.

(21) Appl. No.: 11/587,186

(22) PCT Filed: May 19, 2005

(86) PCT No.: PCT/JP2005/009590
§ 371 (c)(1),
(2), (4) Date: Oct. 23, 2006

(87) PCT Pub. No.: WO2005/111995
PCT Pub. Date: Nov. 24, 2005

(65) Prior Publication Data
US 2007/0220430 A1 Sep. 20, 2007

(30) Foreign Application Priority Data
May 19, 2004 (JP) .................................. 2004-149500

(51) Int. Cl.
*G06F 17/30* (2006.01)

(52) U.S. Cl.
USPC ............................. 707/770; 707/916; 709/203

(58) Field of Classification Search
USPC ................. 369/30.06; 707/770, 916
See application file for complete search history.

(56) References Cited

U.S. PATENT DOCUMENTS

| 5,751,672 | A  | * | 5/1998  | Yankowski     | 709/238   |
|-----------|----|---|---------|---------------|-----------|
| 6,307,139 | B1 | * | 10/2001 | Iwamura       | 84/601    |
| 6,563,769 | B1 | * | 5/2003  | Van Der Meulen| 369/30.06 |
| 6,804,666 | B2 | * | 10/2004 | Morita et al. | 1/1       |
| 7,346,613 | B2 | * | 3/2008  | Hurst-Hiller et al. | 707/711 |
| 7,797,242 | B2 | * | 9/2010  | Gautier et al.| 705/52    |
| 7,801,943 | B2 | * | 9/2010  | Jystad et al. | 709/202   |
| 2002/0010740 | A1 | * | 1/2002 | Kikuchi et al. | 709/203 |
| 2003/0037124 | A1 | * | 2/2003 | Yamaura et al. | 709/219 |

(Continued)

FOREIGN PATENT DOCUMENTS

| JP | 2001 343990  | 12/2001 |
|----|--------------|---------|
| JP | 2001-343990  | 12/2001 |

(Continued)

OTHER PUBLICATIONS

Western Digital External Hard Drives, 2003, pp. 1-2.*

*Primary Examiner* — Albert Phillips, III
(74) *Attorney, Agent, or Firm* — Oblon, Spivak, McClelland, Maier & Neustadt, L.L.P.

(57) ABSTRACT

A processing unit retrieves a content name of a first content data stored in an internal storage medium, in response to a transmission of a retrieval key, and a content name of a second content data stored in an external storage medium, in response to a transmission of the retrieval key. A network interface receives a content name of a third content data and content identification information of a third content data over a network, in response to a transmission of the retrieval key over the network. The network interface receives a content name of a fourth content data over the network in response to a transmission of the retrieval key and the content identification information of the third content data over the network. The processing unit generates a content presentation image including the content names of the first, second, third, and fourth content data.

9 Claims, 26 Drawing Sheets

(56) References Cited

U.S. PATENT DOCUMENTS

| | | | |
|---|---|---|---|
| 2003/0055914 A1* | 3/2003 | Tanaka | 709/218 |
| 2003/0069929 A1* | 4/2003 | Millikan et al. | 709/203 |
| 2004/0003706 A1* | 1/2004 | Tagawa et al. | 84/609 |
| 2004/0093325 A1* | 5/2004 | Banerjee et al. | 707/3 |
| 2004/0123725 A1* | 7/2004 | Kim | 84/609 |
| 2006/0173825 A1* | 8/2006 | Hess et al. | 707/3 |
| 2006/0221932 A1* | 10/2006 | Iwatsu et al. | 370/352 |

FOREIGN PATENT DOCUMENTS

| | | |
|---|---|---|
| JP | 2002-57966 | 2/2002 |
| JP | 2003-15665 | 1/2003 |
| JP | 2003 15665 | 1/2003 |
| JP | 2003 167918 | 6/2003 |
| JP | 2003-167918 | 6/2003 |

* cited by examiner

CONTENT PRESENTING DEVICE, CONTENT PRESENTING METHOD, AND CONTENT PRESENTING PROGRAM

TECHNICAL FIELD

The present invention relates to a content presentation apparatus, content presentation method and content presentation program, and is preferably applied to a case in which music data is played on a client terminal capable of receiving various services about music provided on a network, for example.

BACKGROUND ART

A conventional recording and playback device with a radio reception section, a CD (Compact Disc) playback section, a MD (Mini Disc®) playback section and a cassette tape recorder includes various function buttons, which also work as playback buttons for CDs, MDs and cassette tapes, to show that the operation of the CD player section, MD player section and a tape recording and playback section are selected.

When the function buttons are selected and pushed arbitrarily, the recording and playback device with the radio reception section, the CD playback section, the MD playback section and the cassette tape recorder activates, in response to the function button pushed, the CD playback section, the MD playback section or the tape recording and playback section to play music data on a CD, MD or cassette tape (see Patent Document 1, for example).

Patent Document 1: Japanese Patent Publication No. 2001-250369 (Pages 3, and FIGS. 1 and 8)

DISCLOSURE OF THE INVENTION

However, the above recording and playback device with the radio reception section, the CD playback section, the MD playback section and the cassette tape recorder utilizes various storage media such as CD, MD and cassette tape.

Accordingly, to allow a user to select his/her desired music data, he/she has to check what kinds of music data are stored in those storage media (CD, MD and cassette tape), before the recording and playback device with the radio reception section, the CD playback section, the MD playback section and the cassette tape recorder starts to play music data.

The present invention has been made in view of the above points and is intended to provide a content presentation apparatus, content presentation method and content presentation program by which desired content data can be selected easily.

To solve the above problem, a content presentation apparatus according to an embodiment of the present invention transmits the same retrieval key which presentation image generation means uses to retrieve content data in desired types to both database registration readout control means, which controls registration and readout to a database installed in an internal storage medium storing one or a plurality of content data, and external storage medium reproduction control means, which controls reproduction to an external storage medium storing one or a plurality of content data; and the database registration readout control means detects, based on the retrieval key, a content name of content data corresponding to the retrieval key from the internal storage medium; and the database registration readout control means notifies the presentation image generation means of the detected content name; and, in the same way, the external storage medium reproduction control means detects, based on the retrieval key, a content name of content data corresponding to the retrieval key from the external storage medium; and the external storage medium reproduction control means notifies the presentation image generation means of the detected content name; and then the presentation image generation means generates a content presentation image including a list of the content name of the content data corresponding to the retrieval key notified by the database registration readout control means and the external storage medium reproduction control means.

Accordingly, the content presentation apparatus can easily present a content name of content data (which is stored in the internal storage medium and the external storage medium) in desired types through the content presentation image, without forcing a user to perform troublesome operation such as checking content data stored in the internal storage medium and the external storage medium.

According to the present invention, the content presentation apparatus according to an embodiment of the present invention transmits the same retrieval key which presentation image generation means uses to retrieve content data in desired types to both the database registration readout control means, which controls registration and readout to the database installed in the internal storage medium storing one or a plurality of content data, and the external storage medium reproduction control means, which controls reproduction to the external storage medium storing one or a plurality of content data; and the database registration readout control means detects, based on the retrieval key, a content name of content data corresponding to the retrieval key from the internal storage medium; and the database registration readout control means notifies the presentation image generation means of the detected content name; and, in the same way, the external storage medium reproduction control means detects, based on the retrieval key, a content name of content data corresponding to the retrieval key from the external storage medium; and the external storage medium reproduction control means notifies the presentation image generation means of the detected content name; and then the presentation image generation means generates the content presentation image including the list of the content name of the content data corresponding to the retrieval key notified by the database registration readout control means and the external storage medium reproduction control means. Accordingly, the content presentation apparatus can easily present a content name of content data (which is stored in the internal storage medium and the external storage medium) in desired types through the content presentation image, without forcing a user to perform troublesome operation such as checking content data stored in the internal storage medium and the external storage medium. Thus, the content presentation apparatus, content presentation method and content presentation program according to an embodiment of the present invention allows a user to select his/her desired content data easily.

BEST MODE FOR CARRYING OUT THE INVENTION

An embodiment of the present invention will be described in detail with reference to the accompanying drawings.

Figure 1:
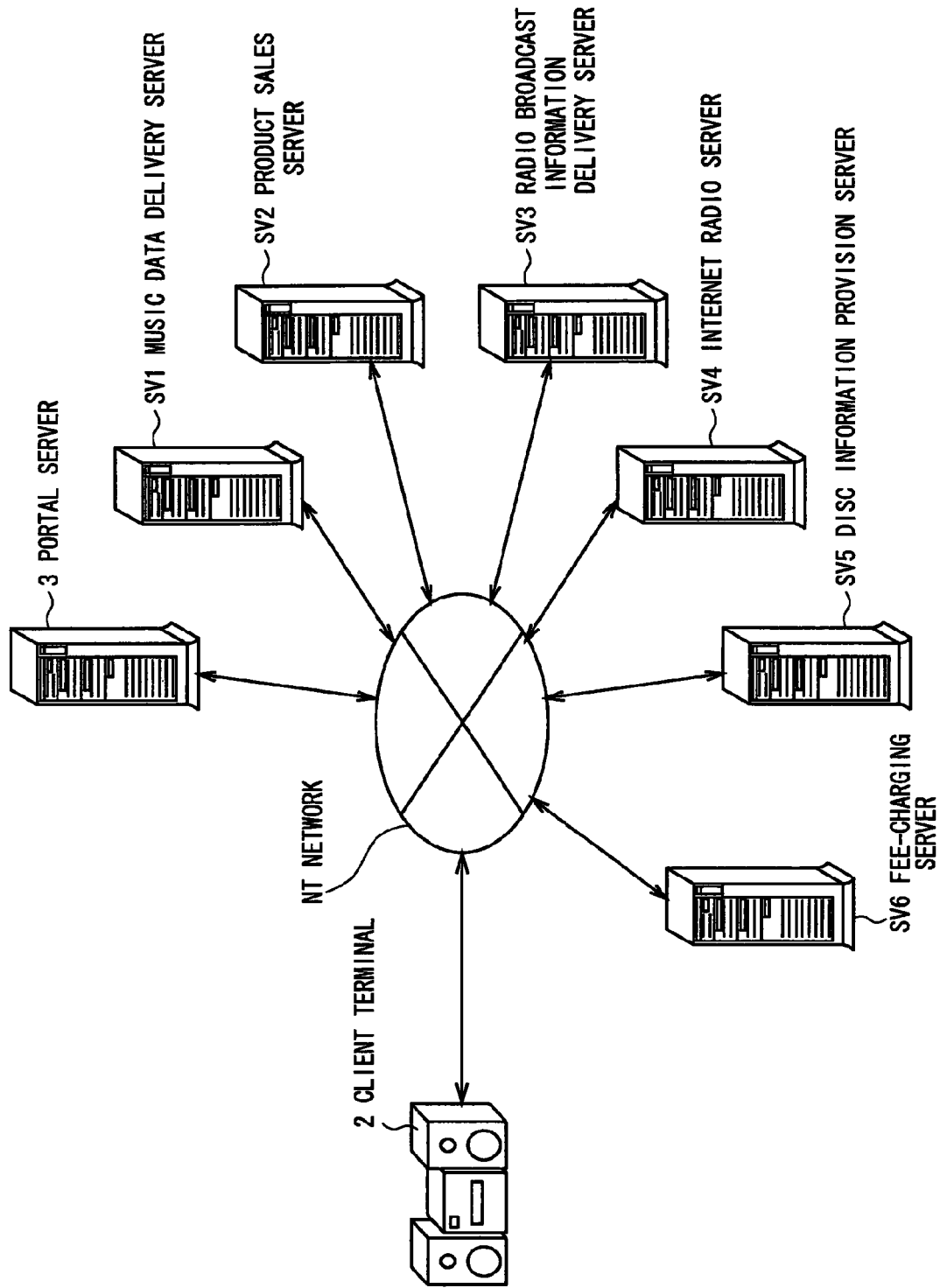
FIG. 1 is a schematic diagram showing the overall configuration of a music related service provision system in accordance with a first embodiment of the present invention.

[1] First Embodiment (1) Music Related Service Provision System
(1-1) Configuration of the System Referring to FIG. 1, the reference numeral 1 represents a music related service provision system as a whole. The music related service provision system 1 includes a client terminal 2 whose user has contracted with a company operating the music related service provision system 1; a portal server 3, which controls the client terminal 2; and a plurality of servers SV1 through SV6, which provides the client terminal 2 with various services related to music.

In this embodiment, the music data delivery server SV1 provides a music data distribution service of distributing music data to the client terminal 2. The music data has been converted into a format such as ATRAC3 (Adaptive Transform Acoustic Coding 3), AAC (Advanced Audio Coding), WMA (Windows® Media Audio), Real-AUDIO G2 Music Codec, MP3 (MPEG Audio Layer-3), and the like.

A product sales server SV2 provides a sales service of selling CDs (Compact Discs), DVDs (Digital Versatile Discs), and the like to users through the client terminal 2.

A radio broadcast information delivery server SV3 provides a radio broadcast information distribution service of distributing to the client terminal 2 radio broadcast information related to music and radio programs broadcast by radio stations.

An Internet radio server SV4 provides an Internet radio broadcast service. In the Internet radio broadcast services, the Internet radio server SV4 supplies radio broadcast data in streaming format to the client terminal 2 via a network NT. In this case, the network NT is equivalent to the Internet.

Furthermore, a disc information provision server SV5 provides a disc information provision service. In this case, disc information related to CDs was previously registered in a CD database. The disc information to be used to identify each piece of music includes names of music, their playing times, artist names, album names, and the like, as music data stored in the CD. In the disc information provision service, the disc information provision server SV5 provides the client terminal 2 with the disc information.

A fee-charging server SV6 performs a fee-charging process to charge users various fees in response to requests from the portal server 3 and the like.

(1-2) Configuration of Client Terminal 2
(1-2-1) Functional Circuit Block Configuration of Client Terminal 2

Figure 2:
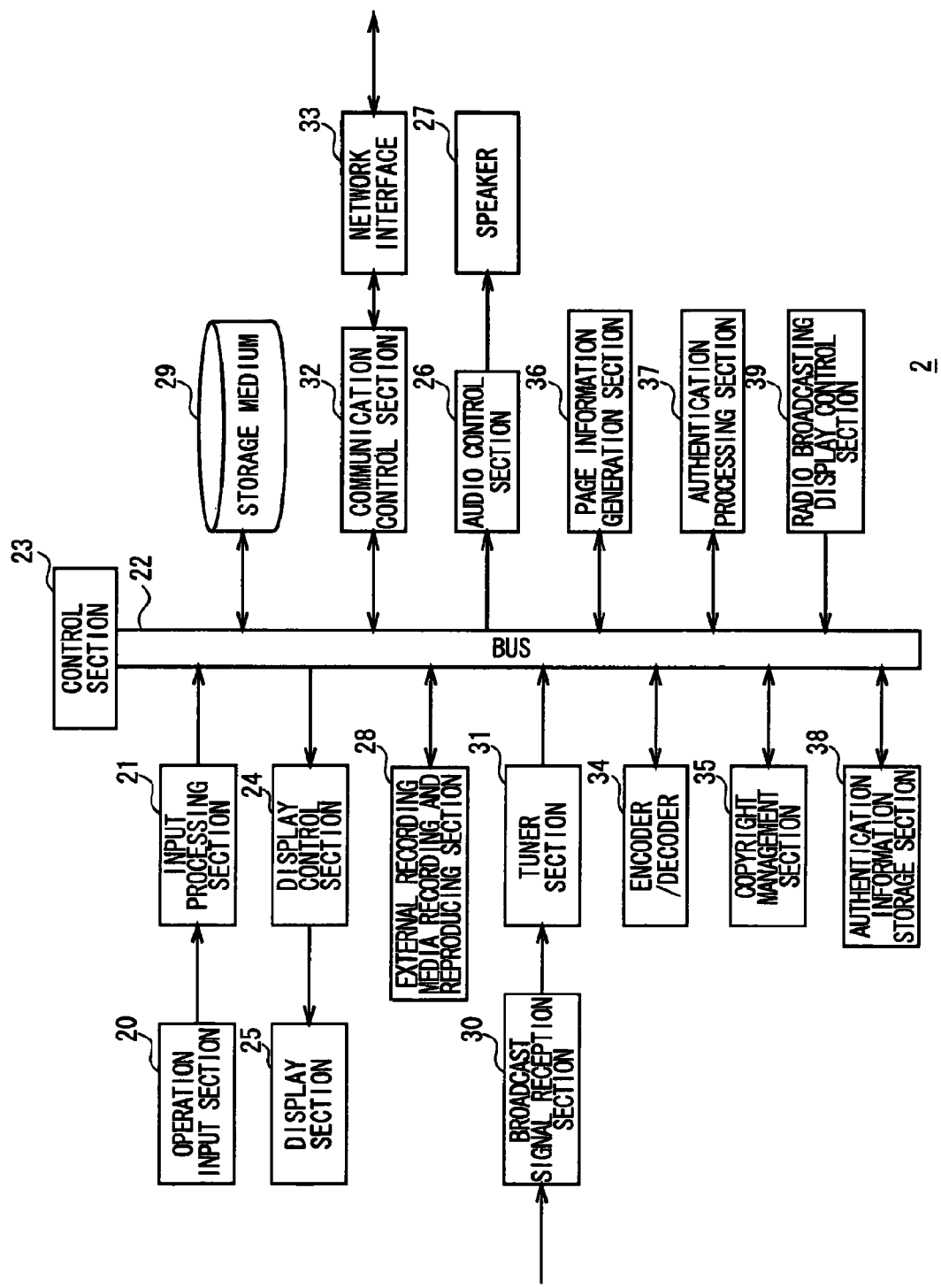
FIG. 2 is a block diagram showing the hardware configuration of a client terminal using functional circuit blocks.

The following describes the hardware configuration of the client terminal 2 using functional circuit blocks. As shown in FIG. 2, the client terminal 2 has an operation input section 20 including various kinds of buttons. The operation input section 20 is disposed on a housing of the client terminal 2 or remote control (not shown). If a user operates the operation input section 20, the operation input section 20 detects the operation, and then supplies an operation input signal corresponding to the operation to an input processing section 21.

The input processing section 21 transforms the operation input signal from the operation input section 20 into a specific operation command, and then transmits the operation command to a control section 23 through a bus 22.

The control section 23 has been connected to each circuit via the bus 22. The control section 23 controls operation of each circuit based on the operation command and a control signal supplied from the circuits.

A display control section 24 receives video data through the bus 22, and then performs digital-to-analog conversion to the video data to generate an analog video signal. The display control section 24 subsequently supplies the analog video signal to a display section 25.

The display section 25, which is for example a display device such as a liquid crystal display, may be disposed on the housing directly or externally.

The display section 25 receives the analog video signal from the display control section 24, and then displays an image based on the analog video signal. The analog video signal includes a result of processing by the control section 23 or various video data.

An audio control section 26 receives audio data via the bus 22, and then performs digital-to-analog conversion to the audio data to generate an analog audio signal. The audio control section 26 then transmits the analog audio signal to a speaker 27 which then outputs audio based on the analog audio signal supplied from the audio control section 26.

External storage media such as CDs and "MEMORY STICK (Registered Trademark of Sony Corporation)" for example store content data. The "MEMORY STICK (Registered Trademark of Sony Corporation)" includes a flash memory covered with an exterior case. An external recording media recording and reproducing section 28 reads content data from external storage media, and then plays back them. Alternatively, the external recording media recording and reproducing section 28 records content data, which is to be recorded, on external storage media.

When the external recording media recording and reproducing section 28 acquires content data such as video data from an external storage medium, the external recording media recording and reproducing section 28 then transmits the video data to the display control section 24 through the bus 22.

The display control section 24 transforms the video data, which are read out from the external storage medium as content data by the external recording media recording and reproducing section 28, into an analog video signal, and then transmits the analog video signal to the display section 25.

When the external recording media recording and reproducing section 28 acquires content data such as audio data from an external storage medium, the external recording media recording and reproducing section 28 then transmits the audio data to the audio control section 26 via the bus 22.

The audio control section 26 transforms the audio data, which are read from the external storage medium as content data by the external recording media recording and reproducing section 28, into an analog audio signal, and then transmits the analog audio signal to the speaker 27.

The control section 23 supplies the content data read from external storage media by the external recording media recording and reproducing section 28 through the bus 22 to a storage medium 29 in the client terminal 2 to store the content data in the storage medium 29 (storing content data in the storage medium 29 as described above is referred to as ripping).

When the control section 23 acquires content data such as video data from the storage medium 29, the control section 23 then supplies the video data to the display control section 24 through the bus 22. The video data are for example equivalent to image data.

When the control section 23 acquires content data such as audio data from the storage medium 29, the control section 23 then supplies the audio data to the audio control section 26 via the bus 22.

The control section 23 also reads music data from the storage medium 29, and then supplies the music data to the external recording media recording and reproducing section 28 to records the music data on the external storage media.

A broadcast signal reception section 30 receives radio waves from each broadcast station, and then transmits the radio waves to a tuner section 31.

In a case in which a user operates the operation input section 20 to specify a certain radio station, the tuner section 31 under the control of the control section 23 extracts a radio broadcast signal of frequency corresponding to the station specified from the radio waves received by the broadcast signal reception section 30. The tuner section 31 then performs a prescribed reception process to generate audio data, and then supplies the audio data to the audio control section 26 via the bus 22.

The audio control section 26 receives the audio data from the tuner section 31, and then transforms the audio data into an analog audio signal. The audio control section 26 subsequently transmits the analog audio signal to the speaker 27 which then outputs audio of a radio program broadcast from a radio station. Thus, a user can listen to audio of a radio program.

The control section 23 supplies the audio data from the tuner section 31 to the storage medium 29 which then stores the audio data. In this manner, the control section 23 can record audio of a radio program.

The control section 23 also connects to the network NT through a communication control section 32 and a network interface 33. The control section 23 therefore can access the portal server 3 and other servers SV1 through SV5 on the network NT. The control section 23 interchanges various information and data with the portal server 3 and other servers SV1 through SV5.

An encoder/decoder section 34 decodes compressed-coded content data, and then transmits the compressed-coded content data to the display control section 24 or the audio control section 26. The compressed-coded content data is for example obtained from the network NT through the network interface 33 and the communication control section 32. Alternatively, the compressed-coded content data is for example obtained from the storage medium 29 or external storage media.

The encoder/decoder section 34 performs a compression encoding process to generate compressed-coded content data, and then supplies the compressed-coded content data to the storage medium 29. In this case, the content data from external storage media, which is neither compressed nor encoded, the audio data from the tuner section 31, and the like are compressed and encoded by the encoder/decoder section 34.

Accordingly, the content data compressed and encoded by the encoder/decoder section 34 is stored in the storage medium 29 under the control of the control section 23.

The copyright management section 35 generates copyright management information about the content data downloaded from the network NT through the network interface 33 and the communication control section 32. The copyright management section 35 also generates copyright management information about the content data read from external storage media by the external recording media recording and reproducing section 28.

The copyright management information generated by the copyright management section 35 is associated with corresponding content data, and then stored in the storage medium 29 under the control of the control section 23.

The copyright management section 35 properly updates copyright management information associated with content data, when a check-out process of content data between the storage medium 29 and a specific external storage medium is performed, or when a check-in process of content data between the storage medium 29 and a specific external storage medium is performed. In this manner, the copyright management section 35 protects copyright of the content data.

A page information generation section 36 interprets page information, which includes XML (eXtensible Markup Language) files or HTML (Hyper Text Markup Language) files obtained from the network NT via the network interface 33 and the communication control section 32, to generate the video data to be displayed on the display section 25. The page information generation section 36 then supplies the video data to the display control section 24.

An authentication processing section 37 connects to the portal server 3 and other servers SV1 through SV4 on the network NT through the network interface 33. The authentication processing section 37 performs an authentication process such as transmitting authentication information to the portal server 3 and other servers SV1 through SV4 through the communication control section 32 and the network interface 33.

An authentication information storage section 38 stores the authentication information the authentication processing section 37 uses to access the portal server 3 and other servers SV1 through SV4.

A radio broadcasting display control section 39 currently receiving a radio program which a user listens to transmits a request signal, which requests radio broadcast information about the radio program, to the radio broadcast information delivery server SV3, which corresponds to a radio station currently broadcasting the radio program, through the communication control section 32 and the network interface 33.

As a result, the radio broadcasting display control section 39 receives the radio broadcast information from the radio information delivery server SV3 on the network NT via the network interface 33 and the communication control section 32, and then supplies the radio broadcast information to the display control section 24. The display control section 24 displays on the display section 25 the radio broadcast information including a title of the radio program being received, a title of the music being received, an artist name of the music, and the like.

(1-2-2) Directory Management

Figure 3:
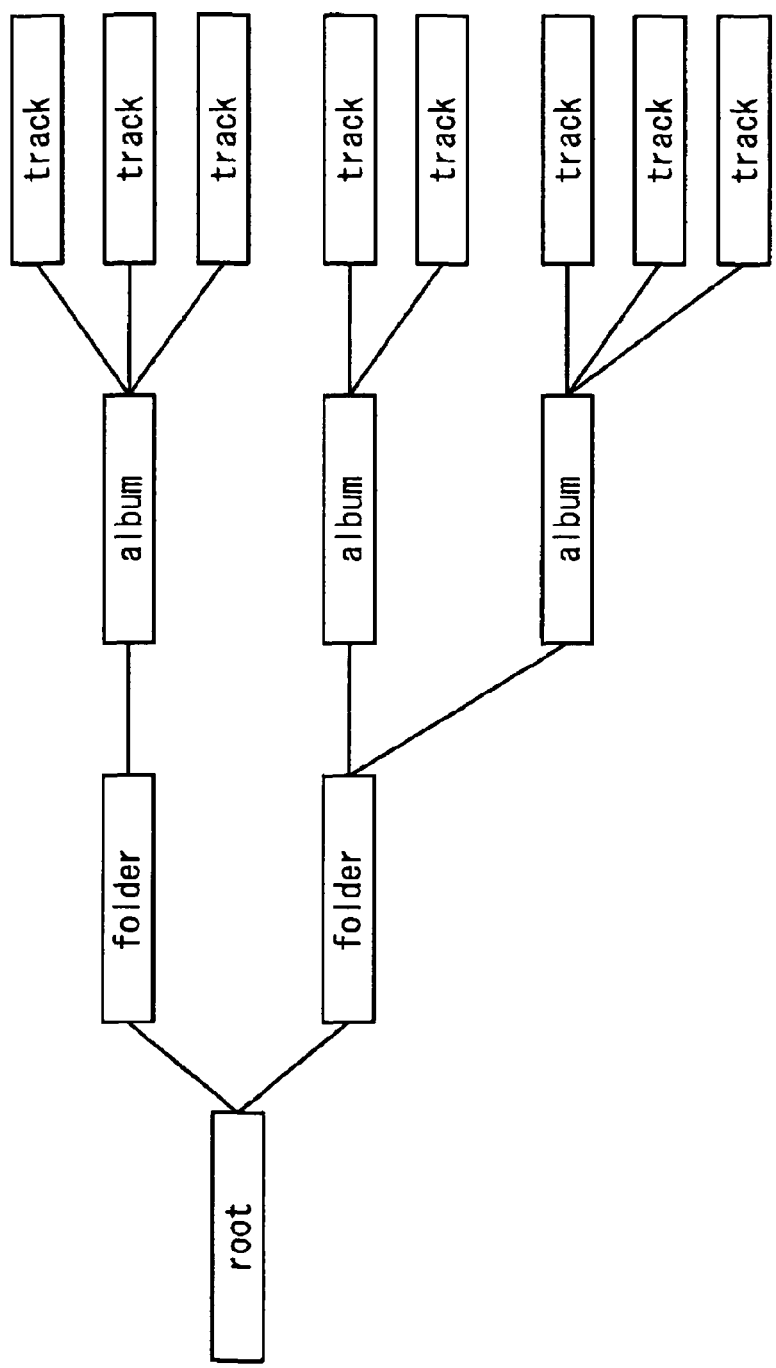
FIG. 3 is a schematic diagram showing a directory structure.

The control section 23 of the client terminal 2 manages content data stored in the storage medium 29 using a directory structure as shown in FIG. 3. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the storage medium 29.

(1-3) Functional Circuit Block Configuration of Portal Server 3

Figure 4:
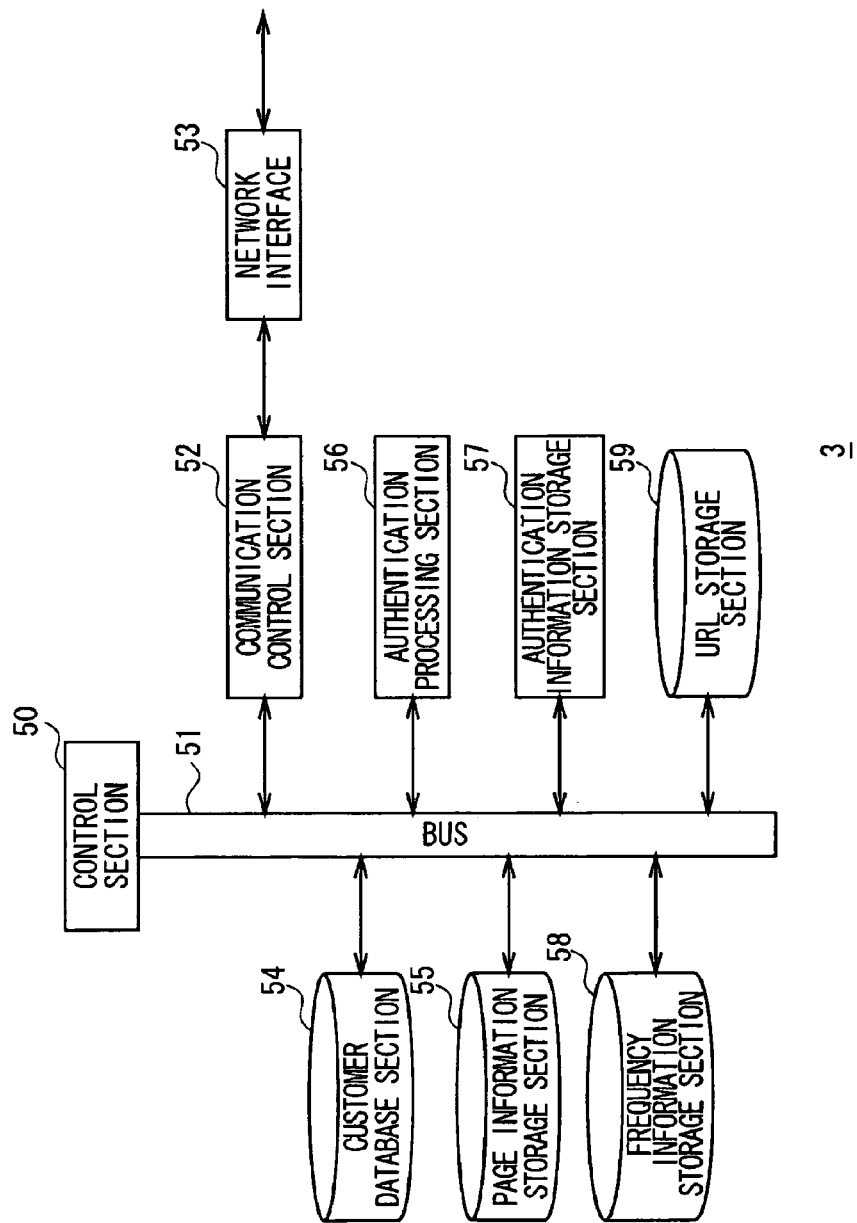
FIG. 4 is a block diagram showing the hardware configuration of a portal server using functional circuit blocks.

With reference to FIG. 4, the hardware configuration of the portal server 3 will be described using functional circuit blocks. The control section 50 of the portal server 3 controls operation of each circuit connected via a bus 51.

A communication control section 52 under the control of the control section 50 interchanges various kinds of information with the client terminal 2 and other servers SV1 through SV6 via a network interface 53.

A customer database section 54 stores a user ID (Identification) of a user who has contracted with a company operating the music related service provision system 1, along with its password information as customer information.

A page information storage section 55 stores page information and the like. The page information is being managed by the company operating the music related service provision system 1.

By the way, the page information is described in XML language or the like. The page information includes URL (Uniform Resource Locator) information to be used to access the music data delivery server SV1, the product sales server SV2, the radio broadcast information delivery server SV3, the Internet radio server SV4 and the like.

An authentication processing section 56 receives the user ID information and password information from the client terminal 2 through the network interface 53 and the communication control section 52, and then performs a user authentication process. In the processes of user authentication, the authentication processing section 56 checks whether or not the received user ID information and password information have been registered in the customer database section 54 as customer information.

After completing the user authentication processes, the authentication processing section 56 issues "portal authentication result information (equivalent to "authentication session ID information" described below)" showing a result of the user authentication process. The authentication processing section 56 then temporarily stores the portal authentication result information in an authentication information storage section 57.

If the result of the user authentication processes by the authentication processing section 56 indicates a fact that the user is legitimate, the control section 50 transmits contractor's page information and portal authentication result information to the client terminal 2 via the communication control section 52 and the network interface 53. The contractor's page information has been stored in a page information storage section 55.

If the result of the user authentication processes by the authentication processing section 56 indicates a fact that the user is not legitimate, the control section 50 may transmit authentication error information and authentication failure notification page information to the client terminal 2 via the communication control section 52 and the network interface 53. In this case, the authentication failure notification page information showing a failure of authentication has been stored in the page information storage section 55.

The client terminal 2 may obtain "portal authentication result information (equivalent to "authentication ticket" described below)" from the music data delivery server SV1, the product sales server SV2 or the radio broadcast information delivery server SV3, after the music data delivery server SV1, the product sales server SV2 or the radio broadcast information delivery server SV3 performs an authentication process of a user. In this case, the authentication processing section 56 receives the portal authentication result information from the user's client terminal 2 via the network interface 53 and the communication control section 52, and then compares the portal authentication result information with the one which corresponds to the user and is temporarily stored in the authentication information storage section 57.

The authentication processing section 56 performs an authentication process to the portal authentication result information that the client terminal 2 received from the music data delivery server SV1, the product sales server SV2 or the radio broadcast information delivery server SV3. In the authentication processes, the authentication processing section 56 performs a check process to check whether or not the received portal authentication result information is legitimate, and then transmits check result information showing a result of the check through the communication control section 52 and the network interface 53 to the music data delivery server SV1, the product sales server SV2 or the radio broadcast information delivery server SV3.

A frequency information storage section 58 associates the following items together to memorize: a regional code identifying a region, such as a postal code; frequency information showing a radio broadcast frequency receivable in the region; a name of a radio station (which is also referred to as "radio station name") which broadcasts radio programs; and a call sign, which is identification information unique to each radio station.

A URL storage section 59 associates call signs of radio stations with corresponding URL information to stores them. The call sign is unique to each radio station which broadcasts radio programs. The URL information is utilized to acquire radio broadcast information. The radio broadcast information includes information about a radio program currently broadcast from a radio station which corresponds to the call sign associated. The radio broadcast information, which is also referred to as "now-on-air information", for example includes a title of a radio program, and a title of music currently played in the radio program.

(1-4) Functional Circuit Block Configuration of Music Data Delivery Server SV1

Figure 5:
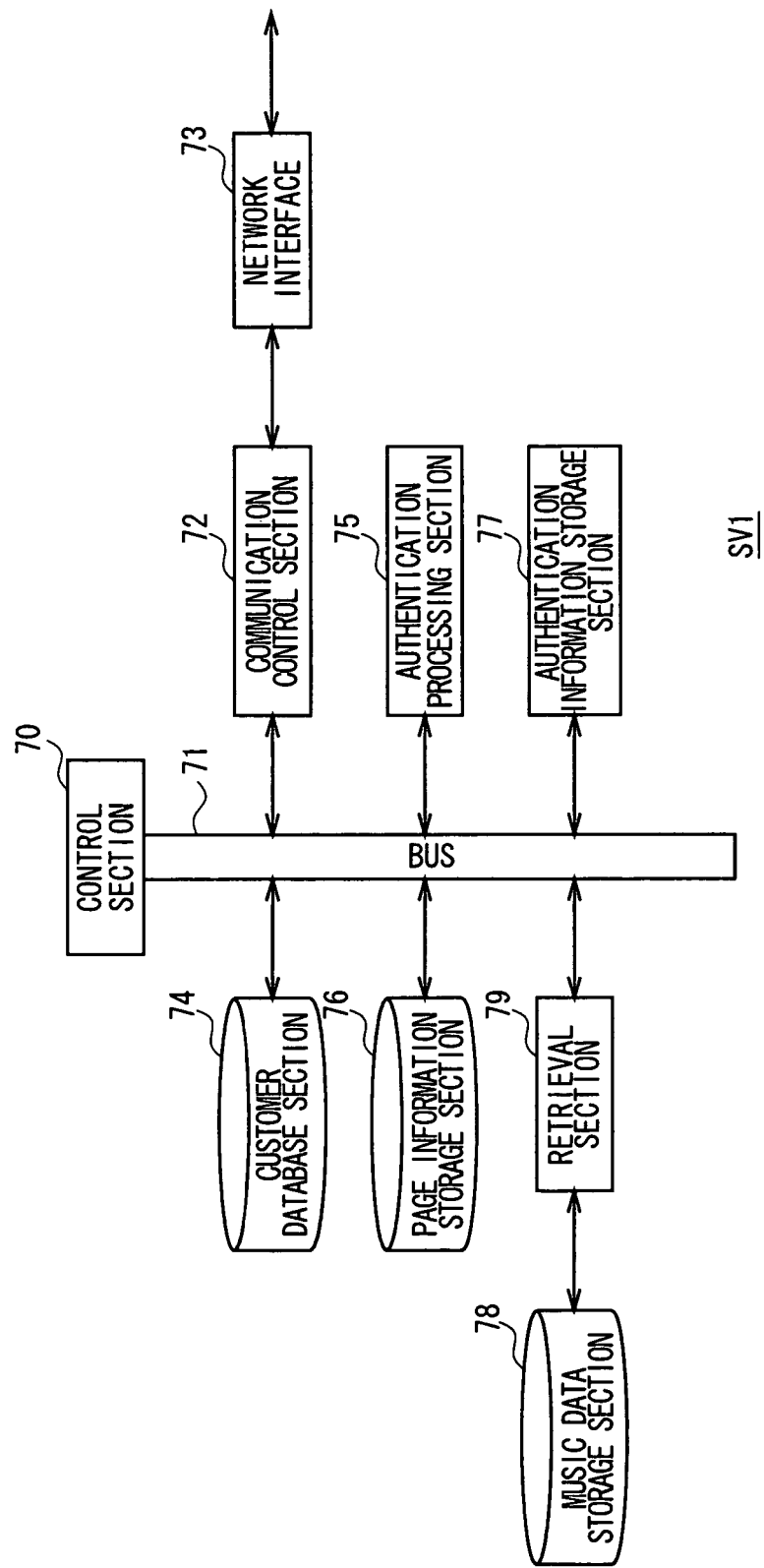
FIG. 5 is a block diagram showing the hardware configuration of a music data delivery server using functional circuit blocks.

With reference to FIG. 5, the configuration of the music data delivery server SV1 will be described using functional circuit blocks. The control section 70 of the music data delivery server SV1 controls operation of each circuit connected via a bus 71.

A communication control section 72 under the control of the control section 70 interchanges various kinds of information and various kinds of data such as content data with the client terminal 2, the portal server 3, and the like via a network interface 73.

A customer database section 74 stores user ID information of a user who has contracted with a company operating the music data delivery server SV1, along with its password information as customer information. By the way, an authentication processing section 75 may have capabilities to authenticate a user based on portal authentication result information (this portal authentication result information is issued by the portal server 3 to the client terminal 2 and transmitted from the client terminal 2 to the music data delivery server SV1). In this case, the customer database section 74 can be omitted.

A page information storage section 76 stores page information, which is utilized for distribution of music data and presenting downloadable music data (this page information is also referred to as "music-data-distribution page information"), and the like. The page information is managed by the music data delivery server SV1.

The music-data-distribution page information, described in the XML language or the like, has a structure through which a user of the client terminal 2 can select the music data he/she wants to download.

When the client terminal 2 transmits a page information acquisition request signal, which requests the music-data-distribution page information, the control section 70 receives the page information acquisition request signal via the network interface 73 and the communication control section 72. The control section 70 then transmits, in response to the page information acquisition request signal, the music-data-distribution page information stored in the page information storage section 76 to the client terminal 2 via the communication control section 72 and the network interface 73.

When the client terminal 2 transmits the user's user ID information and the password information, the authentication processing section 75 receives the user ID information and the password information via the network interface 73 and the communication control section 72. The authentication processing section 75 then performs a user authentication process. In the user authentication process, the authentication processing section 75 checks whether or not the user ID information and password information received has been registered in the customer database section 74 as customer information.

The authentication processing section 75 may perform another user authentication process, which is different from the one which uses the user ID information and the password information. In this case, the client terminal 2 supplies portal authentication result information (equivalent to an "authentication ticket" described below) issued by the portal server 3. The authentication processing section 75 receives the portal authentication result information via the network interface 73 and the communication control section 72, and then supplies the portal authentication result information to the portal server 3 via the communication control section 72 and the network interface 73.

In this manner, the portal authentication result information is supplied from the authentication processing section 75 to the portal server 3. The portal server 3 then performs an authentication process to the portal authentication result information (i.e. the check process described above), and then supplies the check results information. The authentication processing section 75 receives the check results information via the network interface 73 and the communication control section 72, and then checks whether or not the user is legitimate based on the check results information. In this case, a legitimate user is the one who has contracted with a company operating the music related service provision system 1.

After completing the user authentication process, the authentication processing section 75 issues server authentication result information (equivalent to a "service session ID information" described below). The server authentication result information shows a result of the user authentication process.

If the result of the user authentication process by the authentication processing section 75 indicates a fact that the user is legitimate, the control section 70 transmits the music-data-distribution page information and the server authentication result information to the client terminal 2 via the communication control section 72 and the network interface 73. The music-data-distribution page information for contractors has been stored in the page information storage section 76.

By contrast, when the result of the user authentication process by the authentication processing section 75 shows a fact that the user is not legitimate, the control section 70 transmits authentication error information and authentication failure notification page information to the client terminal 2 via the communication control section 72 and the network interface 73. In this case, the authentication failure notification page information showing a failure of authentication has been stored in the page information storage section 76.

By the way, an authentication information storage section 77 temporarily stores the server authentication result information issued by the authentication processing section 75. The authentication information storage section 77 also stores other authentication information which is necessary for the authentication processing section 75 to authenticate a user of the client terminal 2.

A music data storage section 78 has stored compressed-coded music data associated with corresponding retrieval keys. The music data has been compressed and encoded in ATRAC3 format, MP3 format, or the like. The retrieval key is equivalent to content ID information and the like.

By the way, after the music-data-distribution page information is transmitted to the client terminal 2, the client terminal 2 may transmit a download request signal. The download request signal requests download of music data which a user wants to download, and includes a retrieval key for searching the music data. A retrieval section 79 receives the download request signal via the network interface 73 and the communication control section 72, and then obtains the retrieval key from the download request signal.

The retrieval section 79 then searches a plurality of music data stored in the music data storage section 78 for the music data which meets a retrieval condition indicated by the retrieval key. That is to say, the retrieval section 79 searches for the music data which a user wants to download.

As a result, the control section 70 transmits the searched music data (which a user wants to download) to the client terminal 2 via the communication control section 72 and the network interface 73.

At this time, the control section 70 transmits fee-charging information to the fee-charging server SV6 via the communication control section 72 and the network interface 73. The fee-charging information is used to charge users a fee for the music data downloaded to the client terminal 2. The fee-charging server SV6 performs a fee-charging process to charge the user a fee for the downloaded music data.

(1-5) Functional Circuit Block Configuration of Product Sales Server SV2

Figure 6:
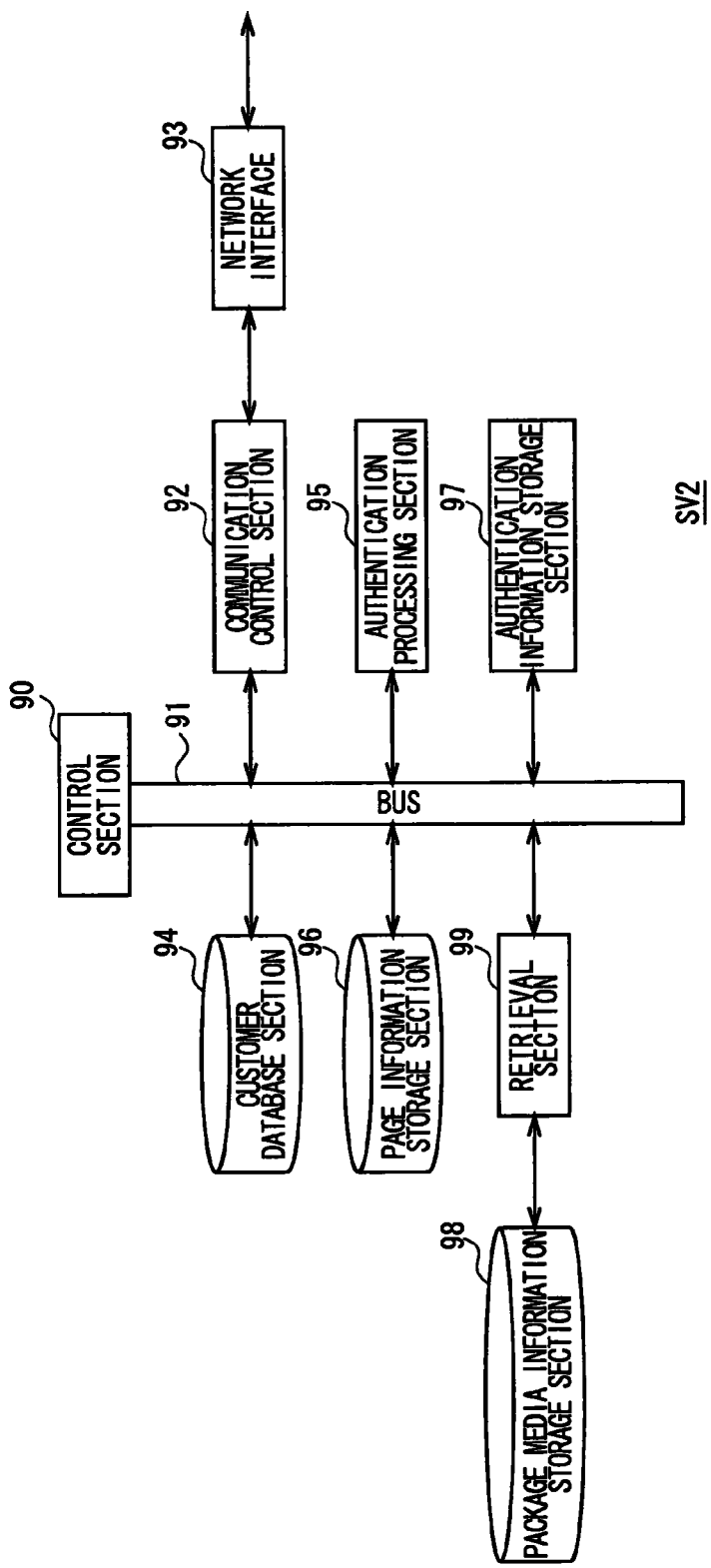
FIG. 6 is a block diagram showing the hardware configuration of a product sales server using functional circuit blocks.

With reference to FIG. 6, the hardware configuration of the product sales server SV2 will be described using functional circuit blocks. A control section 90 of the product sales server SV2 controls operation of each circuit connected via a bus 91.

A communication control section 92 under the control of the control section 90 interchanges various kinds of information with the client terminal 2, the portal server 3, and the like via a network interface 93.

A customer database section 94 stores user ID information of a user who has contracted with a company operating the product sales server SV2, along with its password information, as customer information. By the way, an authentication processing section 95 may have capabilities to authenticate a user based on portal authentication result information (this portal authentication result information is issued by the portal server 3 to the client terminal 2 and transmitted from the client terminal 2 to the product sales server SV2). In this case, the customer database section 94 can be omitted.

A page information storage section 96 stores page information, which is utilized for sales of package media and presenting package media such as CDs and DVDs for sale (this page information is also referred to as "package-media-sales page information"), and the like. The page information is managed by the product sales server SV2.

The package-media-sales page information, described in the XML language or the like, has a structure through which a user of the client terminal 2 can select package media such as CDs and DVDs which the user wants to buy.

When the client terminal 2 transmits a page information acquisition request signal, which requests the package-media-sales page information, the control section 90 receives the page information acquisition request signal via the network interface 93 and the communication control section 92. The control section 90 then transmits, in response to the page information acquisition request signal, the package-media-sales page information stored in the page information storage section 96 to the client terminal 2 via the communication control section 92 and the network interface 93.

When the client terminal 2 transmits the user's user ID information and the password information, the authentication processing section 95 receives the user ID information and the password information via the network interface 93 and the communication control section 92. The authentication processing section 95 then performs a user authentication process. In the user authentication process, the authentication processing section 95 checks whether or not the user ID information and password information received has been registered in the customer database section 94 as customer information.

The authentication processing section 95 may perform another user authentication process, which is different from the one that uses the user ID information and the password information. In this case, the client terminal 2 transmits portal authentication result information (equivalent to an "authentication ticket" described below) issued by the portal server 3. The authentication processing section 95 receives the portal authentication result information via the network interface 93 and the communication control section 92, and then transmits the portal authentication result information to the portal server 3 via the communication control section 92 and the network interface 93.

In this manner, the portal authentication result information is transmitted from the authentication processing section 95 to the portal server 3. The portal server 3 then performs an authentication process to the portal authentication result information (i.e. the check process described above), and then transmits check results information. The authentication processing section 95 receives the check results information via the network interface 93 and the communication control section 92, and then checks whether or not the user is legitimate based on the check results information. In this case, a legitimate user is the one who has contracted with a company operating the music related service provision system 1.

After completing the user authentication process, the authentication processing section 95 issues server authentication result information (equivalent to a "service session ID information" described below). The server authentication result information shows a result of the user authentication process.

When the result of the user authentication process by the authentication processing section 95 indicates a fact that the user is legitimate, the control section 90 transmits the package-media-sales page information and the server authentication result information to the client terminal 2 via the communication control section 92 and the network interface 93. The package-media-sales page information for contractors has been stored in the page information storage section 96.

Whereas when the result of the user authentication process by the authentication processing section 95 shows a fact that the user is not legitimate, the control section 90 transmits authentication error information and authentication failure notification information to the client terminal 2 via the communication control section 92 and the network interface 93. In this case, the authentication failure notification information showing a failure of authentication has been stored in the page information storage section 96.

An authentication information storage section 97 temporarily stores the server authentication result information issued by the authentication processing section 95. The authentication information storage section 97 also stores other authentication information which is necessary for the authentication processing section 95 to authenticate a user of the client terminal 2.

A package media information storage section 98 has stored a plurality of pieces of package media information associated with corresponding retrieval keys. Each piece of package media information relates to a package medium such as CD and DVD for sale. The retrieval key is equivalent to package medium ID information and the like.

By the way, after the package-media-sales page information is transmitted to the client terminal 2, the client terminal 2 may transmits a media information request signal. The media information request signal requests package media information about package media such as CDs and DVDs. A retrieval section 99 receives the media information request signal via the network interface 93 and the communication control section 92, and then obtains a retrieval key from the media information request signal. The retrieval key is used to retrieve a specific package medium.

The retrieval section 99 then searches a plurality of piece of package media information stored in the package media information storage section 98 for a piece of package media information which meets a retrieval condition indicated by the retrieval key.

As a result, the control section 90 transmits the searched package media information to the client terminal 2 via the communication control section 92 and the network interface 93, and therefore shows a user the package media information about the specific package medium.

When the client terminal 2 transmits a purchase request signal, which requests a purchase of the package medium, the control section 90 receives the purchase request signal via the network interface 93 and the communication control section 92, and then performs a sale process. In the sale processes, the control section 90 for example performs a shipping procedure to ship the package medium to the user of the client terminal 2.

At this time, the control section 90 transmits fee-charging information to the fee-charging server SV6 via the communication control section 92 and the network interface 93. The fee-charging information is used to charge a user a fee for the purchased package medium. The fee-charging server SV6 performs fee-charging processes to charge the user a fee for the purchased package medium.

After the fee-charging server SV6 completes the fee-charging processes for the user, the control section 90 subsequently transmits sale completion page information to the client terminal 2 via the communication control section 92 and the network interface 93. The sale completion page information shows a fact that the sale process of the package medium has been completed.

(1-6) Functional Circuit Block Configuration of Radio Broadcast Information Delivery Server SV3

Figure 7:
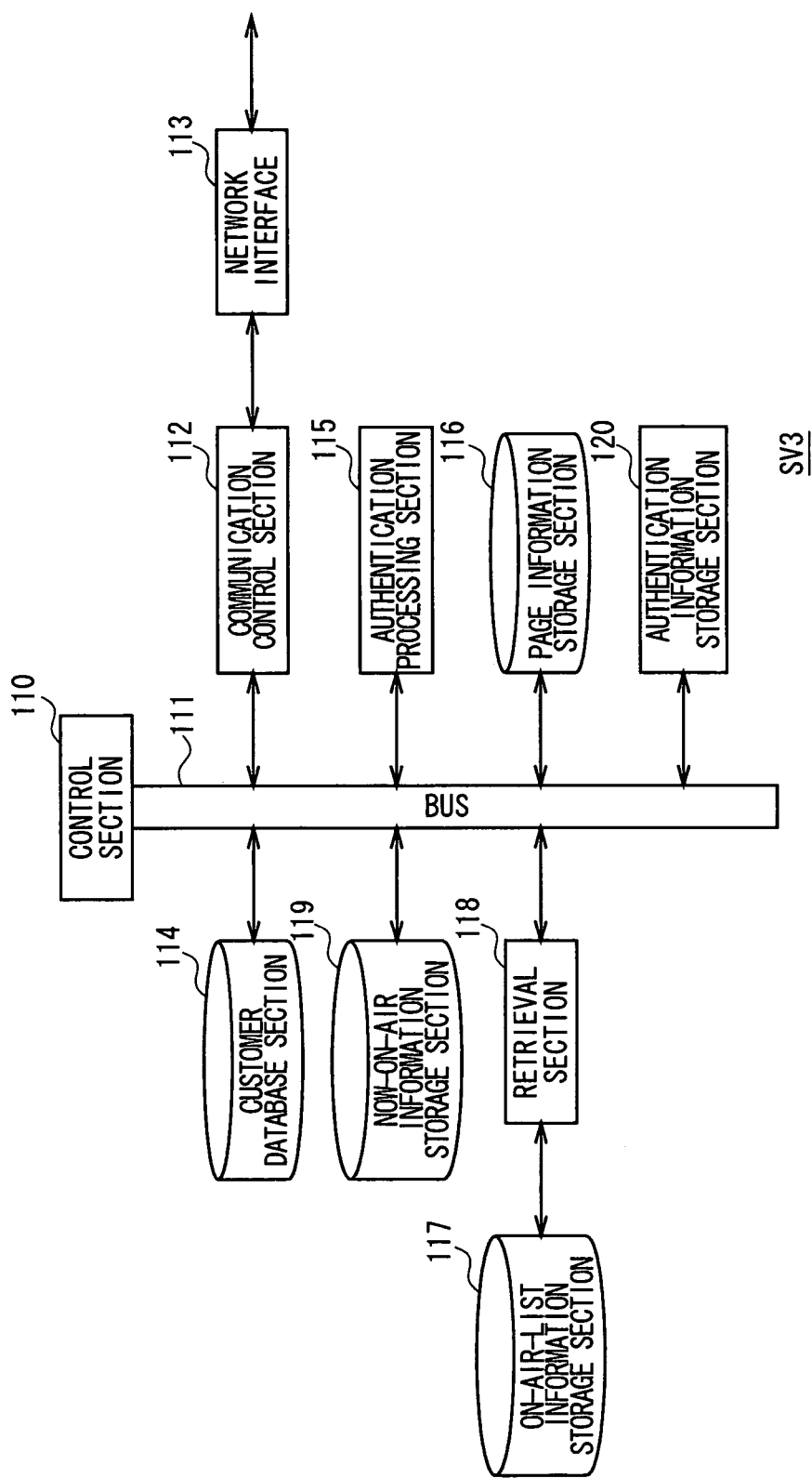
FIG. 7 is a block diagram showing the hardware configuration of a radio broadcast information delivery server using functional circuit blocks.

With reference to FIG. 7, the hardware configuration of the radio broadcast information delivery server SV3 will be described using functional circuit blocks. A control section 110 of the radio broadcast information delivery server SV3 controls operation of each circuit connected via a bus 111.

A communication control section 112 under the control of the control section 110 interchanges various kinds of information with the client terminal 2, the portal server 3, and the like via a network interface 113.

A customer database section 114 stores user ID information of a user who has contracted with a company operating the radio broadcast information delivery server SV3, along with its password information as customer information. By the way, an authentication processing section 115 may have capabilities to authenticate a user based on portal authentication result information (this portal authentication result information is issued by the portal server 3 to the client terminal 2 and transmitted from the client terminal 2 to the radio broadcast information delivery server SV3). In this case, the customer database section 114 can be omitted.

A page information storage section 116 stores page information which is used for acquisition of radio broadcast information, and the like. In this case, the radio broadcast information relates to radio programs which have already been broadcast from a radio station corresponding to the radio broadcast information delivery server SV3. The radio broadcast information is also referred to as "on-air-list information", and the page information used for acquisition of on-air-list information is also referred to as "on-air-list-information-distribution page information". The page information is managed by the radio broadcast information delivery server SV3.

The on-air-list-information-distribution page information, described in the XML language or the like, provides an input box and the like through which a user of the client terminal 2 can input retrieval keys of the on-air-list information which he/she wants to obtain. A radio program title, a date and time of broadcast of a radio program, and the like could be the retrieval key.

An on-air-list information storage section 117 stores on-air-list information. The on-air-list information is generated by listing the following information: a title of a radio program which has already been broadcast from a radio station corresponding to the radio broadcast information delivery server SV3; a start and end time of broadcast of the program; an artist name and title of music played in the program; the start time of broadcast of the music, and the like.

When the client terminal 2 transmits a page information acquisition request signal which requests on-air-list-information-distribution page information, the control section 110 receives the page information acquisition request signal via the network interface 113 and the communication control section 112. The control section 110 then transmits, in response to the page information acquisition request signal, the on-air-list-information-distribution page information which has been stored in the page information storage section 116 to the client terminal 2 via the communication control section 112 and the network interface 113.

When a user inputs a retrieval key of on-air-list information the user wants to obtain through the on-air-list-information-distribution page information, the client terminal 2 transmits an on-air-list information request signal including the retrieval key. The on-air-list information request signal requests download of the on-air-list information. A retrieval section 118 receives the on-air-list information request signal via the network interface 113 and the communication control section 112, and then obtains the retrieval key from the on-air-list information request signal.

The retrieval section 118 then searches, based on the retrieval key, the whole on-air-list information stored in the on-air-list information storage section 117 to extract part of the on-air-list information which meets a retrieval condition indicated by the retrieval key. In this manner, part of on-air-list information the user wants to acquire is obtained.

The control section 110 subsequently transmits the obtained on-air-list information to the client terminal 2 via the communication control section 112 and the network interface 113.

A now-on-air information storage section 119 stores now-on-air information. The now-on-air information is made up of the following items: a title of a radio program currently being broadcast from a radio station corresponding to the radio broadcast information delivery server SV3; a start and end time of broadcast of the program; an artist name and title of music currently being played in the program; a start time of broadcast of the music, and the like.

When the client terminal 2 transmits the user's user ID information and the password information with a now-on-air information request signal which requests now-on-air information, the authentication processing section 115 receives the user ID information and the password information via the network interface 113 and the communication control section 112. The authentication processing section 115 then performs a user authentication process. In the user authentication process, the authentication processing section 115 checks whether or not the user ID information and password information received has been registered in the customer database section 114 as customer information.

The authentication processing section 115 may perform another user authentication process. This user authentication process is different from the one which uses the user ID information and the password information. In this case, the client terminal 2 transmits portal authentication result information (equivalent to an "authentication ticket" described below) issued by the portal server 3. The authentication processing section 115 receives the portal authentication result information via the network interface 113 and the communication control section 112, and then transmits the portal authentication result information to the portal server 3 via the communication control section 112 and the network interface 113.

In this manner, the portal authentication result information is transmitted from the authentication processing section 115 to the portal server 3. The portal server 3 then performs an authentication process to the portal authentication result information (i.e. the check process described above), and then transmits check results information. The authentication processing section 115 receives the check results information via the network interface 113 and the communication control section 112, and then checks whether or not the user is legitimate based on the check results information. In this case, a legitimate user is the one who has contracted with a company operating the music related service provision system 1.

When completing the user authentication process, the authentication processing section 115 issues server authentication result information (equivalent to a "service session ID information" described below). The server authentication result information shows a result of the user authentication process.

When the result of the user authentication process by the authentication processing section 115 shows a fact that the user is legitimate, the control section 110 transmits the server authentication result information and the now-on-air information stored in the now-on-air information storage section 119 to the client terminal 2 via the communication control section 112 and the network interface 113.

Whereas when the result of the user authentication process by the authentication processing section 115 shows a fact that the user is not legitimate, the control section 110 transmits authentication error information and authentication failure notification page information to the client terminal 2 via the communication control section 112 and the network interface 113. In this case, the authentication failure notification page information showing a failure of authentication has been stored in the page information storage section 116.

As described above, when the control section 110 receives a request for now-on-air information from a user, the control section 110 supplies the now-on-air information, if the authentication result shows a fact that the user is legitimate. Whereas if the authentication result shows a fact that the user is not legitimate, the control section 110 does not provide a radio broadcast information delivery service. That is to say, the control section 110 does not supply the now-on-air information. The radio broadcast information delivery service is a service provided by the radio broadcast information delivery server SV3.

An authentication information storage section 120 temporarily stores the server authentication result information issued by the authentication processing section 115. The authentication information storage section 120 also stores other authentication information which is necessary for the authentication processing section 115 to authenticate a user of the client terminal 2.

(1-7) Brief Overview of Processes of Each Server

With reference to sequence charts shown in FIGS. 8 through 13, brief overview of processes between the client terminal 2 and the portal server 3 will be described. Also, brief overview of processes between the client terminal 2 and other servers such as the music data delivery server SV1, the product sales server SV2, and the radio broadcast information delivery server SV3 will be described.

(1-7-1) User Authentication Process Between Client Terminal 2 and Portal Server 3

Figure 8:
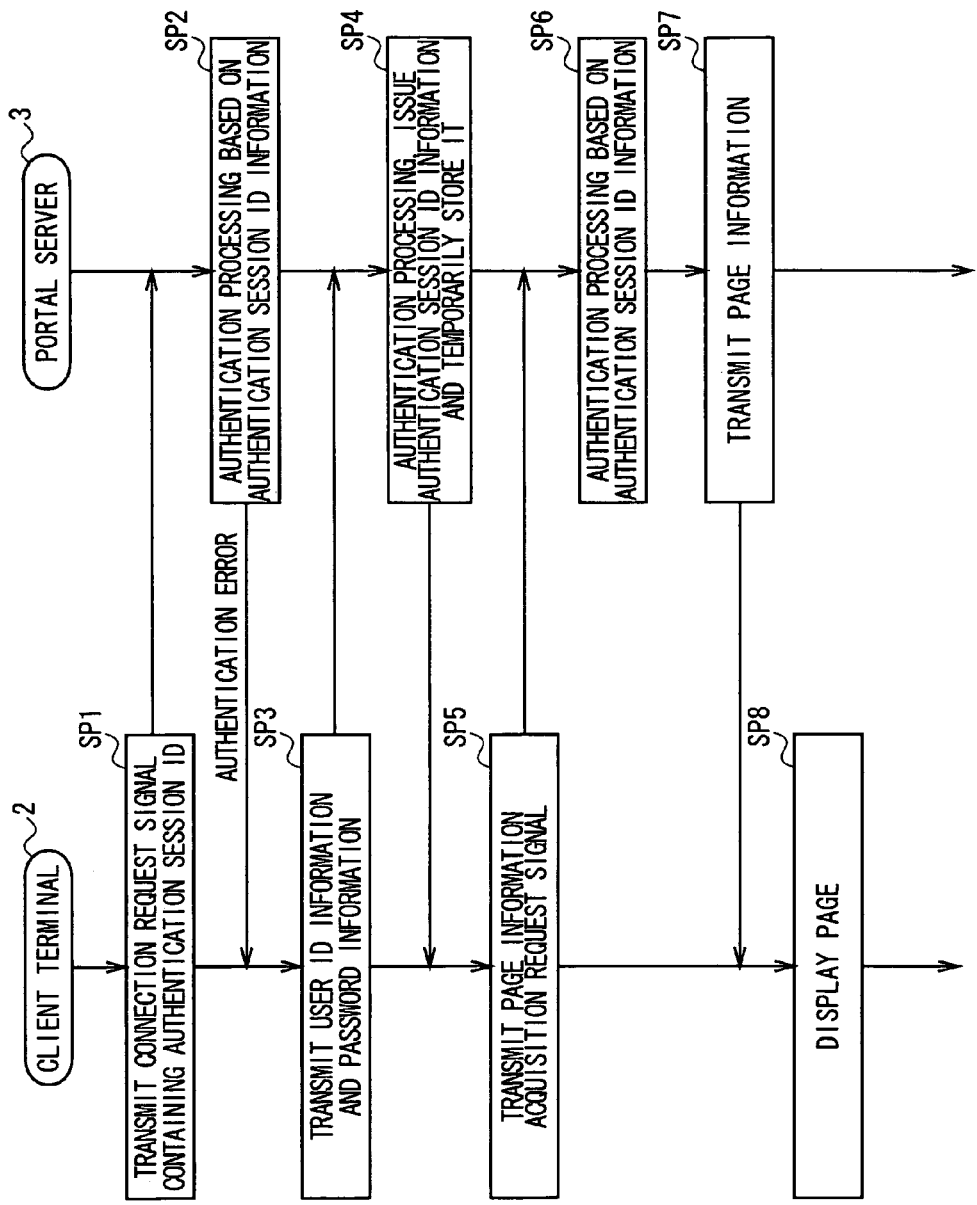
FIG. 8 is a sequence chart showing a user authentication process between the client terminal and the portal server.

Referring to FIG. 8, a user authentication process between the client terminal 2 and the portal server 3 will be described.

When a user who has contracted with a company operating the music related service provision system 1 operates the client terminal 2 to turn the client terminal 2 on, the operation input section 20 of the client terminal 2 detects an operation input signal. Alternatively, when a user pushes a particular operation button of the operation input section 20, the operation input section 20 detects an operation input signal. The input processing section 21 transforms the operation input signal into an operation command, and supplies the operation command to the control section 23. The control section 23 therefore starts an authentication request process.

At step SP1, after the control section 23 of the client terminal 2 starts an authentication request process, the control section 23 of the client terminal 2 generates a connection request signal, and then transmits the connection request signal to the portal server 3 via the communication control section 32 and the network interface 33. The connection request signal includes authentication session ID information, which has been temporarily stored in the authentication information storage section 38, and the like.

The authentication session ID information is issued by the portal server 3 each time when a communication connection between the client terminal 2 and the portal server 3 is established to perform various processes such as a user authentication process. The authentication session ID information identifies each communication connection state (i.e., session).

The authentication session ID information has a certain period of validity for a user authentication process and the like. The period of validity starts when the portal server 3 issues it. The period of validity for example is one minute.

In a case in which the client terminal 2 that has already obtained the authentication session ID information from the portal server 3 can not submit the authentication session ID information to the portal server 3 within the period of validity, the portal server 3 determines that the communication connection identified by the authentication session ID information has been broken.

In this manner, the portal server 3 prevents the issued authentication session ID information from being used improperly by someone who has not contracted with a company operating the music related service provision system 1 for the purpose of a user authentication process or the like.

In this case, the authentication information storage section 38 temporarily stores the authentication session ID information, which was issued by the portal server 3 when the communication connection between the client terminal 2 and the portal server 3 was established for the purpose of user authentication process or the like at a time in the past.

When the client terminal 2 transmits a connection request signal, the control section 50 of the portal server 3 at step SP2 receives the connection request signal via the network interface 53 and the communication control section 52. The control section 50 then transmits the authentication session ID information and the like in the connection request signal to the authentication processing section 56.

The authentication processing section 56 under the control of the control section 50 performs, based on the authentication session ID information and the like, an authentication process. This authentication session ID information was received as the connection request signal from the client terminal 2.

As a result, when the authentication processing section 56 determines that a user of the client terminal 2 is not legitimate, the control section 50 transmits authentication error information showing authentication error to the client terminal 2 via the communication control section 52 and the network interface 53. In this case, the authentication processing section 56 determines that the user is not legitimate, when the authentication session ID information and the like received from the client terminal 2 have expired, or when there are other reasons.

At step SP3, the control section 23 of the client terminal 2 receives the authentication error information from the portal server 3 via the network interface 33 and the communication control section 32. The control section 23 subsequently obtains user ID information, password information, and the like from the authentication information storage section 38, and then transmits the user ID information, the password information, and the like to the portal server 3 via the communication control section 32 and the network interface 33.

At step SP4, the control section 50 of the portal server 3 receives the user ID information, the password information, and the like from the client terminal 2 via the network interface 53 and the communication control section 52, and then supplies the user ID information, the password information, and the like to the authentication processing section 56.

The authentication processing section 56 under the control of the control section 50 performs a user authentication process. In the user authentication process, the authentication processing section 56 checks whether or not the user ID information, the password information, and the like from the client terminal 2 exist in the customer information registered in the customer database section 54.

As a result, when the authentication processing section 56 determines that a user of the client terminal 2 is legitimate, the authentication processing section 56 under the control of the control section 50 issues portal authentication result information for the client terminal 2. In this case, the portal authentication result information is equivalent to authentication session ID information which identifies the communication connection being maintained between the client terminal 2 and the portal server 3, and the like. The authentication processing section 56 then temporarily stores the authentication session ID information issued and the like in the authentication information storage section 57.

The control section 50 subsequently transmits the authentication session ID information and the like to the client terminal 2 via the communication control section 52 and the network interface 53. The authentication session ID information and the like were issued by the authentication processing section 56 to the client terminal 2.

At step SP5, the control section 23 of the client terminal 2 receives the authentication session ID information and the like from the portal server 3 via the network interface 33 and the communication control section 32, and then supplies the authentication session ID information and the like to the authentication processing section 37.

The authentication processing section 37 under the control of the control section 23 temporarily stores the authentication session ID information and the like received from the portal server 3 in the authentication information storage section 38.

The control section 23 subsequently transmits a page information acquisition request signal along with the authentication session ID information and the like (which were received from the portal server 3 and temporarily stored in the authentication information storage section 38) to the portal server 3 via the communication control section 32 and the network interface 33. The page information acquisition request signal requests the page information from the portal server 3.

At step SP6, the control section 50 of the portal server 3 receives the page information acquisition request signal, the authentication session ID information, and the like from the client terminal 2 via the network interface 53 and the communication control section 52, and then supplies the authentication session ID information, and the like to the authentication processing section 56.

The authentication processing section 56 under the control of the control section 50 then performs a user authentication process. In the user authentication process, the authentication processing section 56 compares the authentication session ID information and the like from the client terminal 2 with the ones temporarily stored in the authentication information storage section 57. The information temporarily stored in the authentication information storage section 57 was issued to the client terminal 2 at step SP4.

At step SP7, when a result of the authentication indicates a fact that a user of the client terminal 2 is legitimate, the authentication processing section 56 determines that the request for page information from the client terminal 2 is legitimate. The authentication processing section 56 then extends the period of validity of the authentication session ID information and the like.

Therefore, the control section 50 reads the page information requested by the user from the page information storage section 55, and transmits the page information, the authentication session ID information, and the like to the client terminal 2 via the communication control section 52 and the network interface 53. The authentication session ID information and the like have their period of validity extended through the authentication processing section 56.

At step SP8, the control section 23 of the client terminal 2 receives the page information, the authentication session ID information and the like from the portal server 3 via the network interface 33 and the communication control section 32. The authentication session ID information and the like have their period of validity extended. The control section 23 of the client terminal 2 then supplies the page information to the page information generation section 36. The control section 23 of the client terminal 2 also supplies the authentication session ID information and the like to the authentication processing section 37.

The page information generation section 36 generates, based on the page information from the control section 23, video data of a page containing links to the music data delivery server SV1, the product sales server SV2, and the radio broadcast information delivery server SV3. The page information generation section 36 subsequently supplies the video data to the display control section 24.

The display control section 24 performs digital-to-analog conversion to the video data from the page information generation section 36 to generate an analog video signal. The display control section 24 subsequently supplies the analog video signal to the display section 25 which then displays, based on the analog video signal, an image of a page of the portal server 3.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have their period of validity extended. In this manner, the authentication session ID information and the like temporarily stored at above step SP5 are updated to the ones having their period of validity extended.

(1-7-2) Procedure of User Authentication Process Between Client Terminal 2 and Servers SV1 Through SV3

Figure 9:
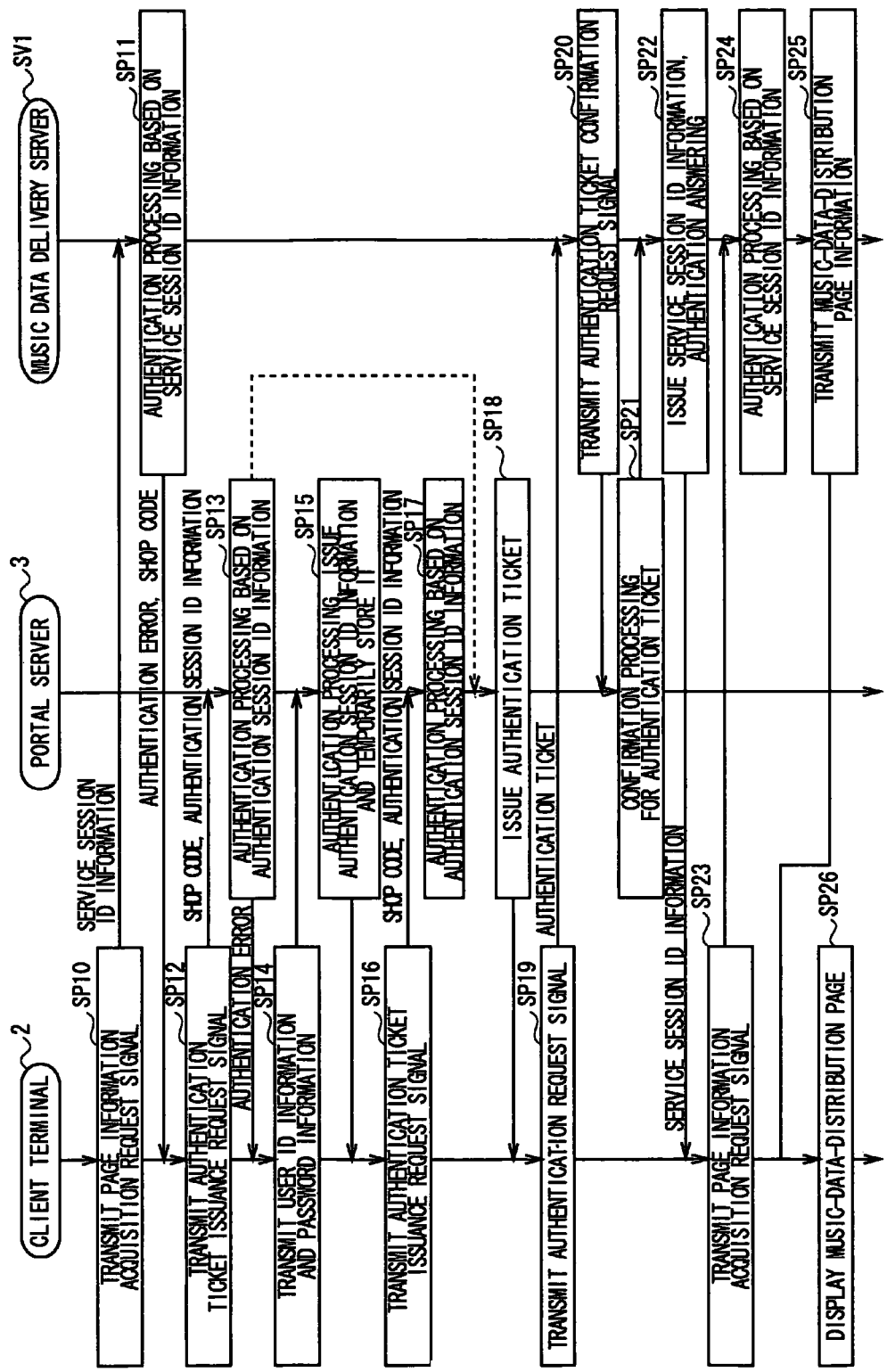
FIG. 9 is a sequence chart showing a user authentication process between the client terminal and the music data delivery server.

Referring to FIG. 9, a user authentication process will be described. The user authentication process is executed between the client terminal 2 and the music data delivery server SV1, the product sales server SV2 and the radio broadcast information delivery server SV3.

In this case, when the client terminal 2 accesses, after acquiring page information from the portal server 3 as described above (FIG. 8), the music data delivery server SV1, the product sales server SV2 and the radio broadcast information delivery server SV3 based on links embedded in the page information, the user authentication process is executed. This user authentication process is also referred to as an "indirect access authentication process".

In addition, when the client terminal 2 directly accesses the music data delivery server SV1, the product sales server SV2 and the radio broadcast information delivery server SV3 based on the URL information and the like previously bookmarked without obtaining page information from the portal server 3, the user authentication process is executed. This user authentication process is also referred to as a "direct access authentication process".

The indirect access authentication process can be performed in any combination of the following: the client terminal 2 and the music data delivery server SV1; the client terminal 2 and the product sales server SV2; and, the client terminal 2 and the radio broadcast information delivery server SV3.

The direct access authentication process also can be performed in any combination of the following: the client terminal 2 and the music data delivery server SV1; the client terminal 2 and the product sales server SV2; and, the client terminal 2 and the radio broadcast information delivery server SV3.

A difference between the indirect access authentication process and the direct access authentication process is a way of acquiring URL information which the client terminal 2 uses to access the music data delivery server SV1, the product sales server SV2 and the radio broadcast information delivery server SV3. The indirect access authentication process and the direct access authentication process perform the same procedure after obtaining the URL information.

Accordingly, for ease of explanation, the following description uses the music data delivery server SV1 which the client terminal 2 accesses. Both the indirect access authentication process and the direct access authentication process will be collectively described as a user authentication process.

At step SP10, the control section 23 of the client terminal 2 transmits a page information acquisition request signal, the service session ID information read from the authentication information storage section 38, and the like to the music data delivery server SV1 through the communication control section 32 and the network interface 33. At this time, the control section 23 of the client terminal 2 uses the URL information that has been embedded in the page information as links, or has been previously bookmarked. The page information acquisition request signal requests the music-data-distribution page information (if the client terminal 2 accesses the product sales server SV2 or the radio broadcast information delivery server SV3, the page information acquisition request signal requests the package-media-sales page information or the on-air-list-information-distribution page information).

Each time when the communication connection between the client terminal 2 and the music data delivery server SV1, the client terminal 2 and the product sales server SV2, or the client terminal 2 and the radio broadcast information delivery server SV3 is established to perform various processes such as the user authentication process, the service session ID information is issued by the connected server SV1, SV2 or SV3. The service session ID information identifies each communication connection state (i.e., session).

The service session ID information has a certain period of validity of the user authentication processes and the like, in the same way as the above-noted authentication session ID information. The period of validity starts when the music data delivery server SV1, the product sales server SV2 or the radio broadcast information delivery server SV3 issues it. The period of validity for example is one minute.

In a case in which the client terminal 2 that already has the service session ID information issued by the server SV1, SV2 or SV3 can not submit the service session ID information to the issued server SV1, SV2 or SV3 within the period of validity, the issued server SV1, SV2 or SV3 determines that the communication connection identified by the service session ID information has been broken.

In this manner, the music data delivery server SV1, the product sales server SV2 or the radio broadcast information delivery server SV3 prevents the issued authentication session ID information from being used improperly by someone who has not contracted with a company operating the music related service provision system 1 for the purpose of the user authentication process or the like.

In this case, the service session ID information, which is temporarily stored in the authentication information storage section 38, was issued by the music data delivery server SV1, the product sales server SV2 or the radio broadcast information delivery server SV3 when the communication connection between the client terminal 2 and the server SV1, the client terminal 2 and the server SV2 or the client terminal 2 and the server SV3 was established for the purpose of the user authentication process or the like at a time in the past.

At step SP11, the control section 70 of the music data delivery server SV1 receives the page information acquisition request signal, the service session ID information, and the like from the client terminal 2 via the network interface 73 and the communication control section 72. The control section 70 of the music data delivery server SV1 then supplies the service session ID information and the like to the authentication processing section 75.

The authentication processing section 75 under the control of the control section 70 performs the user authentication process. In the user authentication process, the authentication processing section 75 compares the service session ID information and the like from client terminal 2 with those temporarily stored in the authentication information storage section 77.

As a result, if a result of the authentication shows a fact that a user of the client terminal 2 is not legitimate, the authentication processing section 75 determines that the request for music-data-distribution page information from the client terminal 2 is not legitimate. For example, when the service session ID information from the client terminal 2 has expired, the authentication result shows a fact that a user of the client terminal 2 is not legitimate.

The control section 70 subsequently transmits authentication error information showing authentication error, and a shop code identifying the music data delivery server SV1 to the client terminal 2 via the communication control section 72 and the network interface 73, because the authentication processing section 75 determines that a user of the client terminal 2 is not legitimate.

At step SP12, the control section 23 of the client terminal 2 receives the authentication error information and the shop code from the music data delivery server SV1 via the network interface 33 and the communication control section 32. The control section 23 of the client terminal 2 subsequently recognizes that the user is not authenticated as a legitimate user based on the authentication error information, and then temporarily stores the shop code from the music data delivery server SV1 in the authentication information storage section 38.

The control section 23 subsequently generates an authentication ticket issuance request signal. The authentication ticket issuance request signal requests an issue of an authentication ticket to be used to access the music data delivery server SV1. The control section 23 then transmits the authentication ticket issuance request signal, the shop code of the music data delivery server SV1, the authentication session ID information, which was temporarily stored in the authentication information storage section 38, and the like to the portal server 3 via the communication control section 32 and the network interface 33.

At step SP13, the control section 50 of the portal server 3 receives the authentication ticket issuance request signal, the shop code, the authentication session ID information, and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

As a result, if a result of the authentication shows a fact that a user of the client terminal 2 is not legitimate, the authentication processing section 56 determines that the request for authentication ticket from the client terminal 2 is not legitimate. For example, when the authentication session ID information from the client terminal 2 has expired, the result of authentication shows that a user of the client terminal 2 is not legitimate.

The control section 50 subsequently transmits authentication error information showing authentication error to the client terminal 2 via the communication control section 52 and the network interface 53 because the authentication processing section 56 determines that a user of the client terminal 2 is not legitimate.

Whereas if the result of the authentication shows a fact that a user of the client terminal 2 is legitimate, the authentication processing section 56 determines that the request for authentication ticket from the client terminal 2 is legitimate. For example, when the authentication session ID information from the client terminal 2 has not expired, the result of the authentication shows a fact that a user of the client terminal 2 is legitimate.

In a case in which the result of the authentication from the authentication processing section 56 shows a fact that a user of the client terminal 2 is legitimate, the control section 50 proceeds to step SP18 as described below.

At step SP14, the control section 23 of the client terminal 2 receives the authentication error information from the portal server 3 via the network interface 33 and the communication control section 32. The control section 23 of the client terminal 2 subsequently reads the user ID information, the password information and the like from the authentication information storage section 38, and then transmits the user ID information, the password information and the like to the portal server 3 via the communication control section 32 and the network interface 33.

At step SP15, the control section 50 of the portal server 3 receives the user ID information, the password information and the like from the client terminal 2 via the network interface 53 and the communication control section 52, and then supplies the user ID information, the password information and the like to the authentication processing section 56.

Therefore, the authentication processing section 56 under the control of the control section 50 performs a user authentication process. In the user authentication process, the authentication processing section 56 checks whether or not the user ID information, the password information and the like from the client terminal 2 exists in the customer information registered in the customer database section 54.

As a result, if a result of the authentication shows that a user of the client terminal 2 is legitimate, the authentication processing section 56 under the control of the control section 50 issues authentication session ID information (portal authentication result information) for the communication connection currently maintained between the client terminal 2 and the portal server 3, and the like. The authentication processing section 56 then temporarily stores the authentication session ID information and the like issued to the client terminal 2 in the authentication information storage section 57.

The control section 50 subsequently transmits the authentication session ID information and the like, which were issued to the client terminal 2 by the authentication processing section 56, to the client terminal 2 via the communication control section 52 and the network interface 53.

At step SP16, the control section 23 of the client terminal 2 receives the authentication session ID information and the like from the portal server 3 via the network interface 33 and the communication control section 32, and then temporarily stores the authentication session ID information and the like in the authentication information storage section 38 through the authentication processing section 37.

The control section 23 then regenerates an authentication ticket issuance request signal which requests an issue of an authentication ticket. The control section 23 subsequently transmits the authentication ticket issuance request signal, the shop code, which was temporarily stored in the authentication information storage section 38, the authentication session ID information, which was temporarily stored at that time, and the like, to the portal server 3 via the communication control section 32 and the network interface 33.

In this embodiment, the client terminal 2 temporarily stores the shop code in the authentication information storage section 38. However, this invention is not limited to this. The client terminal 2 may interchange again the shop code with the portal server 3 while performing the processes of steps SP12 through SP16. This allows the client terminal 2 to transmit the shop code to the portal server 3 at step SP16 without temporarily storing it in the authentication information storage section 38.

At step SP17, the control section 50 of the portal server 3 receives the authentication ticket issuance request signal, the shop code, the authentication session ID information and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

If a result of the authentication shows a fact that a user of the client terminal 2 is legitimate, the authentication processing section 56 determines that the request for authentication tickets from the client terminal 2 is legitimate. For example, in a case in which the authentication session ID information and the like from the client terminal 2 have not expired yet, the authentication result shows a fact that a user of the client terminal 2 is legitimate.

Then, the control section 50 proceeds to step SP18, as a user of the client terminal 2 is authenticated as a legitimate user by the authentication processing section 56.

At step SP18, the authentication processing section 56 under the control of the control section 50 issues an authentication ticket (i.e. the portal authentication result information) and the like based on the shop code and the authentication ticket issuance request signal received from the client terminal 2 by the process of step SP17 described above. The authentication ticket allows the client terminal 2 to access the music data delivery server SV1 corresponding to the shop code.

The authentication processing section 56 under the control of the control section 50 temporarily stores the issued authentication ticket and the like in the authentication information storage section 57, and then extends the period of validity of the authentication session ID information and the like issued to the client terminal 2.

The control section 50 then transmits the authentication ticket, the authentication session ID information having its period of validity extended by the authentication processing section 56, and the like to the client terminal 2 via the communication control section 52 and the network interface 53.

At step SP19, the control section 23 of the client terminal 2 receives the authentication ticket, the authentication session ID information having its period of validity extended, and the like from the portal server 3 via the network interface 33 and the communication control section 32, and then supplies the authentication session ID information to the authentication processing section 37.

The control section 23 transmits the authentication ticket which was received from the portal server 3, an authentication request signal, and the like to the music data delivery server SV1 via the communication control section 32 and the network interface 33.

At this time, the authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored at above-noted step SP16 are updated to those having their period of validity extended.

At step SP20, the control section 70 of the music data delivery-server SV1 receives the authentication request signal, the authentication ticket and the like from the client terminal 2 via the network interface 73 and the communication control section 72.

The control section 70 then transmits the authentication ticket, which was received from the client terminal 2, an authentication ticket confirmation request signal, which requests a confirmation of the authentication ticket, and the like to the portal server 3 via the communication control section 72 and the network interface 73.

At step SP21, the control section 50 of the portal server 3 receives the authentication ticket confirmation request signal, the authentication ticket, and the like from the music data delivery server SV1 via the network interface 53 and the communication control section 52. The control section 50 of the portal server 3 then supplies the authentication ticket confirmation request signal, the authentication ticket, and the like to the authentication processing section 56.

In response to the authentication ticket confirmation request signal, the authentication processing section 56 under the control of the control section 50 performs a confirmation process to confirm the authentication ticket received from the music data delivery server SV1. In the confirmation process, the authentication processing section 56 compares the authentication ticket and the like from the music data delivery server SV1 with those temporarily stored in the authentication information storage section 57.

If a result of the confirmation by the authentication processing section 56 shows a fact that the authentication ticket and the like from the music data delivery server SV1 are legitimate, the control section 50 transmits confirmation result information to the music data delivery server SV1 via the communication control section 52 and the network interface 53. In this case, the confirmation result information shows that the authentication ticket and the like are legitimate.

At step SP22, the control section 70 of the music data delivery server SV1 receives the confirmation result information from the portal server 3 via the network interface 73 and the communication control section 72, and then supplies the confirmation result information to the authentication processing section 75.

In response to the confirmation result information, the authentication processing section 75 under the control of the control section 70 issues the service session ID information (i.e. the server authentication result information) for the communication connection currently maintained between the client terminal 2 and the music data delivery server SV1, and the like. The authentication processing section 75 then temporarily stores the issued service session ID information and the like in the authentication information storage section 77.

The control section 70 transmits the service session ID information and the like issued to the client terminal 2 by the authentication processing section 75 to the client terminal 2 via the communication control section 72 and the network interface 73.

At step SP23, the control section 23 of the client terminal 2 receives the service session ID information and the like from the music data delivery server SV1 via the network interface 33 and the communication control section 32, and then temporarily stores the service session ID information and the like in the authentication information storage section 38 using the authentication processing section 37.

Therefore, the control section 23 transmits a page information acquisition request signal, which requests the music-data-distribution page information, the service session ID information and the like to the music data delivery server SV1 via the communication control section 32 and the network interface 33. The service session ID information was received from the music data delivery server SV1 and then temporarily stored in the authentication information storage section 38.

At step SP24, the control section 70 of the music data delivery server SV1 receives the page information acquisition request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77. The information temporarily stored in the authentication information storage section 77 was issued to the client terminal 2 by the process of step SP22 described above.

If a result of the authentication shows a fact that a user of the client terminal 2 is legitimate, the authentication processing section 75 determines that the request for music-data-distribution page information from the client terminal 2 is legitimate. For example, when the service session ID information and the like from the client terminal 2 have not expired yet, the result of the authentication shows the fact that a user of the client terminal 2 is legitimate.

Then, the control section 70 proceeds to step SP25, as a user of the client terminal 2 is authenticated as a legitimate user by the authentication processing section 75.

At step SP25, the control section 70 reads out the music-data-distribution page information, which is requested by a user, from the page information storage section 76. The control section 70 also extends the period of validity of the service session ID information and the like issued to the client terminal 2 through the authentication processing section 75.

The control section 70 subsequently transmits the music-data-distribution page information read from the page information storage section 76, the service session ID information having its period of validity extended by the authentication processing section 75, and the like to the client terminal 2 via the communication control section 72 and the network interface 73.

At step SP26, the control section 23 of the client terminal 2 receives the music-data-distribution page information, the service session ID information having its period of validity extended, and the like from the music data delivery server SV1 via the network interface 33 and the communication control section 32. The control section 23 of the client terminal 2 then supplies the music-data-distribution page information to the page information generation section 36. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their periods of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored by the process of above-noted step SP23 are updated to those having their period of validity extended.

The page information generation section 36 generates video data based on the music-data-distribution page information, and then supplies the video data to the display control section 24.

The display control section 24 performs digital-to-analog conversion to the video data supplied from the page information generation section 36 to generate an analog video signal. The display control section 24 then supplies the analog video signal to the display section 25. The display section 25 displays an image of the music-data-distribution page based on the analog video signal.

(1-7-3) Music Related Service Provision Processes

After completing the user authentication process (FIG. 9) between the client terminal 2 and the music data delivery server SV1, the client terminal 2 and the product sales server SV2, or the client terminal 2 and the radio broadcast information delivery server SV3, the music related service provision process is executed. With reference to FIG. 10 through FIG. 13, the music related service provision process will be described in the following situation: the client terminal 2 receives a music data distribution service through the music-data-distribution page information obtained during the user authentication process from the music data delivery server SV1; the client terminal 2 receives a sales service through the package-media-sales page information obtained during the user authentication process from the product sales server SV2; and the client terminal 2 receives a radio broadcast information distribution service through the on-air-list-information-distribution page information obtained during the user authentication process from the radio broadcast information delivery server SV3.

(1-7-3-1) Music Data Distribution Service Provision Process

Figure 10:
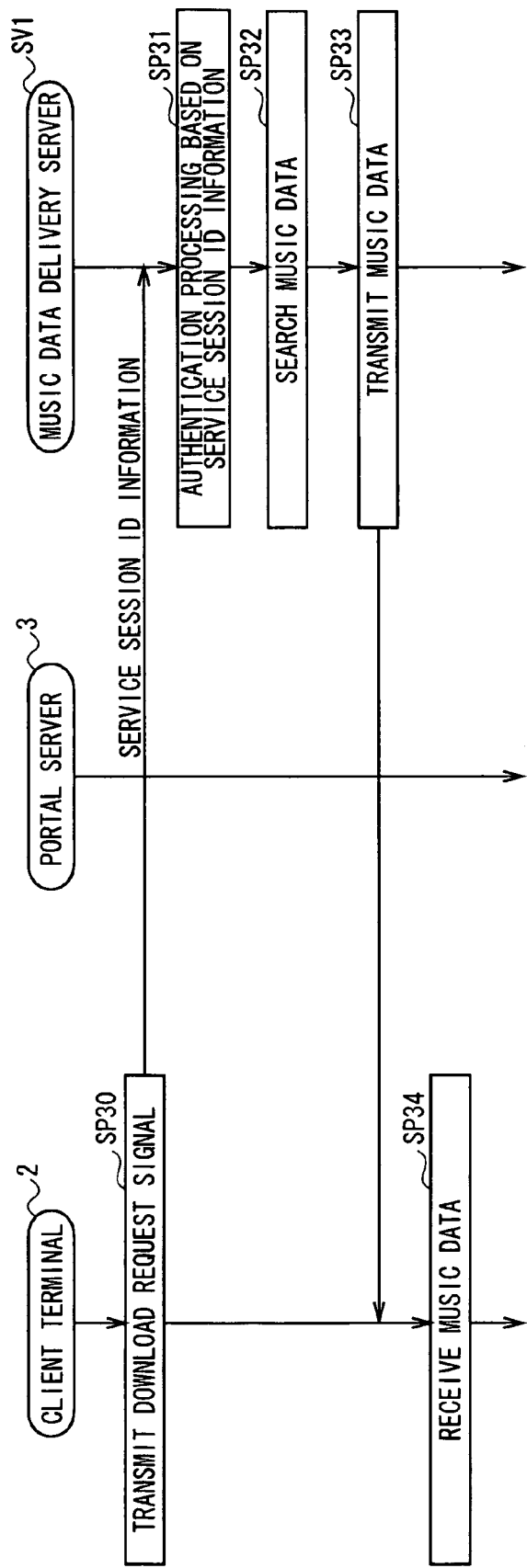
FIG. 10 is a sequence chart showing a music data distribution service provision process.

Referring to FIG. 10, the music data distribution service provision process will be described. In the music data distribution service provision process, the client terminal 2 receives the music data distribution service from the music data delivery server SV1.

At step SP30, if a control command which selects part of the music-data-distribution page displayed as images on the display section 25 is input through the input processing section 21, the control section 23 of the client terminal 2 generates a download request signal, which requests a download of music data a user wants to download.

The control section 23 then transmits the download request signal, the service session ID information, and the like to the music data delivery server SV1 via the communication control section 32 and the network interface 33. The service session ID information was issued by the music data delivery server SV1 and then temporarily stored in the authentication information storage section 38.

At step SP31, the control section 70 of the music data delivery server SV1 receives the download request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77.

If the authentication processing section 75 authenticates a user as a legitimate user, the control section 70 proceeds to step SP32. In this case, the user has requested a download of music data through the client terminal 2.

At step SP32, the retrieval section 79 performs a search process based on a retrieval key in the download request signal. In the search process, the retrieval section 79 searches a plurality of music data stored in the music data storage section 78 for the music data which corresponds to a retrieval condition indicated by the retrieval key and is the one the user wants to download.

When the retrieval section 79 has the music data found, the control section 70 extends the period of validity of the service session ID information and the like issued to the client terminal 2 using the authentication processing section 75, and then proceeds to step SP33.

At step SP33, the control section 70 reads the music data, which the user wants to download and is found by the retrieval section 79, from the music data storage section 78. The control section 70 then transmits the music data, the service session ID information having its period of validity extended by the authentication processing section 75, and the like to the client terminal 2 via the communication control section 72 and the network interface 73.

At step SP34, the control section 23 of the client terminal 2 receives the music data, which the user wants to download, the service session ID information having its period of validity extended, and the like from the music data delivery server SV1 via the network interface 33 and the communication control section 32. The control section 23 of the client terminal 2 then stores the music data in the storage medium 29. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their period of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

As described above, the client terminal 2 is capable of downloading the music data, which a user wants to acquire, using the music data distribution service provided by the music data delivery server SV1.

(1-7-3-2) Product Sales Service Provision Process

Figure 11:
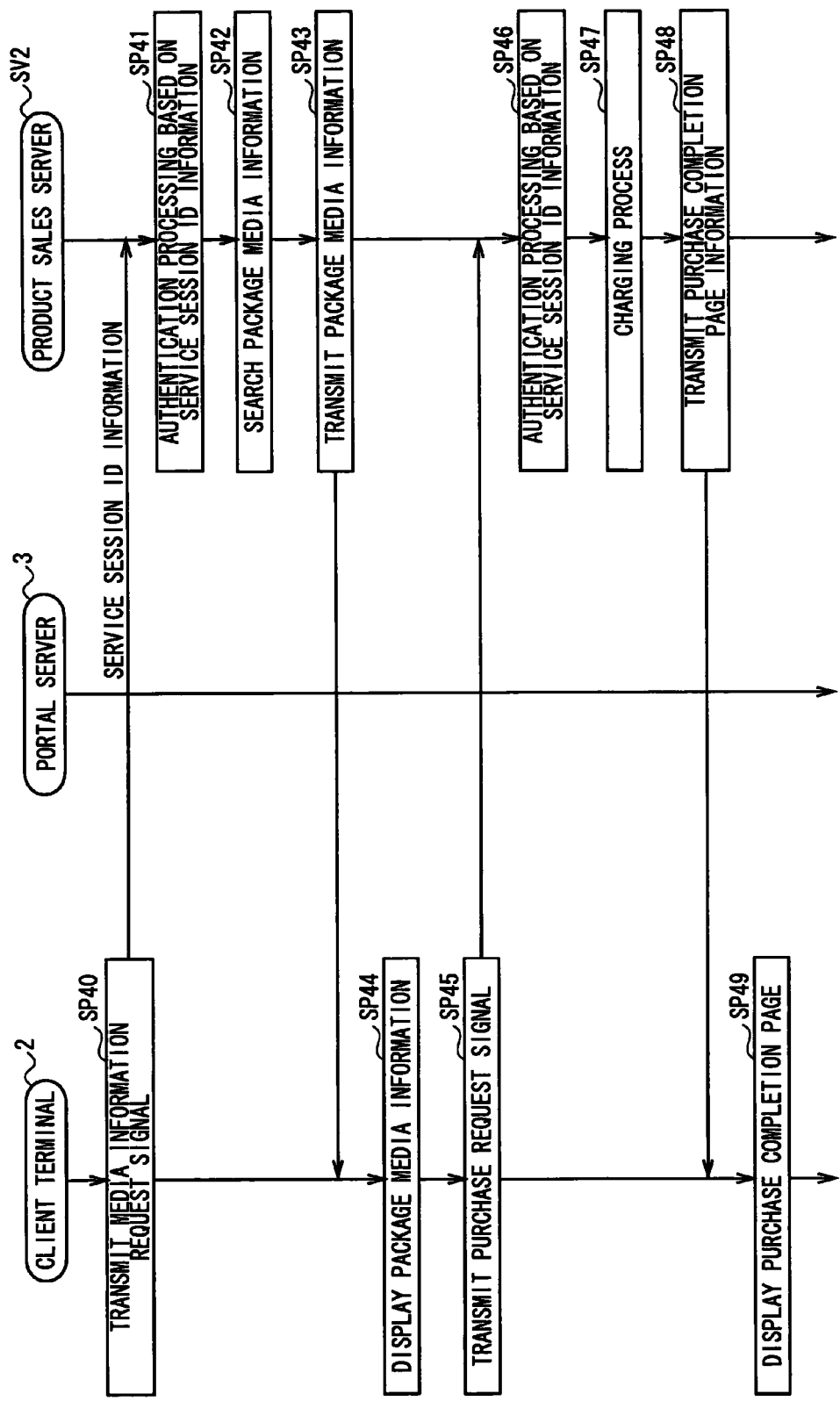
FIG. 11 is a sequence chart showing a product sales service provision process.

Referring to FIG. 11, the product sales service provision process will be described. In the product sales service provision process, the client terminal 2 receives a product sales service from the product sales server SV2.

At step SP40, if a control command which selects part of the package-media-sales page information displayed as an image on the display section 25 is input through the input processing section 21, the control section 23 of the client terminal 2 generates a media information request signal. The media information request signal requests package media information relating to a specific package media corresponding to the control command.

The control section 23 then transmits the media information request signal, the service session ID information and the like to the product sales server SV2 via the communication control section 32 and the network interface 33. The service session ID information was issued by the product sales server SV2 and then temporarily stored in the authentication information storage section 38.

At step SP41, the control section 90 of the product sales server SV2 receives the media information request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

If the authentication processing section 95 authenticates a user as a legitimate user, the control section 90 proceeds to step SP42. In this case, the user has requested the package media information relating to the package media using the client terminal 2.

At step SP42, the retrieval section 99 performs, based on a retrieval key in the media information request signal, a search process. In the search process, the retrieval section 99 searches a plurality of pieces of package media information stored in the package media information storage section 98 for a certain piece of package media information corresponding to a retrieval condition indicated by the retrieval key.

When the retrieval section 99 has the piece of package media information found, the control section 90 extends the period of validity of the service session ID information and the like issued to the client terminal 2 through the authentication processing section 95, and then proceeds to step SP43.

At step SP43, the control section 90 reads out the package media information, which was found by the retrieval section 99, from the package media information storage section 98. The control section 90 then transmits the package media information, the service session ID information having its period of validity extended by the authentication processing section 95, and the like to the client terminal 2 via the communication control section 92 and the network interface 93.

At step SP44, the control section 23 of the client terminal 2 receives the package media information, the service session ID information having its period of validity extended, and the like from the product sales server SV2 via the network interface 33 and the communication control section 32, and then supplies the package media information to the page information generation section 36. The control section 23 of the client terminal 2 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the package media information supplied from the control section 23, video data. The page information generation section 36 then transforms the video data into an analog video signal through the display control section 24, and then supplies the analog video signal to the display section 25.

After the display section 25 starts to display an image of the package media information based on the analog video signal, the control section 23 proceeds to step SP45.

At step SP45, if a control command that requests a purchase of the package media corresponding to the package media information displayed as an image on the display section 25 is input through the input processing section 21, the control section 23 generates, in response to the control command, a purchase request signal which requests the purchase of the package media.

The control section 23 then transmits the purchase request signal, the service session ID information having its period of validity extended, and the like to the product sales server SV2 via the communication control section 32 and the network interface 33. The service session ID information was received from the product sales server SV2 and then temporarily stored in the authentication information storage section 38.

At step SP46, the control section 90 of the product sales server SV2 receives the purchase request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

As a result, if the authentication processing section 95 authenticates the user, who requests the purchase of the package media through the client terminal 2, as a legitimate user, the control section 90 proceeds to step SP47.

At step SP47, the control section 90 performs a product sales process. In the product sales process, the control section 90 executes a procedure to deliver the requested package media to the user of the client terminal 2. The control section 90 also transmits fee-charging information to the fee-charging server SV6 via the communication control section 92 and the network interface 93. The fee-charging information is used to charge the user a fee for the purchased package media. Therefore, the fee-charging server SV6 performs a fee-charging process to charge the user a fee for the purchased package media.

The control section 90 also extends the period of validity of service session ID information and the like issued to the client terminal 2 using the authentication processing section 95.

At step SP48, after completing the fee-charging process, the control section 90 transmits purchase completion page information showing a completion of the purchase of package media, the service session ID information having its period of validity extended by the authentication processing section 95, and the like to the client terminal 2 via the communication control section 92 and the network interface 93.

At step SP49, the control section 23 of the client terminal 2 receives the purchase completion page information, the service session ID information having its period of validity extended, and the like from the product sales server SV2 via the network interface 33 and the communication control section 32, and then supplies the purchase completion page information to the page information generation section 36. The control section 23 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the purchase completion page information supplied from the control section 23, video data. The page information generation section 36 subsequently transforms the video data into an analog video signal through the display control section 24, and then supplies the analog video signal to the display section 25.

Therefore, the control section 23 can display, based on the analog video signal, an image of the purchase completion page on the display section 25.

As described above, the client terminal 2 allows a user to purchase the package media he/she wants using the sales services provided by the product sales server SV2.

(1-7-3-3) On-Air-List Information Distribution Service Provision Process

Figure 12:
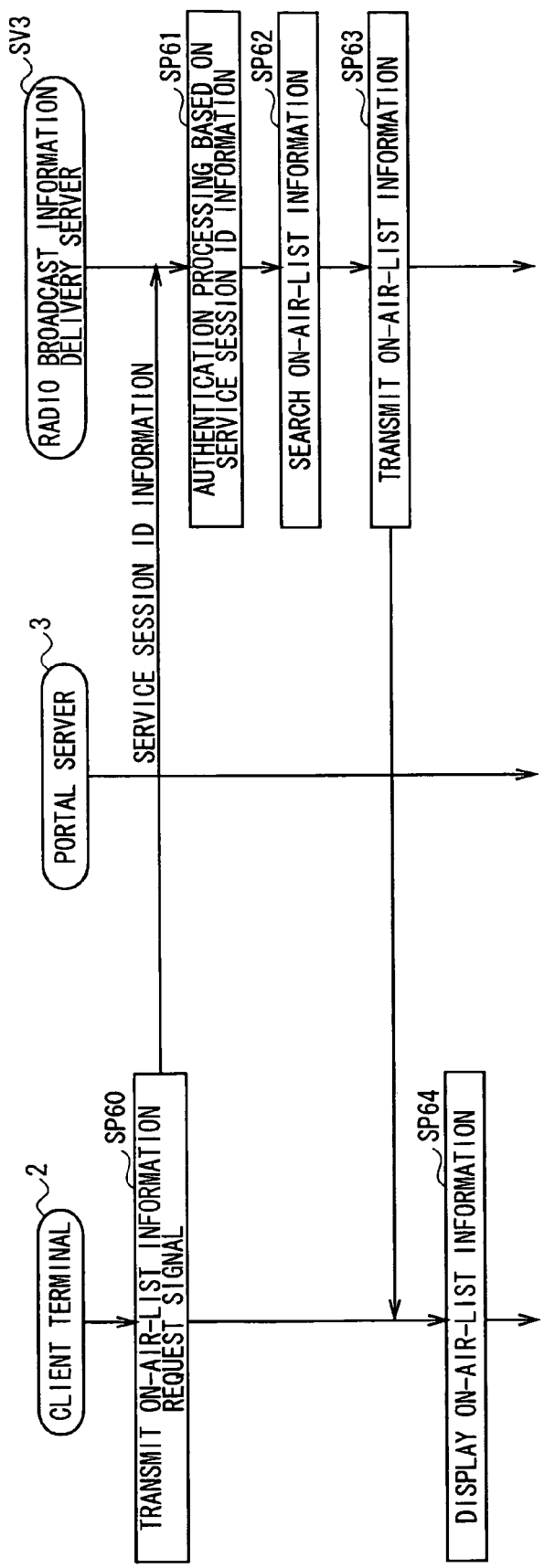
FIG. 12 is a sequence chart showing a radio broadcast information (on-air list information) distribution service provision process (1).

With reference to FIG. 12, a radio broadcast information distribution service provision process will be described. In the radio broadcast information distribution service provision process, the client terminal 2 receives especially an on-air-list information distribution service as the radio broadcast information distribution service from the radio broadcast information delivery server SV3.

At step SP60, a user input a retrieval key in an input box disposed on the on-air-list-information-distribution page displayed as an image on the display section 25. The retrieval key, which is used to retrieve the on-air-list information, is a character string corresponding to the on-air-list information the user wants to obtain. At this time, a control command corresponding to the character string is input through the input processing section 21. The control section 23 of the client terminal 2 generates, based on the control command input, an on-air-list information request signal which requests a download of the on-air-list information the user wants to obtain.

The control section 23 then transmits the on-air-list information request signal, the service session ID information temporarily stored in the authentication information storage section 38, and the like to the radio broadcast information delivery server SV3 via the communication control section 32 and the network interface 33. The service session ID information was issued by the radio broadcast information delivery server SV3.

At step SP61, the control section 110 of the radio broadcast information delivery server SV3 receives the on-air-list information request signal, the service session ID information and the like from the client terminal 2 via the network interface 113 and the communication control section 112, and then supplies the service session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user, who requests the on-air-list information using the client terminal 2, as a legitimate user, the control section 110 proceeds to step SP62.

At step SP62, the retrieval section 118 performs, based on the retrieval key in the on-air-list information request signal, a search process in which the retrieval section 118 searches the whole on-air-list information in the on-air-list information storage section 117 for a certain part of the on-air-list information which meets a retrieval condition indicated by the retrieval key to obtain the desired on-air-list information.

When the retrieval section 118 has the on-air-list information found, the control section 110 extends the period of validity of the service session ID information and the like issued to the client terminal 2 through the authentication processing section 115. The control section 110 then proceeds to step SP63.

At step SP63, the control section 110 reads out the on-air-list information, which was found by the retrieval section 118, from the on-air-list information storage section 117. The control section 110 then transmits the on-air-list information, the service session ID information having its period of validity extended by the authentication processing section 115, and the like to the client terminal 2 via the communication control section 112 and the network interface 113.

At step SP64, the control section 23 of the client terminal 2 receives the on-air-list information, the service session ID information having its period of validity extended, and the like from the radio broadcast information delivery server SV3 via the network interface 33 and the communication control section 32, and then supplies the on-air-list information to the page information generation section 36. The control section 23 of the client terminal 2 also supplies the service session ID information and the like received from the radio broadcast information delivery server SV3 to the authentication processing section 37.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the on-air-list information supplied from the control section 23, video data. The page information generation section 36 then transforms the video data into an analog video signal through the display control section 24, and then supplies the analog video signal to the display section 25. The display section 25 therefore displays, based on the analog video signal, an image or the on-air-list information.

As described above, the client terminal 2 allows a user to obtain the desired on-air-list information using the radio broadcast information distribution service provided by the radio broadcast information delivery server SV3.

(1-7-3-4) Now-On-Air Information Distribution Service Provision Process

Figure 13:
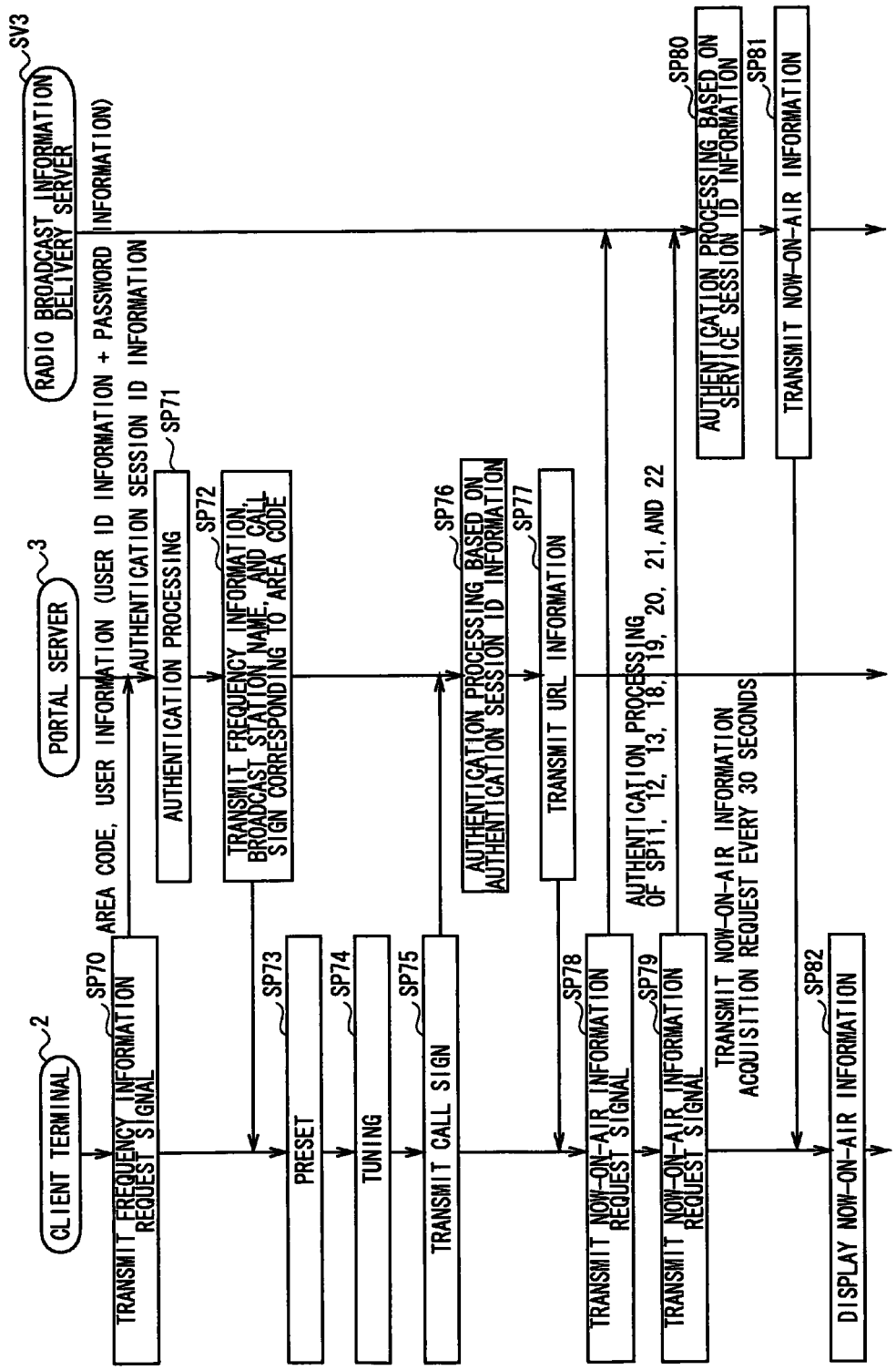
FIG. 13 is a sequence chart showing a radio broadcast information (now-on-air information) distribution service provision process (2).

Referring to FIG. 13, the radio broadcast information distribution service provision process will be described. In the radio broadcast information distribution service provision process, the client terminal 2 receives especially the now-on-air information distribution service as the radio broadcast information distribution service from the radio broadcast information delivery server SV3.

There is a plurality of radio broadcast information delivery servers SV3 providing the now-on-air information, each of which corresponds to a different radio station (call sign).

At initial state, the client terminal 2 may not store the URL-information of those radio broadcast information delivery servers SV3 corresponding to radio stations.

With the radio broadcast information distribution service provision process described below, the following describes a situation in which the portal server 3 manages the URL information of each radio broadcast information delivery server SV3. Specifically, in this case, the portal server 3 manages a plurality of pieces of URL information, each of which corresponds to a call sign of a radio station.

In addition, with the radio broadcast information distribution service provision process described below, the client terminal 2 does not have the authentication session ID information and the like temporarily stored in the authentication information storage section 38, when requesting frequency information from the portal server 3 to automatically preset broadcast frequencies of radio stations. The frequency information includes the broadcast frequencies. In this case, first of all the client terminal 2 transmits the user ID information, the password information, and the like to the portal server 3.

At step SP70, if an operation command which requests an auto-preset of broadcast frequencies of radio stations is input through the input processing section 21, the control section 23 of the client terminal 2 transmits a frequency information request signal, an area code input by a user, the user ID information and password information stored in the authentication information storage section 38, and the like to the portal server 3 via the communication control section 32 and the network interface 33. The frequency information request signal requests the frequency information about broadcast frequencies of radio stations from which the client terminal 2 can receive their broadcasts.

At step SP71, the control section 50 of the portal server 3 receives the frequency information request signal, the area code, the user ID information, the password information and the like from the client terminal 2 via the network interface 53 and the communication control section 52, and then supplies the user ID information and the password information received from the client terminal 2 to the authentication processing section 56.

The authentication processing section 56 under the control of the control section 50 performs a user authentication process. In the user authentication process, the authentication processing section 56 compares the user ID information, the password information and the like received from the client terminal 2 with the customer information registered in the customer database section 54.

As a result, if the authentication processing section 56 authenticates a user of the client terminal 2 as a legitimate user, the authentication processing section 56 determines that the request for frequency information from the client terminal 2 is legitimate. Therefore, the authentication processing section 56 under the control of the control section 50 issues authentication session ID information and the like. The authentication session ID information identifies the communication connection currently maintained between the client terminal 2 and the portal server 3. The authentication processing section 56 then temporarily stores the authentication session ID information and the like in the authentication information storage section 57.

The control section 50 subsequently proceeds to step SP72, as the authentication processing section 56 authenticates the user as a legitimate user.

At step SP72, the control section 50 retrieves, based on the area code from the client terminal 2, the frequency information, radio station names and call signs corresponding to the area code from a list which is stored in the frequency information storage section 58 and includes a plurality of pieces of frequency information, radio station names and call signs. The control section 50 then reads out the retrieved frequency information, radio station names and call signs in list format.

The control section 50 subsequently transmits the frequency information, radio station names and call signs read from the frequency information storage section 58 in list format, along with the authentication session ID information and the like, to the client terminal 2 via the communication control section 52 and the network interface 53. The authentication session ID information was issued to the client terminal 2 by the authentication processing section 56 at above-noted step SP71.

At step SP73, the control section 23 of the client terminal 2 receives the list, which includes the frequency information, the radio station names and the call signs, from the portal server 3 via the network interface 33 and the communication control section 32. The control section 23 of the client terminal 2 also receives the authentication session ID information and the like from the portal server 3 via the network interface 33 and the communication control section 32. The control section 23 of the client terminal 2 then supplies the authentication session ID information and the like received from the portal server 3 to the authentication processing section 37. The control section 23 of the client terminal 2 also supplies the list, which includes the frequency information, the radio station names and the call signs, to the display control section 24.

The authentication processing section 37 under the control of the control section 23 temporarily stores the authentication session ID information and the like received from the portal server 3 in the authentication information storage section 38.

The display control section 24 supplies the list, which includes the frequency information, the radio station names and the call signs, to the display section 25. The display section 25 therefore displays the list.

At this time, based a selection command input through the input processing section 21, the control section 23 stores the selected frequency information, radio station name and call sign in the storage medium 29 as a preset, and then proceeds to step SP74.

At step SP74, in response to a tuning control command input through the input processing section 21, the control section 23 controls, based on the tuning control command input, the tuner section 31 to extract, from radio waves, a radio broadcast signal of a radio broadcast transmitted in a broadcast frequency corresponding to the tuning control command.

The tuner section 31 therefore extracts the radio broadcast signal in the broadcast frequency from the radio waves received by the broadcast signal reception section 30. The tuner section 31 then performs a prescribed reception process such as decoding to generate audio data, and then supplies the audio data to the audio control section 26.

The audio control section 26 therefore transforms the audio data supplied from the tuner section 31 into an analog audio signal, and supplies the analog audio signal to the speaker 27 which then outputs audio of the selected radio program.

At step SP75, the radio broadcasting display control section 39 under the control of the control section 23 reads a call sign from the storage medium 29. In this case, the call sign stored in the storage medium 29 has been associated with the frequency information showing the broadcast frequency corresponding to the above-noted tuning control command. The radio broadcasting display control section 39 then transmits the call sign, the authentication session ID information temporarily stored in the authentication information storage section 38, and the like to the portal server 3 via the communication control section 32 and the network interface 33.

At step SP76, the control section 50 of the portal server 3 receives the call sign, the authentication session ID information and the like from the client terminal 2 via the network interface 53 and the communication control section 52, and supplies the authentication session ID information and the like to the authentication processing section 56.

The authentication processing section 56 under the control of the control section 50 performs a user authentication process. In the user authentication process, the authentication processing section 56 compares the authentication session ID information and the like received from the client terminal 2 with those temporarily stored in the authentication information storage section 57.

As a result, if the authentication processing section 56 authenticates the user, who transmits the call sign using the client terminal 2, as a legitimate user, the control section 50 proceeds to step SP77. In this case, since the authentication session ID information and the like received from the client terminal 2 have not expired yet, the authentication processing section 56 authenticates the user as a legitimate user.

At step SP77, the control section 50 performs, based on the call sign from the client terminal 2, a retrieving process in which the control section 50 retrieves a piece of URL information corresponding to the call sign from among a plurality of pieces of URL information stored in the URL storage section 59.

The control section 50 also extends the period of validity of the authentication session ID information and the like issued to the client terminal 2 using the authentication processing section 56.

The control section 50 subsequently reads the retrieved URL information from the URL storage section 59, and then transmits the URL information, the authentication session ID information having its period of validity extended by the authentication processing section 56, and the like to the client terminal 2 via the communication processing section 52 and the network interface 53.

At step SP78, the control section 23 of the client terminal 2 receives the URL information, the authentication session ID information having its period of validity extended, and the like from the portal server 3 via the network interface 33 and the communication control section 32, and then supplies the authentication session ID information and the like to the authentication processing section 37. The control section 23 of the client terminal 2 also supplies the URL information to the radio broadcasting display control section 39.

The authentication processing section 37 under the control of the control section 23 temporarily stores the authentication session ID information and the like in the authentication information storage section 38. The authentication session ID information and the like, which have their period of validity extended, were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored are updated to those having their period of validity extended.

The radio broadcasting display control section 39 under the control of the control section 23 associates the URL information supplied from the control section 23 with the call sign stored in the storage medium 29, and then temporarily stores them in the storage medium 29 or the like.

Then, the radio broadcasting display control section 39 under the control of the control section 23 transmits a now-on-air information request signal which requests now-on-air information, the service session ID information temporarily stored in the authentication information storage section 38, and the like to the radio broadcast information delivery server SV3 via the communication control section 32 and the network interface 33. In this case, the radio broadcasting display control section 39 transmits, based on the URL information temporarily stored in the storage medium 29 or the like, the now-on-air information request signal. The service session ID information stored in the authentication information storage section 38 was received from the radio broadcast information delivery server SV3.

By the way, in the radio broadcast information distribution service provision process, the process of step SP78 corresponds to the process of step SP10 in FIG. 9. In the process of step SP78, the now-on-air information request signal, the service session ID information and the like are transmitted from the client terminal 2 to the radio broadcast information delivery server SV3.

Accordingly, in the radio broadcast information distribution service provision process, after the process of step SP78, the client terminal 2, the radio broadcast information delivery server SV3 and the portal server 3 performs the same user authentication process as the one made up of step SP11 through SP13 and step SP18 through SP22, and then proceed to step SP79. By the way, the processes of step SP11 through SP13 and step SP18 through SP22 are illustrated in FIG. 9.

At step SP79, the radio broadcasting display control section 39 of the client terminal 2 under the control of the control section 23 re-transmits, based on the URL information temporarily stored in the storage medium 29 or the like, the now-on-air information request signal, the service session ID information temporarily stored in the authentication information storage section 38, and the like to the radio broadcast information delivery server SV3 via the communication control section 32 and the network interface 33. The service session ID information, which was temporarily stored in the authentication information storage section 38, was received from the radio broadcast information delivery server SV3.

At step SP80, the control section 110 of the radio broadcast information delivery server SV3 receives the now-on-air information request signal, the service session ID information and the like from the client terminal 2 via the network interface 113 and the communication control section 112, and then supplies the received authentication session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user of the client terminal 2 as a legitimate user, the authentication processing section 115 determines that the request for now-on-air information from the client terminal 2 is legitimate.

After the authentication processing section 115 authenticates the user of the client terminal 2 as a legitimate user, the control section 110 extends the period of validity of the service session ID information and the like issued to the client terminal 2 through the authentication processing section 115, and then proceeds to step SP81.

At step SP81, the control section 110 reads now-on-air information from the now-on-air information storage section 119, and then transmits the now-on-air information, the service session ID information having its period of validity extended by the authentication processing section 115, and the like to the client terminal 2 via the communication control section 112 and the network interface 113.

At step SP82, the control section 23 of the client terminal 2 receives the now-on-air information, the service session ID information having its period of validity extended and the like from the radio broadcast information delivery server SV3 via the network interface 33 and the communication control section 32, and then supplies the service session ID information and the like to the authentication processing section 37. The control section 23 of the client terminal 2 also supplies the now-on-air information to the radio broadcasting display control section 39.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The radio broadcasting display control section 39 supplies the now-on-air information supplied from the control section 23 to the display section 25 via the display control section 24. The display section 25 therefore displays the now-on-air information relating to the radio program currently received.

After that, in the radio broadcast information distribution service provision process, the client terminal 2 repeats a request process of now-on-air information (step SP79) at a certain interval of time. When receiving the request from the client terminal 2, the radio broadcast information delivery server SV3 sequentially performs the process of step SP80 and SP81.

In this manner, the client terminal 2 can update the now-on-air information displayed on the display section 25 every second. The now-on-air information includes the following items: a title of a radio program currently received by the client terminal 2; a start time of the radio program; an end time of the radio program; an artist name and title of music currently played in the radio program; and a start time of the broadcast of the music.

(1-8) Hardware Circuit Block Configuration of Client Terminal 2

(1-8-1) Circuit Configuration

The hardware configuration of the client terminal 2 will be described using hardware circuit blocks. In the hardware configuration of the client terminal 2 with the hardware circuit blocks, a part of capabilities of the client terminal 2 is a process performed by software modules as described below.

Figure 14:
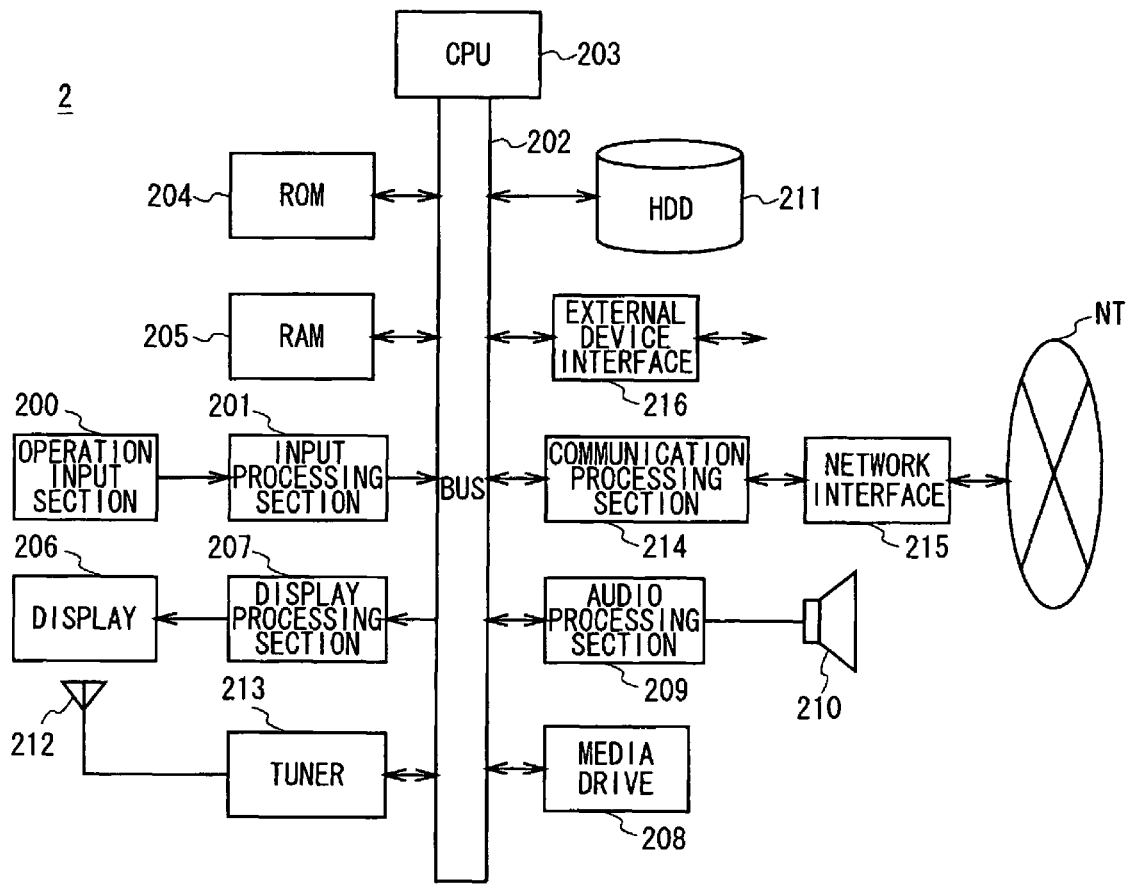
FIG. 14 is a block diagram showing the hardware configuration of a client terminal using hardware circuit blocks.

Referring to FIG. 14, the client terminal 2 has an operation input section 200 on its housing or a remote control (not shown). The operation input section 200 provides various operation buttons. When a user operates the operation input section 200, the operation input section 200 detects the operation and then supplies an operation input signal corresponding to the operation to an input processing section 201.

The input processing section 201 performs a prescribed process to the supplied operation input signal to transform the operation input signal into an operation command. The input processing section 201 then supplies the operation command via a bus 202 to a CPU (Central Processing Unit) 203.

A ROM (Read Only Memory) 204 previously has stored various programs, such as a basic program and an application program. The CPU 203 reads these programs from the ROM 204 via the bus 202, and loads these programs onto a RAM (Random Access Memory) 205. The CPU 203 takes overall control of the client terminal 2 based on the programs, and performs, in response to the operation command supplied from the input processing section 201, a prescribed computation process and various processes.

For example, a display 206 is a display device such as a liquid crystal display. The display 206 may be directly or externally disposed on the housing.

A result of process by the CPU 203 and various video data are supplied to the display 206 via a display processing section 207 as an analog video signal. The display 206 displays an image based on the analog video signal.

For example, CDs and "MEMORY STICK (Registered Trademark of Sony Corporation)" store content data. The MEMORY STICK includes a flash memory covered with an exterior case. A media drive 208, for example, reads the content data from the CD and the "MEMORY STICK (Registered Trademark of Sony Corporation)", and then plays back the content data. Alternatively, the media drive 208 records the content data, which is to be recorded, on the CD or the "MEMORY STICK (Registered Trademark of Sony Corporation)".

When the media drive 208 reads video data (content data) from the CDs or the "MEMORY STICK (Registered Trademark of Sony Corporation)", the media drive 208 supplies the video data to the display processing section 207 via the bus 202.

When the media drive 208 reads audio data (content data) from the CDs or "MEMORY STICK (Registered Trademark of Sony Corporation)", the media drive 208 supplies the audio data to an audio processing section 209.

The display processing section 207 performs digital-to-analog conversion to the video data, which was supplied via the bus 202, to generate an analog video signal. The display processing section 207 then supplies the analog video signal to the display 206. The display 206 displays an image based on the analog video signal.

The audio processing section 209 performs digital-to-analog conversion to the audio data, which was supplied via the bus 202, to generate an analog audio signal. The audio processing section 209 then supplies the analog audio signal to a 2-channel speaker 210 which therefore outputs sound on stereo based on the analog audio signal.

In addition, the CPU 203 is able to supply the content data read by the media drive 208 via the bus 202 to a hard disk drive 211. The hard disk drive 211 stores the content data as content files.

The CPU 203 manages the content data stored in the hard disk drive 211 using the directory configuration illustrated by FIG. 3.

Also, the CPU 203 is capable of reading the content files from the hard disk drive 211 as content data.

When the CPU 203 reads video data (content data) from the hard disk drive 211, the CPU 203 supplies the video data to the display processing section 207 via the bus 202.

When the CPU 203 reads audio data (content data) from the hard disk drive 211, the CPU 203 supplies the audio data to the audio processing section 209.

An antenna 212 receives radio broadcast waves from radio stations. The antenna 212 then supplies the radio broadcast waves to a tuner 213 equivalent to an AM/FM tuner.

For example, a user selects a certain radio station through the operation input section 200. The tuner 213 under the control of the CPU 203 extracts, from the radio broadcast waves received by the antenna 212, a radio broadcast signal of the broadcast frequency corresponding to the selected radio station. The tuner 213 then performs a prescribed reception process to the radio broadcast signal to generate audio data, and then supplies the audio data via the bus 202 to the audio processing section 209.

The audio processing section 209 transforms the audio data supplied from the tuner 213 into an analog audio signal, and then supplies the analog audio signal to the speaker 210 which therefore outputs sound of a radio program broadcast from a radio station. This allows a user to listen to sound of the radio program.

The CPU 203 also may supply the audio data obtained by the tuner 213 to the hard disk drive 211 to record them on the hard disk drive 211. In this manner, the CPU 203 is able to record sound of radio programs.

The CPU 203 connects with a network NT via a communication processing section 214 and a network interface 215. The CPU 203 therefore can access the portal server 3 and other servers SV1 through SV5 on the network NT, and interchange various data with the portal server 3 and other servers SV1 through SV5.

The CD includes a music data storage area and a control data storage area on its data storage surface. One or more music data are recorded on the music data storage area. Control data called TOC (Table Of Contents) to be used to control music data on the music data storage area are recorded on the control data storage area. The control data include information about playing time of each piece of music, an order of playback, and start positions of each piece of music recorded on the music data storage area.

Therefore, for example, when the CPU 203 records music data, which is read from a CD as described above, in the hard disk of the hard disk drive 211, the CPU 203 controls the media drive 208 to read out the control data from the CD. Based on the control data, the CPU 203 produces CD identification information to be used to identify the CD. The CPU 203 then sends the CD identification information to the disc information provision server SV5 through the communication processing section 214, the network interface 215, and the network NT.

In response to that, disk information corresponding to the CD identification information is supplied from the disc information provision server SV5 through the network NT. The CPU 203 receives the disk information through the network interface 215 and the communication processing section 214. The CPU 203 then registers the disc information in a music management database which was previously installed in the hard disk.

The CPU 203 then associates the disc information, which has been registered in the music management database, with the music data, which can be identified by the disk information, in the hard disk (the music data stored in the hard disk were read from the CD). Therefore, based on the disc information, the CPU 203 can present the following information to a user: a name of music stored in the hard disk; an artist name of the music; a name of an album CD containing the music.

In addition, the CPU 203 accesses, through an external device interface 216, an external storage and playback device (not shown), such as a MD (Mini Disk®) player connected to the client terminal 2. Therefore, the CPU 203 reads out from the hard disk of the hard disk drive 211 the content file of music data or the like as content data, and supplies the content data to the external storage and playback device through the external device interface 216. The external storage and playback device then records the content data on a storage medium such as MD.

(1-8-2) Configuration of Program Modules

Figure 15:
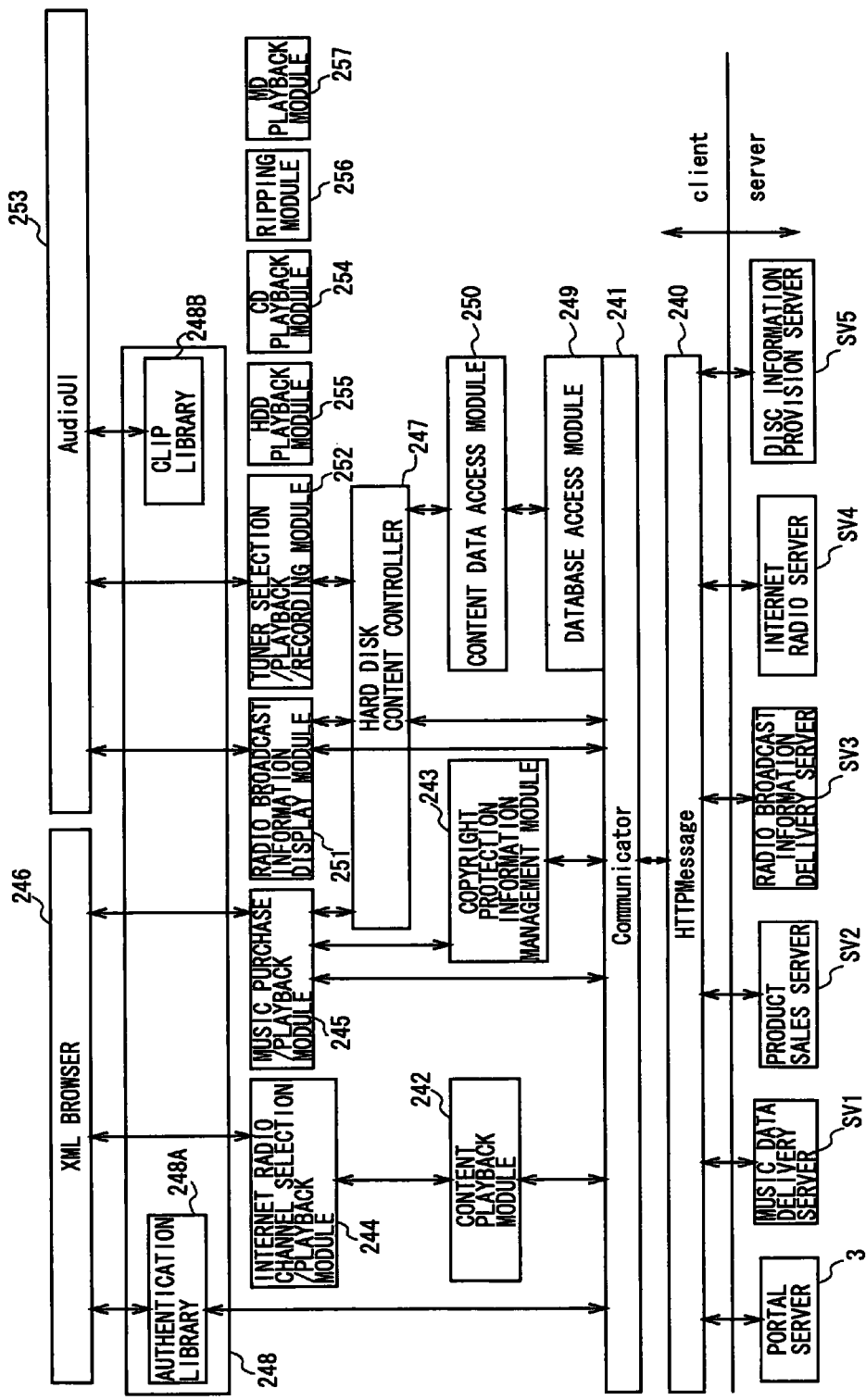
FIG. 15 is a schematic diagram showing program modules of the client terminal.

Program modules are applied to the client terminal 2 that has the hardware configuration described by the hardware circuit blocks shown in FIG. 14. As shown in FIG. 15, the program modules operate on OS, and interchanges with the portal server 3 and other servers SV1 through SV5.

A HTTP (Hyper Text Transfer Protocol) message program 240 interchanges with the portal server 3 and other servers SV1 through SV5 in HTTP communication. A communicator program 241 interchanges data with the HTTP message program 240.

A content playback module 242 and a copyright protection information management module 243 are disposed above the communicator program 241. The content playback module 242 interprets the codec of contents, and reproduces them. The copyright protection information management module 243 deals with information relating to copyright protection. An Internet radio channel selection/playback module 244 and a music purchase/playback module 245 are disposed on the content playback module 242 and the copyright protection information management module 243 respectively. The Internet radio channel selection/playback module 244 selects channels of Internet radio and plays the selected channels. The music purchase/playback module 245 controls the purchase of music and the playback of demo music.

The Internet radio channel selection/playback module 244 and the music purchase/playback module 245 perform playback process to generate audio data. The audio data is transferred to the audio processing section 209 to output audio from the speaker 210.

A XML browser 246 is disposed above the Internet radio channel selection/playback module 244 and the music purchase/playback module 245. The XML browser 246 interprets XML files received from various servers, and then displays images on the display 206.

For example, a user selects a piece of music using the XML browser 246. The music purchase/playback module 245 therefore performs purchasing processes for purchasing the piece of music. The purchased piece of music is supplied via a hard disk content controller 247 to the hard disk drive 211 to stores it on the hard disk drive 211.

The communicator program 241 connects with an authentication library 248A of a library 248. The authentication library 248A performs various kinds of authentication processes in association with the portal server 3 and the like.

A database access module 249, a content data access module 250, and the hard disk content controller 247 are disposed above the communicator program 241.

The database access module 249 accesses various kinds of databases disposed in the hard disk drive 211. The content data access module 250 accesses content data stored in the hard disk drive 211. The hard disk content controller 247 manages content data stored in the hard disk drive 211.

A radio broadcast information display module 251 and a tuner selection/playback/recording module 252 are disposed above the hard disk content controller 247. The radio broadcast information display module 251 performs processes for displaying a title and an artist name of music broadcast from radio stations. The tuner selection/playback/recording module 252 selects radio stations. The tuner selection/playback/recording module 252 also records content data (music) received from a radio station on the hard disk drive 211.

For example, a user selects a radio station using an audio user interface 253 to receive music from the radio station. The received music is supplied via the content data access module 250 to the hard disk drive 211 to stores it in the hard disk drive 211.

The tuner selection/playback/recording module 252 performs playback processes to generate audio data (content data). The audio data is supplied to the audio processing section 209 to output audio from the speaker 210.

The radio broadcast information display module 251 uses the tuner selection/playback/recording module 252 to receive radio broadcast information from the radio broadcast information delivery server SV3 via the HTTP message program 240. For example, the received radio broadcast information is now-on-air information about a title and artist name of music currently broadcast by a radio station. The radio broadcast information display module 251 then transmits the information via the audio UI (user interface) 253 to the display 206 which displays the information.

The radio broadcast information, which was transmitted via the audio user interface 253 and displayed on the display 206, may be temporarily stored in a clip library 248B of the library 248. In response to user's instruction, the radio broadcast information is finally transferred via the database access module 249 to the hard disk drive 211 to be recorded on the hard disk drive 211.

A CD playback module 254 controls the media drive 208 to play back CDs.

Audio data played back from CDs by the CD playback module 254 are transferred to the audio processing section 209 to output audio from the speaker 210.

A HDD playback module 255 connects with the hard disk content controller 247 and the copyright protection information management module 243 (the connection is not shown here).

The HDD playback module 255 under the control of the hard disk content controller 247 reads audio data (content data) from the hard disk drive 211. The HDD playback module 255 then reproduces the audio data based on copyright management information supplied from the copyright protection information management module 243.

Audio data (music data), which was played by the HDD playback module 255 based on the copyright management information, is supplied to the external storage and playback device through the external device interface 216. The external storage and playback device then records the audio data (music data) on a MD and the like.

In addition, audio data, which was played by the HDD playback module 255 based on the copyright management information, is supplied to the audio processing section 209 which then outputs audio from the speaker 210.

A ripping module 256 connects with the hard disk content controller 247 and the copyright protection information management module 243 (the connection is not shown here).

The ripping module 256 controls the CD playback module 254, the copyright protection information management module 243, and the hard disk content controller 247 to store (i.e., rip) audio data played back from CDs by the CD playback module 254 and its copyright management information in the hard disk drive 211. Specifically, the copyright management information is supplied from the copyright protection information management module 243 to control the audio data. The storage process of the audio data and copyright management information is also controlled by the hard disk content controller 247.

A MD playback module 257 controls the external storage and playback device to playback a MD.

Therefore, audio data (music data), which was played by the MD playback module 257 from the MD of the external storage and playback device, is supplied via the external device interface 216 to the audio processing section 209 which then outputs audio (music) from the speaker 210.

As for the program modules described above, the HTTP message program 240 and the communicator program 241 can provide the same function as the communication control section 32 of the client terminal 2 (FIG. 2) does.

The content playback module 242 can provide the same function as the encoder/decoder section 34 of the client terminal 2 (FIG. 2) does.

The copyright protection information management module 243 can provide the same function as the copyright management section 35 of the client terminal 2 (FIG. 2) does.

The Internet radio channel selection/playback module 244 can provide the same function as the control section 23 and audio control section 26 of the client terminal 2 (FIG. 2) do.

The music purchase/playback module 245 can provide the same function as the control section 23 and audio control section 26 of the client terminal 2 (FIG. 2) do.

The XML browser 246 can provide the same function as the input processing section 21 and page information generation section 36 of the client terminal 2 (FIG. 2) do.

The hard disk content controller 247, the database access module 249, and the content data access module 250 can provide the same function as the control section 23 of the client terminal 2 (FIG. 2) does.

The authentication library 248A of the library 248 can provide the same function as the authentication processing section 37 and the authentication information storage section 38 of the client terminal 2 (FIG. 2) do.

The clip library 248B of the library 248 can provide the same function as the control section 23 of the client terminal 2 (FIG. 2) does.

The radio broadcast information display module 251 can provide the same function as the radio broadcasting display control section 39 of the client terminal 2 (FIG. 2) does.

The tuner selection/playback/recording module 252 can provide the same function as the control section 23, audio control section 26 and tuner section 31 of the client terminal 2 (FIG. 2) do.

The audio user interface 253 can provide the same function as the input processing section 21, control section 23 and display control section 24 of the client terminal 2 (FIG. 2) do.

The CD playback module 254 can provide the same function as the audio control section 26 and external recording media recording and reproducing section 28 of the client terminal 2 (FIG. 2) do.

The HDD playback-module 255 can provide the same function as the control section 23 and audio control section 26 of the client terminal 2 (FIG. 2) do.

The ripping module 256 can provide the same function as the control section 23, external recording media recording and reproducing section 28 and encoder/decoder section 34 of the client terminal 2 (FIG. 2) do.

The MD playback module 257 can provide the same function as the audio control section 26 and external recording media recording and reproducing section 28 of the client terminal 2 (FIG. 2) do.

Accordingly, the client terminal 2 illustrated by FIG. 14 (which has the hardware configuration of hardware circuit blocks) can perform the same processes as the client terminal 2 illustrated by FIG. 2 (which has the hardware configuration of functional circuit blocks) does, as the CPU 203 performs processes based on the above-noted program modules.

In addition, the client terminal 2, which includes the hardware configuration by the hardware circuit blocks, can perform a music presentation process described below.

The client terminal 2, which includes the hardware configuration by the functional blocks, includes all the capabilities supported by the program modules installed in the client terminal 2 including the hardware configuration by the hardware circuit blocks. This means that the client terminal 2 including the hardware configuration by the functional blocks can also perform the music presentation process in the same way as the client terminal 2 including the hardware configuration by the hardware circuit blocks.

(1-9) Configuration of Portal Sever 3

Figure 16:
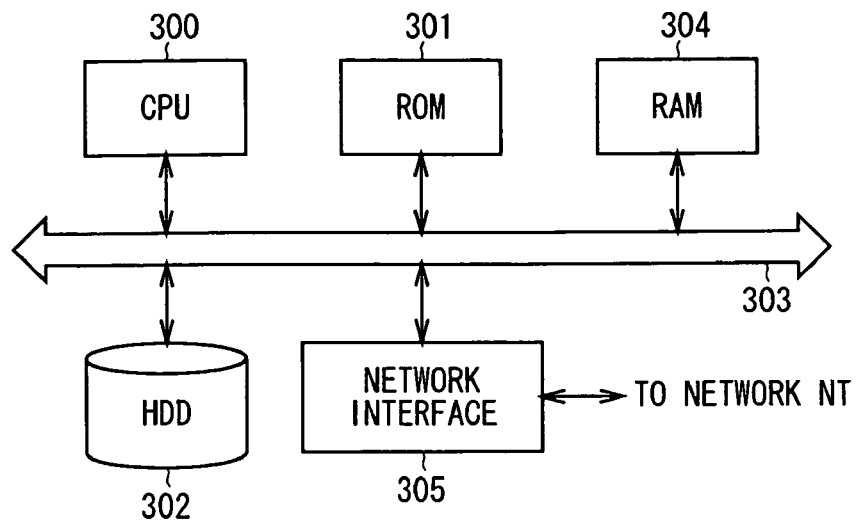
FIG. 16 is a block diagram showing the hardware configuration of the portal server using hardware circuit blocks.

With reference to FIG. 16, the hardware configuration of the portal server 3 with hardware circuit blocks will be described below. The portal server 3 includes a CPU 300 that takes overall control of the portal server 3. The CPU 300 reads out various programs such as a basic program and a content recording and holding assistance program from a ROM 301 or a hard disk drive 302, and then loads these programs onto RAM 304 through a BUS 303 to execute these programs. In this manner, the CPU 300 performs various processes such as a user authentication process.

In this case, the CPU 300 produces customer information by associating user ID information and password information of a user who is allowed to join the music related service provision system 1, and registers the customer information in a customer database which was previously installed in the hard disk of the hard disk drive 302.

When the CPU 300 receives the user ID information and password information, which are supplied from the client terminal 2 when a user tries to use a service related to music, through a network interface 305, the CPU 300 performs the user authentication process by retrieving, based on the user ID information and password information received, the customer information from the customer database in the hard disk.

As a result, after completing the user authentication process, the CPU 300 generates portal authentication result information where a result of the user authentication process is shown, and transmits the portal authentication result information to the client terminal 2 via the network interface 305.

(1-10) Configuration of Music Data Delivery Server

Figure 17:
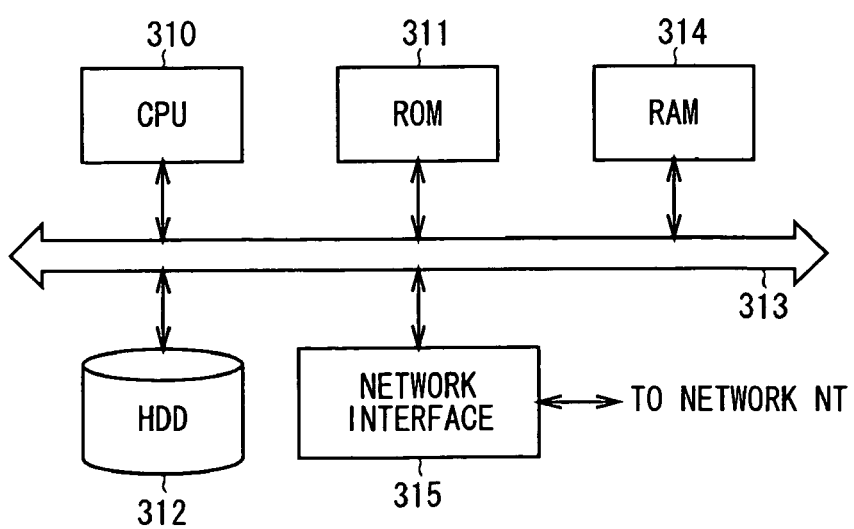
FIG. 17 is a block diagram showing the hardware configuration of the music data delivery server using hardware circuit blocks.

With reference to FIG. 17, the hardware configuration of the music data delivery server SV1 with hardware circuit blocks will be described below. The music data delivery server SV1 includes a CPU 310 that takes overall control of the music data delivery server SV1. The CPU 310 reads out various programs such as a basic program and a data delivery program from a ROM 311 or a hard disk drive 312, and then loads these programs onto RAM 314 through a BUS 313 to execute these programs. In this manner, the CPU 310 performs a process to deliver music data to the client terminal 2.

The CPU 310 associates a plurality of music data, each of which is compressed and encoded in a format such as the above-noted ATRAC3 and MP3, with corresponding content ID information, and then stores them in the hard disk of the hard disk drive 312.

In addition, the CPU 310 has an attribute information database in the hard disk. The CPU 310 registers music attribute information in the attribute information database. The music attribute information is generated by associating the following items: content ID information of the music data stored in the hard disk; a name of this music data; an artist name; an album name if this music data is part of an album CD with other music data; a genre name which this music data belongs to; URL information (i.e., an address) on the network NT from which the music data is provided. The music attribute information is generated for each music data.

By the way, the URL information in the music attribute information includes two kinds of URL information: trial-listening URL information (on the network NT), which is accessed when a user acquires a part of music data for trial listening; and purchase URL information (on the network NT), which is accessed when a user purchases the music data.

To allow a user to purchase music data online, the CPU 310 has screen data of a Web page in the hard disk. This screen data is described in XML language, including a music list about downloadable music data, the trial-listening URL information and the purchase URL information. This web page will be referred to as a delivery music presentation page.

Accordingly, for example, when the client terminal 2 accesses the delivery music presentation page through the network NT, and selects music data out of the delivery music presentation page, and then selects the purchase URL information, the CPU 310 presents a Web page, which was previously prepared, to let a user purchase the selected music data. This Web page is referred to as a music purchase page.

When the purchase of music data is set through the music purchase page, the CPU 310 reads from the hard disk of the hard disk drive 312 the music data selected by a user and corresponding music attribute information. After that, the CPU 310 associates the music data with the music attribute information, and then transmits them to the client terminal 2 through a network interface 315.

In this manner, the CPU 310 makes it possible for a user to purchase his/her desired music as music data through the client terminal 2.

(1-11) Configuration of Product Sales Server SV2

Figure 18:
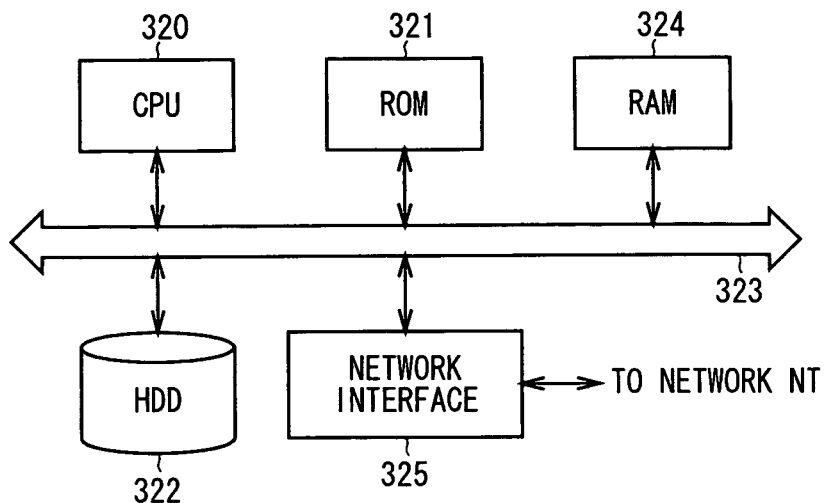
FIG. 18 is a block diagram showing the hardware configuration of the product sales server using hardware circuit blocks.

With reference to FIG. 18, the hardware configuration of the product sales server SV2 with hardware circuit blocks will be described below. The product sales server SV2 includes a CPU 320 that takes overall control of the product sales server SV2. The CPU 320 reads out various programs such as a basic program from a ROM 321 or a hard disk drive 322, and then loads these programs onto RAM 324 through a BUS 323 to execute these programs. In this manner, the CPU 320 performs a process to provide a product sales service.

Examples of the product sales service will be described below. For example, the hard disk drive 322 of the product sales server SV2 has stored package-media-sales page information for selling package media. The page information is described in XML or the like. The package-media-sales page information allows a user to select his/her desired CD or DVD to purchase.

In response to a request from the client terminal 2, the CPU 320 of the product sales server SV2 transmits the package-media-sales page information to the client terminal 2 through a network interface 325. Accordingly, the client terminal 2 displays the package-media-sales page information on the display 206 as a visual page.

When the client terminal 2 transmits a purchase request signal after a user selects his/her desired package medium through the page to purchase, the CPU 320 receives the purchase request signal-through the network interface 325. In response to the purchase request signal, the CPU 320 performs a process to sell the package medium to the user of the client terminal 2.

(1-12) Configuration of Radio Broadcast Information Delivery Server SV3

Figure 19:
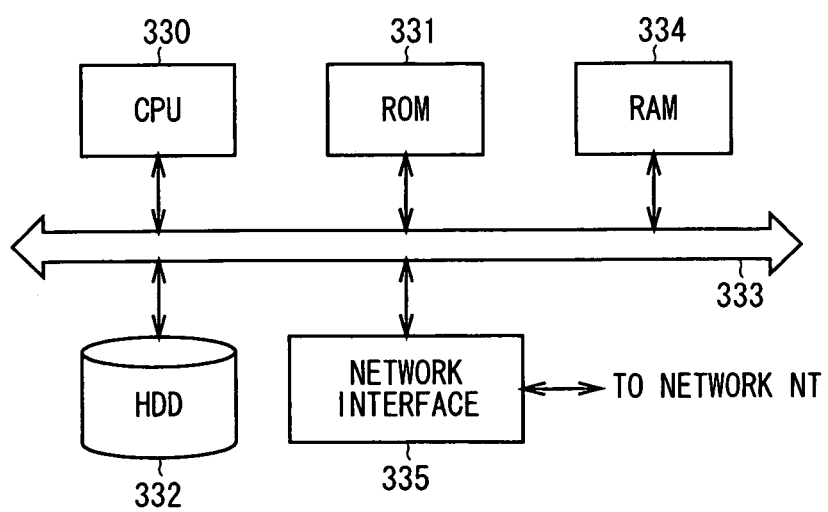
FIG. 19 is a block diagram showing the hardware configuration of the radio broadcast information delivery server using hardware circuit blocks.

With reference to FIG. 19, the hardware configuration of the radio broadcast information delivery server SV3 with hardware circuit blocks will be described below. The radio broadcast information delivery server SV3 includes a CPU 330 that takes overall control of the radio broadcast information delivery server SV3. The CPU 330 reads out various programs such as a basic program from a ROM 331 or a hard disk drive 332, and then loads these programs onto RAM 334 through a BUS 333 to execute these programs. In this manner, the CPU 330 performs a process to provide a radio broadcast information delivery service.

Examples of the radio broadcast information delivery service will be described below. For example, the hard disk drive 332 of the radio broadcast information delivery server SV3 has stored the on-air-list information and the now-on-air information.

For example, when the client terminal 2 transmits a now-on-air information request signal, the CPU 330 of the radio broadcast information delivery server SV3 receives the now-on-air information request signal through a network interface 335. In response to the now-on-air information request signal, the CPU 330 reads out the now-on-air information from the hard disk drive 332 and then transmits the now-on-air information to the client terminal 2 through the network interface 335.

(1-13) Configuration of Disc Information Provision Server SV5

Figure 20:
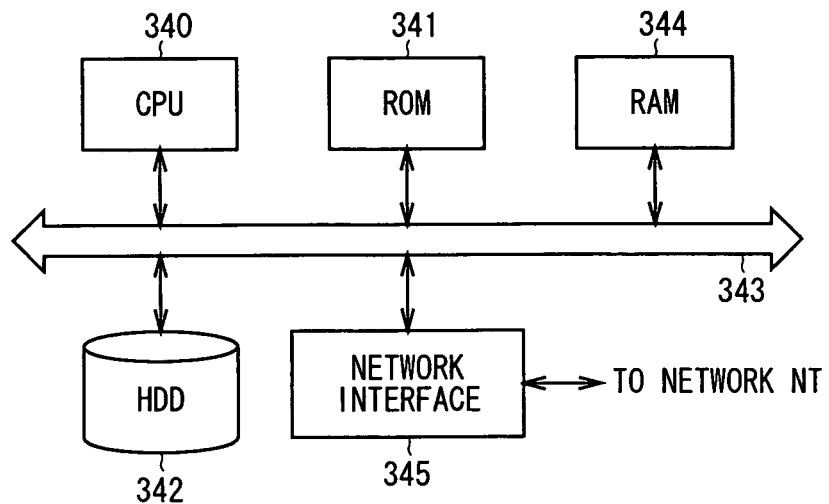
FIG. 20 is a block diagram showing the hardware configuration of a disc information provision server using hardware circuit blocks.

With reference to FIG. 20, the hardware configuration of the disk information provision server SV5 with hardware circuit blocks will be described below. The disk information provision server SV5 includes a CPU 340 that takes overall control of the disk information provision server SV5. The CPU 340 reads out various programs such as a basic program and a disk information provision program from a ROM 341 or a hard disk drive 342, and then loads these programs onto RAM 344 through a BUS 343 to execute these programs. In this manner, the CPU 340 performs various processes such as a disc information provision process.

The CPU 340 has installed a disc information database, which is used for the registration of disc information related to CDs, in the hard disk of the hard disk driver 342.

The CPU 340 associates disc information about each CD with the CD identification information which was generated based on the control data in the CD, and then registers them in the disk information database in the hard disk. The disc information includes an album name of a CD; music names of music data stored in the CD and their playing times; an artist name; and content ID information for each music data.

When the client terminal 2 transmits the CD identification information identifying a CD which the client terminal 2 starts to playback, the CPU 340 receives the CD identification information through a network interface 345. Based on the CD identification information, the CPU 340 then retrieves the disk information corresponding to the CD identification information out of a plurality of pieces of disk information registered in the disk information database in the hard disk. The CPU 340 subsequently transmits the disk information retrieved to the client terminal 2 through the network interface 345.

In this manner, the CPU 340 provides the client terminal 2 with the disc information about the CD which is currently being played.

(1-14) Configuration of Fee-Charging Server SV6

Figure 21:
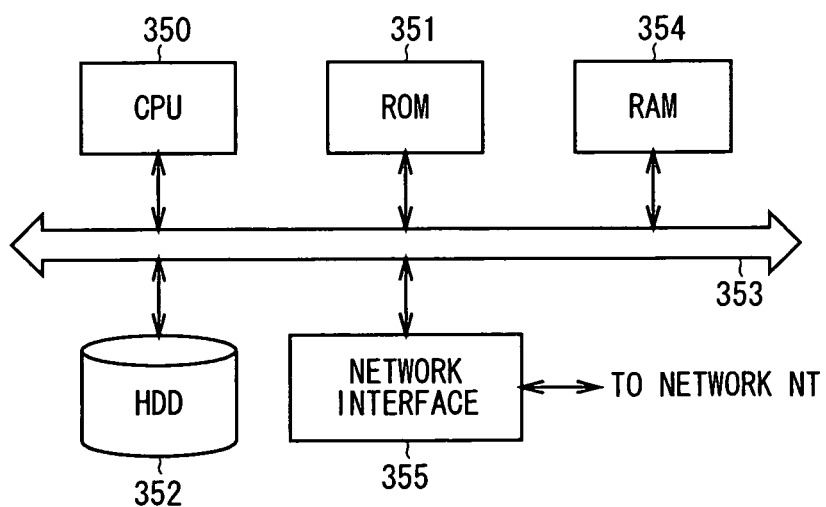
FIG. 21 is a block diagram showing the hardware configuration of a fee-charging server using hardware circuit blocks.

With reference to FIG. 21, the hardware configuration of the fee-charging server SV6 with hardware circuit blocks will be described below. The fee-charging server SV6 includes a CPU 350 that takes overall control of the fee-charging server SV6. The CPU 350 reads out various programs such as a basic program and a fee-charging program from a ROM 351 or a hard disk drive 352, and then loads these programs onto RAM 354 through a BUS 353 to execute these programs. In this manner, the CPU 350 performs various processes such as a fee-charging process.

In this case, the CPU 350 has a fee-charging information database in the hard disk of the hard disk drive 352. The CPU 350 has registered fee-charging processing usage information, such as user ID information and users' account numbers, in the fee-charging information database. The fee-charging processing usage information is used for charging users. In addition, the CPU 350 has also registered, along with content ID information, corresponding content price information showing a price of the content data in the fee-charging information database such that the content price information is associated with the content ID information. In addition, the CPU 350 has registered sales price information, which shows sales prices of CDs and DVDs available through the product sales server SV2, in the fee-charging information database.

For example, the portal server 3, the music data delivery server SV1 or the product sales server SV2 transmits fee-charging request information to request a fee-charging process to a user. The fee-charging request information specifies a user to be charged, and what he/she purchases such as content data and CDs. At this time, the CPU 350 receives the fee-charging request information through a network interface 355. Based on the fee-charging request information, the CPU 350 retrieves the fee-charging processing usage information corresponding to the user to be charged, and price information (i.e. content price information and product price information) of what the user purchases from the fee-charging information database in the hard disk.

Based on the fee-charging processing usage information and price information retrieved from the fee-charging information database, the CPU 350 performs a fee-charging process to charge the user. Therefore, a user can properly purchase what he/she wants such as content data of music and CDs.

(2) Music Presentation Playback Process (2-1) Sequence of Music Presentation Process With reference to FIG. 22, a sequence of music presentation process will be described below. In the music presentation process, when a user selects a genre, the client terminal 2 finds out music data of this genre from among a plurality of music data stored in the hard disk of the hard disk drive 211, CDs, MDs, and the music data delivery server SV1, and then presents these music data to the user after grouping these music data in albums.

Figure 22:
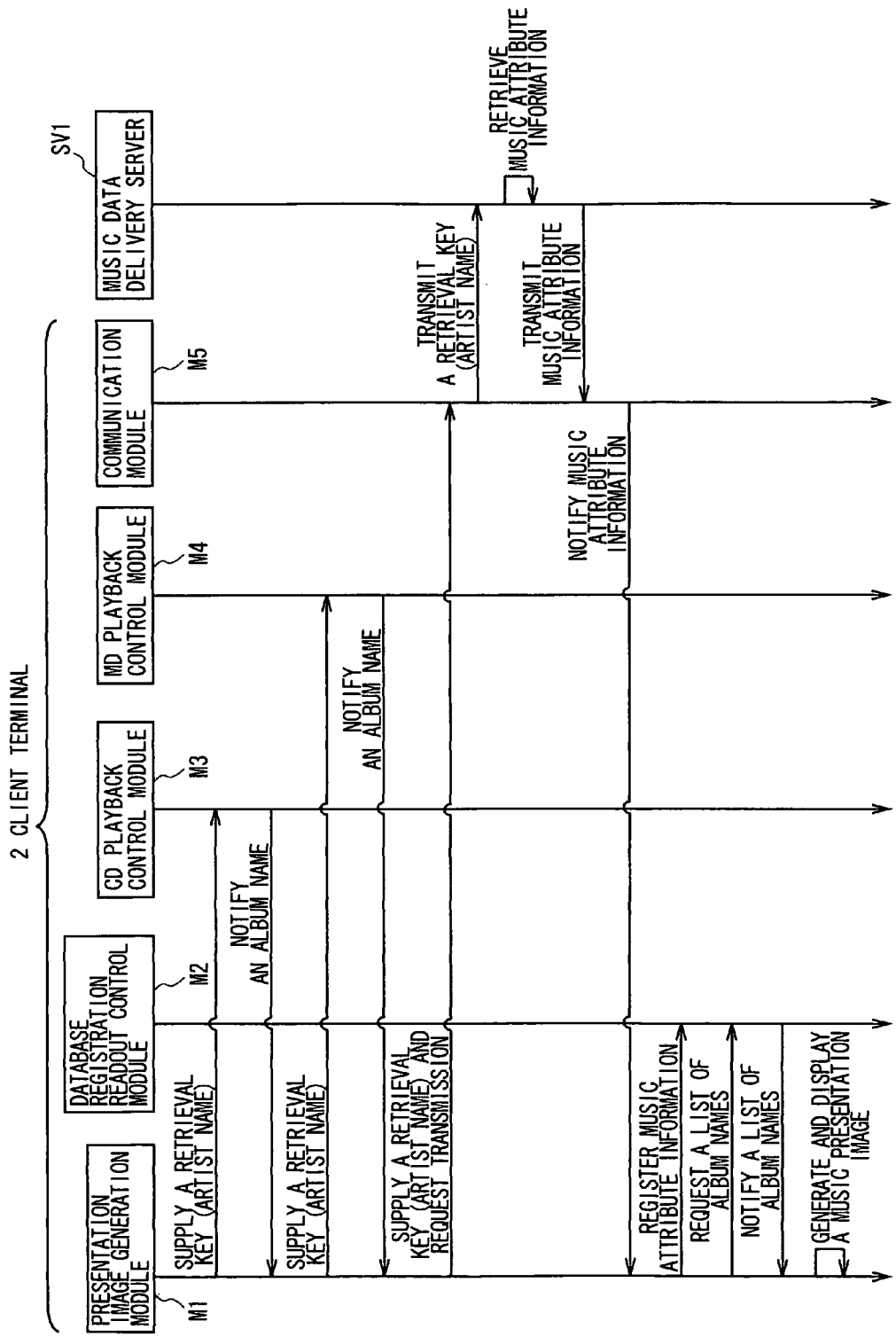
FIG. 22 is a sequence chart showing a sequence of a music presentation process.

With the sequence of the music presentation process show in FIG. 22, the CPU 203 of the client terminal 2 follows the following modules to perform the music presentation process: a presentation image generation module M1, which corresponds to the audio user interface 253 and the XML browser 246 described above as program modules (FIG. 15); a database registration readout control module M2, which corresponds to the hard disk content controller 247, the content data access module 250, the database access module 249 and the HDD playback module 255; a CD playback control module M3, which corresponds to the CD playback module 254; a MD playback control module M4, which corresponds to the MD playback module 257; and a communication module M5, which corresponds to the HTTP message program 240, the communicator program 241, the copyright protection information management module 243, the music purchase/playback module 245 and the library 248.

However, in the sequence of the music presentation process, the presentation image generation module M1, the database registration readout control module M2, the CD playback control module M3, the MD playback control module M4 and the communication module M5 will be described like hardware circuit blocks for ease of explanation.

Figure 23:
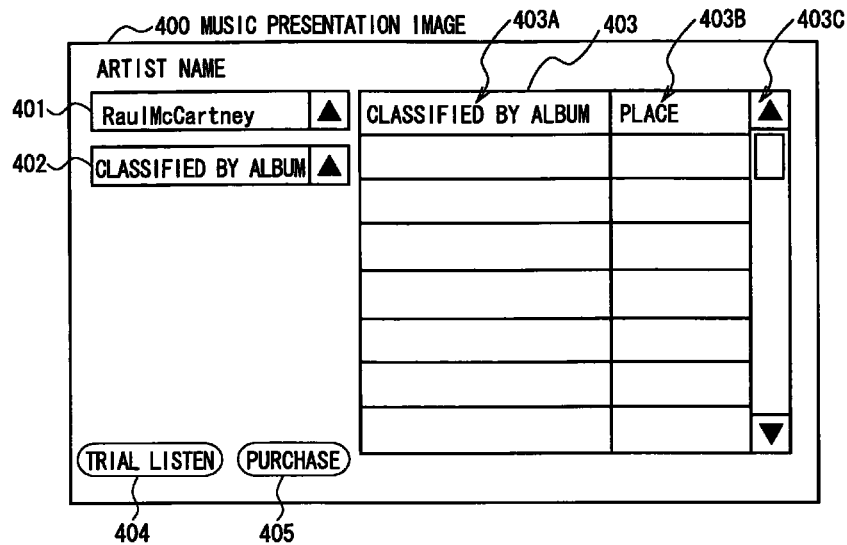
FIG. 23 is a schematic diagram showing the configuration of a music presentation image.

When a user directs the client terminal 2 to present music data available for playback, the presentation image generation module M1 of the client terminal 2 reads out music presentation image data, which was previously stored in the hard disk of the hard disk drive 211, from the hard disk through the database registration readout control module M2, and then supplies the music presentation image data to the display 206 which then displays a music presentation image 400 as shown in FIG. 23.

The music presentation image 400 includes an artist name input section 401, to which an artist name, which indicates a type of music data, is input; and a presentation unit selection section 402, where a presentation manner of each type of music data (i.e. each artist's music data) is selected to classify music data in certain groups.

In addition, the music presentation image 400 includes a music data presentation section 403 including a music presentation column 403A, a storage place presentation column 403B and a scroll bar 403C. Furthermore, the music presentation image 400 includes a trial-listening request button 404 to be used to request trial listening of downloadable music data from the music data delivery server SV1, and a purchase request button 405 to be used to request purchase of music data.

When the presentation image generation module M1 displays the music presentation image 400 on the display 206, the presentation image generation module M1 asks a user to input his/her desired artist name through the artist name input section 401. In this manner, the user chooses types of music data to be presented.

In addition, the presentation image generation module M1 allows a user to select, through the presentation unit selection section 402 of the music presentation image 400, a manner of presentation of his/her desired artist's music data: a manner of presenting each music data or a manner of presenting a plurality of music data at one time classified by an album.

When a user's desired artist name, which represents a type of music data to be presented, is input in the artist name input section 401 of the music presentation image 400 and an album, which represents a presentation unit of music data, is selected through the presentation unit selection section 402 (at this time, the music presentation column 403A and the storage place presentation column 403B display nothing), the presentation image generation module M1 supplies the selected presentation unit (i.e. album) and a retrieval key showing the selected type (i.e. artist name) to the CD playback control module M3.

When the presentation image generation module M1 supplies the retrieval key, the CD playback control module M3 determines, based on the retrieval key and disk information about a CD currently loaded into the client terminal 2, whether or not this CD's artist is the one selected by the user. As a result, when this CD's artist is the one selected by the user, the CD playback control module M3 acquires an album name from the disc information corresponding to the CD and notifies the presentation image generation module M1 of the album name.

The presentation image generation module M1 then supplies the retrieval key, which is the same as the one supplied to the CD playback control module M3, to the MD playback control module M4.

By the way, a MD includes a music data storage area and a control data storage area. On the music data storage area, one or more music data are recorded. On the control data storage area, control data (i.e. TOC) are recorded. The control data to be used to control music data on the music data storage area include an album name, music name of each music and playing times. On either the music data storage area or the control data storage area, an artist name corresponding to music data on the music data storage area is recorded.

Accordingly, when the presentation image generation module M1 supplies the retrieval key, the MD playback control module M4 reads out an artist name and control data from a MD loaded into the external storage and playback device currently connected to the client terminal 2. Based on the retrieval key, the artist name and the control data, the MD playback control module M4 then detects whether or not the MD stores music data of the artist selected by the user.

Therefore, when the music data stored in the MD is the one selected by the user (which is to say when all the music data stored in an album of the artist selected by the user are stored in the MD), the MD playback control module M4 notifies the presentation image generation module M1 of the album name included in the control data.

The presentation image generation module M1 then supplies the retrieval key, which is the same as the one supplied to the CD reproduction control module M3 and the MD playback control module M4, to the communication module M5, and at the same time directs the communication module M5 to transmit the retrieval key to the music data delivery server SV1.

When the presentation image generation module M1 supplies the retrieval key, the communication module M5 accesses the music data delivery server SV1 through the network NT.

Therefore, the CPU 310 of the music data delivery server SV1 performs a user authentication process to a user who uses the client terminal 2 in the same way as the one described by FIG. 9. When the user is authenticated as a legitimate user, the CPU 310 supplies server authentication result information, which is equivalent to service session ID information indicating that the user has been authenticated as a legitimate user, to the client terminal 2 through the network NT.

After that, each time the client terminal 2 accesses, the music data delivery server SV1 performs an user authentication process in the same way as the one described by FIG. 10, and then performs process in accordance with types of the access. However, because this authentication process has been described above, a description thereof will be omitted.

When the server authentication result information is notified by the music data deliver server SV1, the communication module M5 transmits a retrieval key (as retrieval request data) to the music data delivery server SV1 through the network NT.

At this time, the CPU 310 of the music data delivery server SV1 starts a retrieval process of music data, and then receives the retrieval request data from the client terminal 2.

The CPU 310 then retrieves, by using a retrieval key obtained based on the retrieval request data, music attribute information which meets a retrieval condition indicated by the retrieval key out of a plurality of pieces of music attribute information registered in the attribute information database in the hard disk. The music attribute information which meets the retrieval condition corresponds to music data of an artist indicated by the retrieval key. The music attribute information which meets the retrieval condition will be referred to as relevant music attribute information.

Therefore, the CPU 310 transmits the relevant music attribute information retrieved (as attribute information notification data) to the client terminal 2 through the network NT.

The communication module M5 receives the attribute information notification data from the music data delivery server SV1 through the network NT. The communication module M5 then gives the relevant music attribute information, which is obtained from the attribute information notification data, to the presentation image generation module M1.

The presentation image generation module M1 supplies the relevant music attribute information supplied from the communication module M5, along with a registration request, to the database registration readout control module M2. Therefore, the database registration readout control module M2 registers the relevant music attribute information in the music management database in the hard disk such that the relevant music attribute information is associated with an artist name selected by the user and server acquisition information indicating that the relevant music attribute information was acquired from the music data delivery server SV1.

The presentation image generation module M1 then supplies a retrieval key, which is the same as the one supplied to the CD playback control module M3, the MD playback control module M4 and the music data delivery server SV1, to the database registration readout control module M2 along with a list request which requests a list of album names.

By the way, when the database registration readout control module M2 stores music data, which was played back from a CD, in the hard disk, the database registration readout control module M2 acquires disc information about the CD from the disc information provision server SV5 and then registers the disc information in the music management database in the hard disk.

In addition, when the database registration readout control module M2 acquires music data from the music data delivery server SV1 and then stores the music data in the hard disk to purchase the music data, the database registration readout control module M2 registers music attribute information, which was acquired from the music data delivery server SV1 along with the music data, in the music management database such that the music attribute information is associated with a memory address of the hard disk where the music data is recorded.

Accordingly, in response to a list request from the presentation image generation module M1, the database registration readout control module M2 retrieves, based on the retrieval key, an album name which meets a retrieval condition indicated by the retrieval key out of the disc information, music control information and relevant music attribute information registered in the music management database in the hard disk. The database registration readout control module M2 then notifies the presentation image generation module M1 of the album names retrieved as an album name list.

By the way, in accordance with a user setting previously set by a user, the database registration readout control module. M2 repeatedly detects the same album names, which meet the retrieval condition indicated by the retrieval key, from different storage media and/or the music data delivery server SV1. By contrast, in response to the user setting, the database registration readout control module M2 may detect one album name, which meets the retrieval condition indicated by the retrieval key, from a storage medium or the music data delivery server SV1.

Therefore, the presentation image generation module M1 puts together the following items to produce a list (which corresponds to an album name of an artist selected by the user) to be presented (this list will be referred to as a presentation list): the album name list, which was notified by the database registration readout control module M2; the album name, which was notified by the CD playback control module M3 and the MD playback control module M4; and storage place presentation information, which indicates storage places where music data corresponding to the album name are stored.

Figure 24:
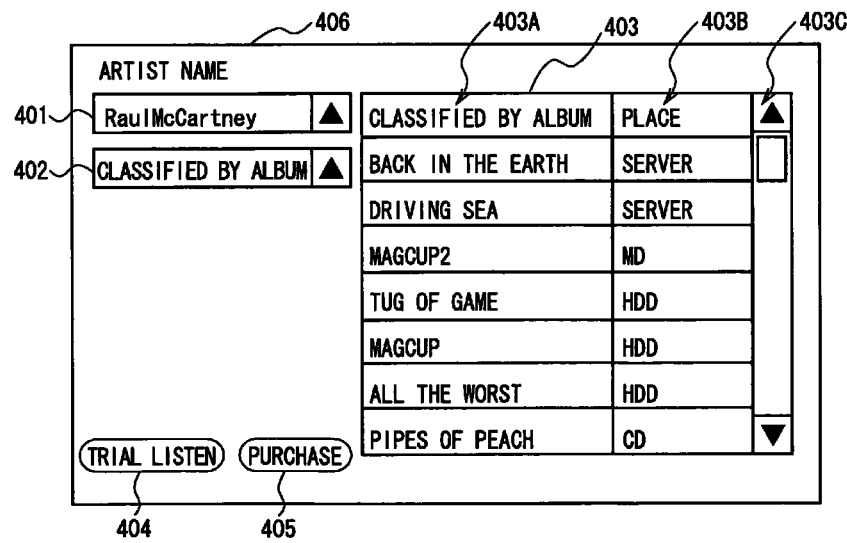
FIG. 24 is a schematic diagram illustrating a way of presentation of album names corresponding to artist names by the music presentation image.

In addition, the presentation image generation module M1 puts together the music presentation image data and the presentation list, and then displays a music presentation image 406 including the presentation list on the display 206 as shown in FIG. 24.

The presentation image generation module M1 displays album names of the artist selected by the user on the music presentation column 403A of the music presentation image 406. On the storage place presentation column 403B, the presentation image generation module M1 displays names of the storage places where music data of the album whose names are displayed on the music presentation column 403A are stored such that each storage place is associated with a corresponding album name. The names of the storage places include the names of the hard disk drive 211, CDs, MDs, and other storage media, and the name of the music data delivery server SV1.

By the way, in a case in which there are a lot of albums to be presented to a user and it is difficult to display all the album names at one time on the music presentation column 403A of the music data presentation section 403, the presentation image generation module M1 scrolls the album names displayed a little by little, along with their storage places' names, on the music presentation column 403 in accordance with the operation to the scroll bar 403C.

Accordingly, the presentation image generation module M1 can present music data (which corresponds to the selected artist and can be currently played back) classified by albums to the user through the music presentation image 406. At the same time, the presentation image generation module M1 can present the storage places of the albums where the music data are stored.

In this manner, when the presentation of music data is requested and an artist name is arbitrarily selected as a retrieval key to be used to retrieve the music data, the presentation image generation module M1 collects album names of the albums (which can be played back) corresponding to the artist from the storage media such as the hard disk, CDs and MDs, and the music data delivery server SV1 available for the client terminal 2.

The presentation image generation module M1 then presents the collected album names as a list to a user through the music presentation image 406. Therefore, the presentation image generation module M1 can present the music data stored in the storage media and the music data delivery server SV1 without forcing a user to perform troublesome operations such as confirming music data stored in the hard disk, CDs, MDs and other media and the music data delivery server SV1.

In this case, the presentation image generation module M1 does not present all the music data stored in the storage media such as the hard disk and the music data delivery server SV1 to a user. The presentation image generation module M1 limits what it presents to the ones corresponding to the artist selected by the user. Therefore, the use can easily choose his/her desired music data from among the music data presented.

(2-2) Sequence of Music Playback Process

Figure 25:
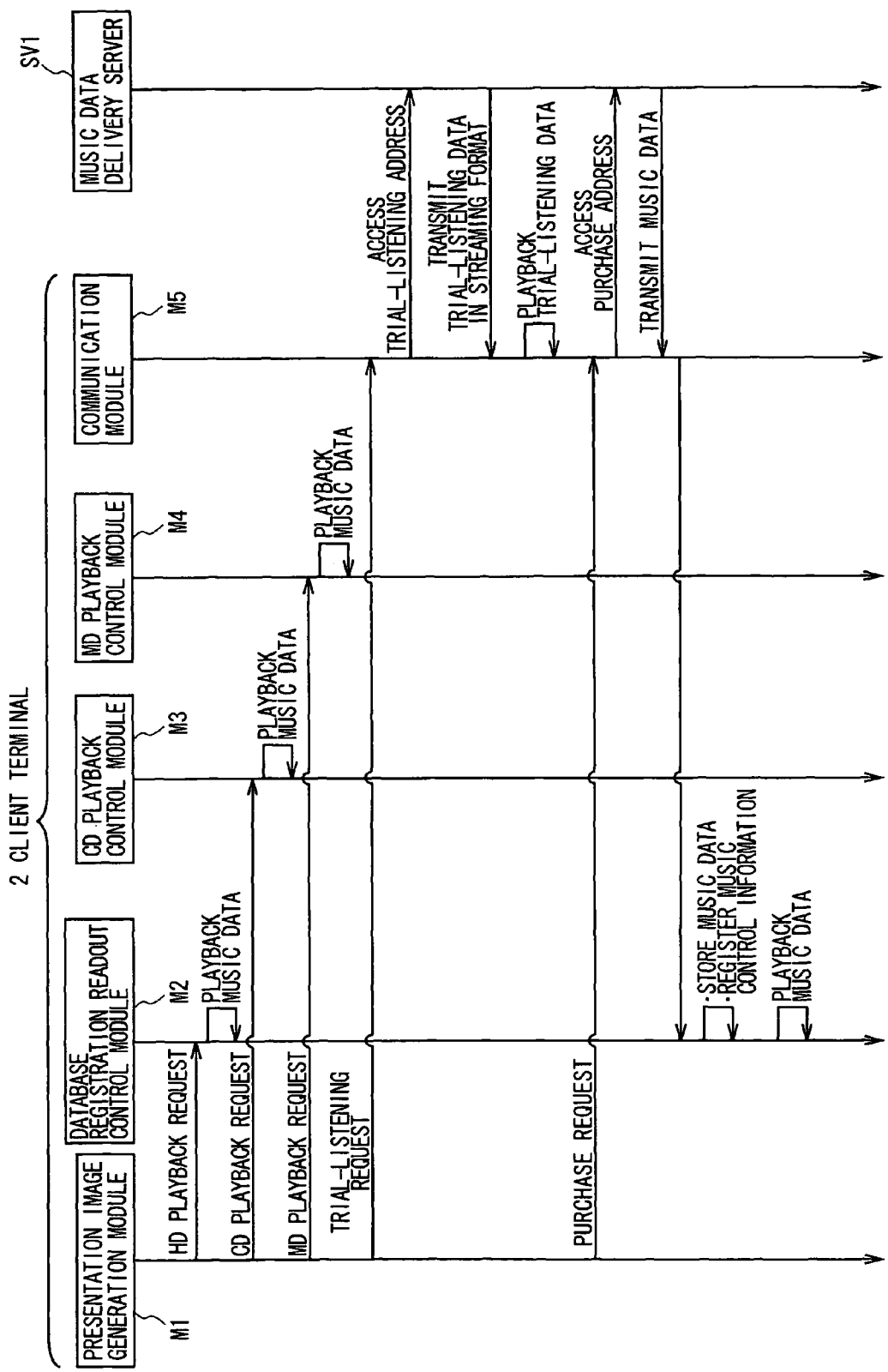
FIG. 25 is a sequence chart showing a sequence of a music playback process.

With reference to FIG. 25, a sequence of a music playback process will be described. In the music playback process, the client terminal 2 plays back, in response to a user's request, the music data presented by the sequence of the music presentation process to the user.

With the sequence of the music playback process show in FIG. 25, in the same way as the above sequence of the music presentation process, the CPU 203 of the client terminal 2 follows the following modules to perform the music playback process: the presentation image generation module M1, the database registration readout control module M2, the CD playback control module M3, the MD playback control module M4, and the communication module M5. In the sequence of the music playback process, the presentation image generation module M1, the database registration readout control module M2, the CD playback control module M3, the MD playback control module M4 and the communication module M5 will be described like hardware circuit blocks for ease of explanation.

When an album name of an album stored in the hard disk is selected through the music presentation column 403A of the music presentation image 406 on the display 206, the presentation image generation module M1 supplies a playback request indicative of the selected album to the database registration readout control module M2.

Accordingly, in response to the playback request from the presentation image generation module M1, the database registration readout control module M2 sequentially plays back all the music data stored in the album selected by the user from the hard disk of the hard disk drive 211 to output them through the speaker 210. This allows the user to listen to all the music data in the selected album sequentially.

In addition, when an album name of an album CD is selected through the music presentation column 403A of the music presentation image 406 on the display 206, the presentation image generation module M1 supplies a playback request indicative of the selected album to the CD playback control module M3.

Accordingly, in response to the playback request from the presentation image generation module M1, the CD playback control module M3 sequentially plays back all the music data from the CD through the media drive 208 to output them through the speaker 210. This allows the user to listen to all the music data in the selected album CD sequentially.

In addition, when an album name of an album stored in a MD is selected through the music presentation column 403A of the music presentation image 406 on the display 206, the presentation image generation module M1 supplies a playback request indicative of the selected album to the MD playback control module M4.

Accordingly, in response to the playback request from the presentation image generation module M1, the MD playback control module M4 communicates with the external storage and playback device through the external device interface 216 to force the external storage and playback device to play back all the music data in the album selected by the user from the MD, and then acquires all the music data via the external device interface 216 to output them through the speaker 210. This allows the user to listen to all the music data of the album stored in the MD sequentially.

In addition to that, when an album name of an album stored in the music data delivery server SV1 is selected through the music presentation column 403A of the music presentation image 406 displayed on the display 206 and then the trial-listening request button 404 is pushed, the presentation image generation module M1 directs the database registration readout control module M2 to read out audio-visual URL information.

Accordingly, the database registration readout control module M2 selects the relevant music attribute information corresponding to the album selected by the user out of a plurality of pieces of relevant music attribute information, and then reads out the trial-listening URL information from the selected relevant music attribute information. Therefore, the presentation image generation module M1 provides a trial-listening request, which shows the trial-listening URL information read by the database registration readout control module M2, to the communication module M5.

The communication module M5 accesses, in response to the trial-listening request from the presentation image generation module M1, the music data delivery server SV1.

Therefore, in the same way as the procedure described by FIG. 9, the CPU 310 of the music data delivery server SV1 performs a user authentication process to the user who uses the client terminal 2. When the user is authenticated as a legitimate user, the CPU 310 of the music data delivery server SV1 notifies the client terminal 2 of the server authentication result information.

By the way, after that, each time the client terminal 2 accesses, the music data delivery server SV1 performs an user authentication process and then performs a process corresponding to the contents of the access, in the same way as the procedure described by FIG. 10. However, because this user authentication process has been described above, a description thereof will be omitted.

When the server authentication result information about the user is notified by the music data delivery server SV1, the communication module M5 accesses the trial-listening URL information, which is indicated by the trial-listening request, on the network NT.

When the trial-listening URL information is accessed by the client terminal 2, the CPU 310 controls the hard disk drive 312 to reproduce part of the music data corresponding to the trial-listening URL information (i.e. this music data is stored in the album selected by the user) from the hard disk as a trial-listening data, and then sends the trial-listening data in streaming format to the client terminal 2 through the network NT.

Therefore, when the communication module M5 receives the trial-listening data (which was transmitted by the music data delivery server SV1 when the trial-listening URL information was accessed) through the network NT, the music purchase/playback module 245 sequentially outputs the trial-listening data through the speaker 210.

In this manner, the communication module M5 allows the user to listen to all the music data in the selected album through the speaker 210 sequentially.

When an album is arbitrarily selected through the music presentation image 406 and then the purchase request button 405 is pushed, the presentation image generation module M1 directs the database registration readout control module M2 to read out URL information.

At this time, the database registration readout control module M2 selects the relevant music attribute information corresponding to the album selected by the user out of a plurality of pieces of relevant music attribute information and then reads out the purchase URL information from the selected relevant music attribute information. Therefore, the presentation image generation module M1 provides a purchase request, which shows the purchase URL information read by the database registration readout control module M2, to the communication module M5.

When the purchase request is supplied from the presentation image generation module M1, the communication module M5 accesses the purchase URL information, which is indicated by the purchase request, on the network NT.

When the purchase URL information is accessed by the client terminal 2, the CPU 310 presents a music purchase page, which corresponds to the purchase URL information accessed, to the client terminal 2.

When the purchase of music data is confirmed through the music purchase page on the client terminal 2, the CPU 310 controls the hard disk drive 312 to reproduce from the hard disk the music data associated with the music purchase page accessed by the client terminal 2 (i.e. this music data is stored in the album selected by the user), and at the same time reads out the music attribute information corresponding to the music data from the hard disk. The CPU 310 subsequently associates the music data with the corresponding music attribute information, and then transmits them to the client terminal 2 via the network NT.

By the way, at this time, the CPU 310 transmits fee-charging request information about the music data transmitted to the client terminal 2 to the fee-charging server SV6 through the network NT. In this way, the CPU 310 directs the fee-charging server SV6 to perform a fee-charging process about the music data purchased by the user of the client terminal 2.

When the communication module M5 sequentially receives all the music data, which were stored in the album, from the music data delivery server SV1 through the network NT, the communication module M5 sequentially supplies the music data received to the database registration readout control module M2.

Therefore, the database registration readout control module M2 stores all the music data (which were stored in the album) received from the communication module M5 in the hard disk of the hard disk drive 211. In addition, the database registration readout control module M2 associates the music attribute information, which was associated with the music data, with a memory address of the hard disk where the music data is stored, and then registered them in the music management database in the hard disk.

After the database registration readout control module M2 has stored the music data in the hard disk, the database registration readout control module M2 starts to playback all the music data of the album in the hard disk through the speaker 210 automatically or in response to a user's playback request. Accordingly, the database registration readout control module M2 allows the user to listen to all the music data of the album, which were acquired from the music data delivery server SV1, sequentially.

In that manner, the presentation image generation module M1 presents the music data (which can be played back and corresponds to the selected artist) classified by albums through the music presentation image 406 displayed on the display 206 to the user. Therefore, when a user performs a simple operation to select his/her desired album name through the music presentation image 406 (without performing troublesome operation such as selecting a storage medium like the hard disk drive 211, CDs and MDs where the music data are stored), the presentation image generation module M1 automatically identifies the storage medium where the music data corresponding to the selected album is stored, and then plays back the music data to let the user listen to this music.

In addition, even if the music data corresponding to the album selected by the user is stored in the music data delivery server SV1, without forcing the user to perform troublesome operation such as connecting to the music data delivery server SV1 and then acquiring a distribution music presentation page, the presentation image generation module M1 displaying the music presentation image 406 on the display 206 automatically communicates with the music data delivery server SV1 and acquires the trial-listening data or music data corresponding to the selected album and then plays back the trial-listening data or the music data to allow the user to listen to them as trial-listening or non trial-listening, when the user performs simple operation such as selecting the album through the music presentation image 406 and then pushing the trial-listening request button 404 or the purchase request button 405.

(2-2) Procedure of Music Presentation Process

The sequence of the music presentation process has been described above with reference to FIG. 22. However, a procedure of music presentation process, which is performed by the CPU 203 of the client terminal 2 in the sequence of the music presentation process, will be described in detail.

Figure 26:
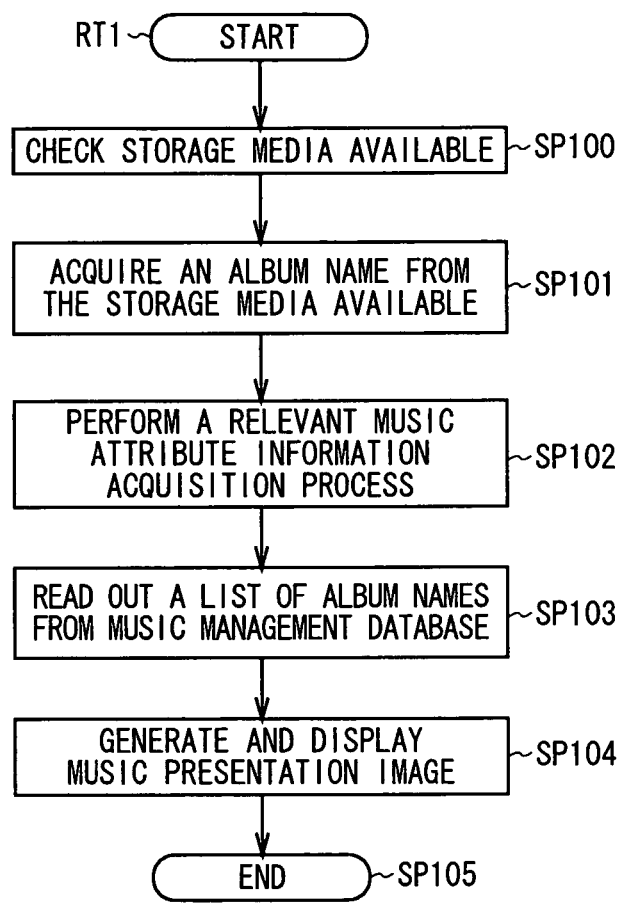
FIG. 26 is a flowchart showing a procedure of a music presentation process.

That is to say, when the presentation of music data is requested by a user and his/her desired artist name is input through the music presentation image 400 and then a presentation unit is selected, the CPU 203 follows the above presentation image generation module M1, database registration readout control module M2, CD playback control module M3, MD playback control module M4 and communication module M5 to starts a procedure RT1 of the music presentation process shown in FIG. 26.

The CPU 203 always observes the hard disk drive 211 to detect whether or not the hard disk drive 211 can operate. In addition, the CPU 203 always observes the media drive 208 to detect whether or not a CD is loaded into the media drive 208. Furthermore, the CPU 203 always observes the external device interface 216 to detect whether or not an external storage and playback device is connected. Therefore, after starting the procedure RT1 of the music presentation process, the CPU 203 at step SP100 checks, based on a current detection result, storage media available (i.e. the hard disk, a CD and a MD), and then proceeds to next step SP101.

At step SP101, the CPU 203 uses the storage media available now out of the hard disk, CD and MD, and retrieves, based on a retrieval key, an album name which meets a retrieval condition indicated by the retrieval key from the storage media available, and then proceeds to next step SP102.

By the way, when detecting the storage media available, the CPU 203 may not always check whether or not the hard disk drive 211 can operate, whether or not a CD is loaded, and whether or not an external storage and playback device is connected. The CPU 203 at step SP100 may provides the same retrieval keys to the hard disk drive 211, the media drive 208 and the external storage and playback device, and detects the storage media available based on the responses (such as a simple response indicating that the retrieval key was received, or a notification of an album name as a result of retrieving with the retrieval key).

Figure 27:
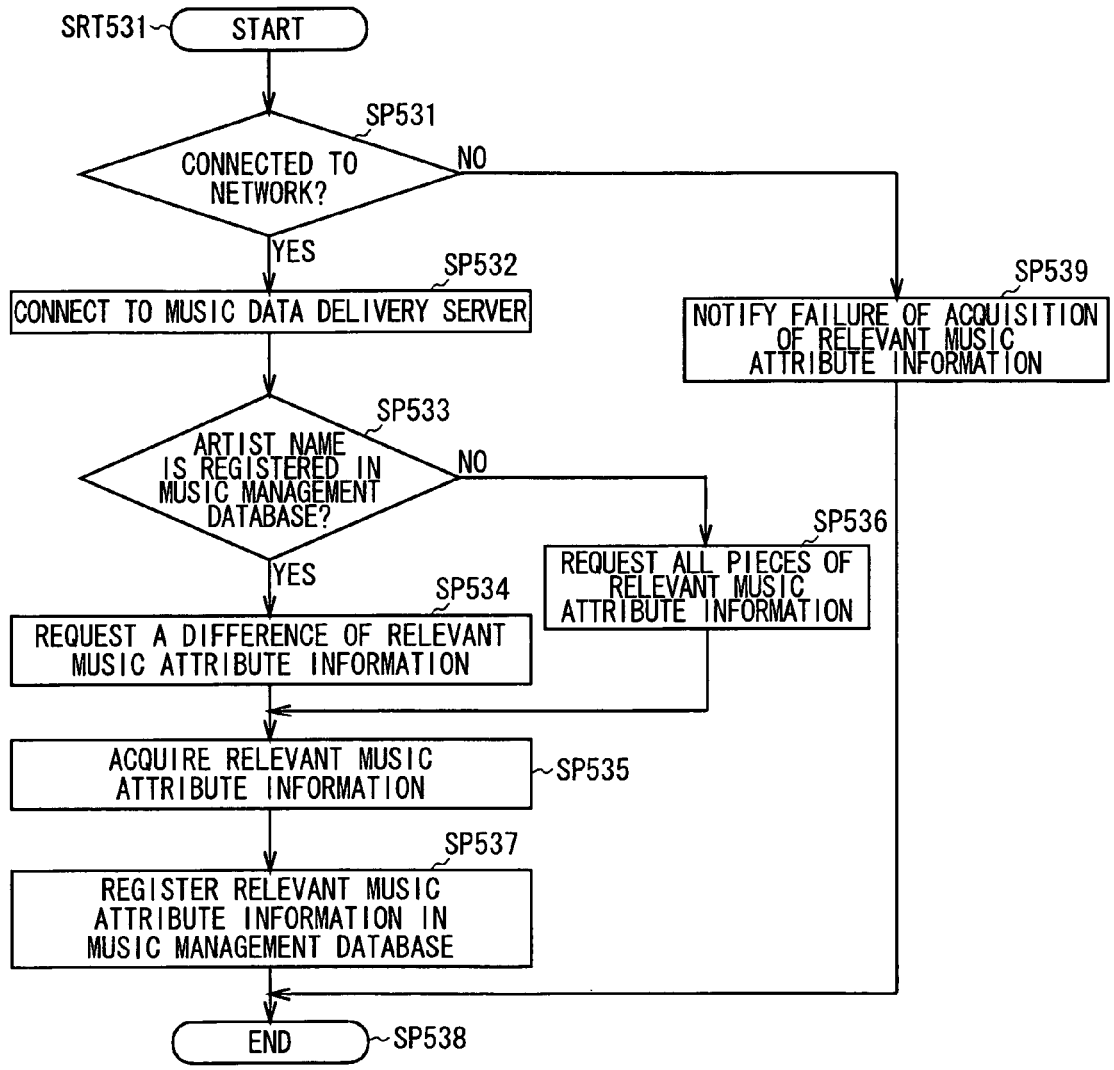
FIG. 27 is a flowchart showing a subroutine of a relevant music attribute information acquisition process.

At step SP102, the CPU 203 starts a subroutine SRT 531 of a relevant music attribute information acquisition process shown in FIG. 27.

After starting the subroutine SRT 531 of the relevant music attribute information acquisition process, the CPU 203 at step SP531 determines whether or not the CPU 203 is connected to the network NT. The CPU 203 proceeds to next step SP532, when affirmative result is obtained after the connection to the network NT.

The CPU 203 at step SP532 connects to the music data delivery server SV1 through the network NT, and then proceeds to next step SP533.

At step SP533, the CPU 203 checks whether or not the relevant music attribute information corresponding to the artist name selected by the use has been acquired from the music data delivery server SV1, and then already registered in the music management database along with its artist name.

Affirmative result at step SP533 means that the relevant music attribute information has been already registered in the music management database along with the artist name, because the CPU 203 previously acquired the relevant music attribute information from the music data delivery server SV1 using the artist name as a retrieval key when the user selected the artist name which is the same as the one selected by the user this time for the presentation of music data. At this time, the CPU 203 proceeds to next step SP534.

At step SP534, the CPU 203 reads out, for example, content ID information out of all pieces of the relevant music attribute information, which are stored in the music management database, corresponding to the artist name selected by the user this time. The CPU 203 subsequently recognizes the content ID information as information to be used to identify each piece of the relevant music attribute information, and then transmits the content ID information, along with the artist name, to the music data delivery server SV1 through the network interface 215 and the network NT as a retrieval key.

In addition, out of the music attribute information corresponding to the artist name, the CPU 203 requests a difference between the already acquired music attribute information and the music attribute information that has not been acquired yet by the client terminal 2 from the music data delivery server SV1, and then proceeds to next step SP535.

On the other hand, negative result at step SP533 means that the relevant music attribute information corresponding to the artist name has not been acquired from the music data delivery server SV1, because the artist name selected this time by the user was not selected ever before. In this case, the CPU 203 proceeds to next step SP536.

At step SP536, the CPU 203 transmits the artist name selected by the user as a retrieval key to the music data delivery server SV1 through the network interface 215 and the network NT to request all pieces of music attribute information corresponding to the artist name from the music data delivery server SV1 as new relevant music attribute information, and then proceeds to next step SP535.

At step SP535, the CPU 203 receives the difference or the new relevant music attribute information, which were transmitted from the music data delivery server SV1 through the network NT, via the communication processing section 214 and the network interface 215, and then proceeds to next step SP537.

At step SP537, the CPU 203 associates the difference or the new relevant music attribute information with the artist name and server information, and then registers them in the music management database in the hard disk. After that, the CPU 203 proceeds to next step SP538 to get out of the subroutine SRT 531 of the relevant music attribute information acquisition process, and then proceeds to step SP103 (FIG. 26).

By the way, at above step SP 531, when negative result is obtained because the network is busy, the CPU 203 proceeds to next step SP539 to notify the user that the relevant music attribute information can not be acquired from the music data delivery server SV1, and then proceeds to step SP538.

At step SP103, the CPU 203 reads out album names, which correspond to the artist name selected by the user, from the music management database in the hard disk as an album name list, and then proceeds to next step SP104.

At step SP104, the CPU 203 produces the music presentation image 406 including the album name list shown in FIG. 24, and displays the music presentation image 406 on the display 206, and then proceeds to next step SP105 to end the procedure RT1 of the music presentation process.

Figure 28:
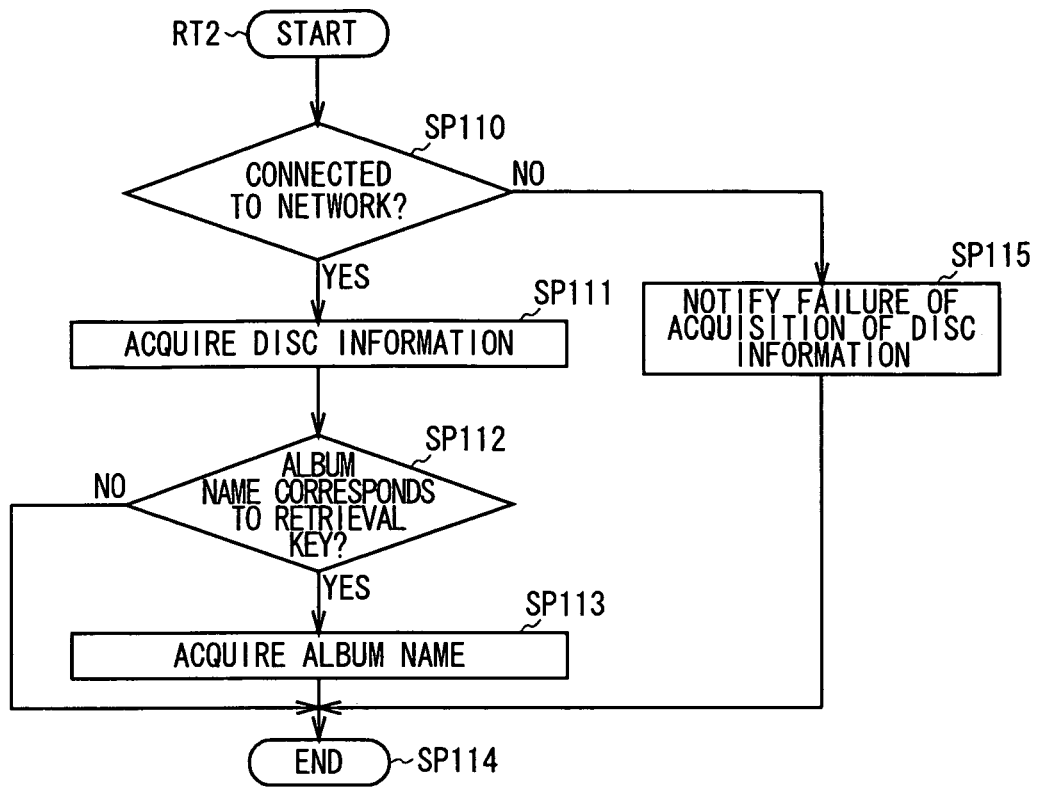
FIG. 28 is a flowchart showing a procedure of an album name acquisition process for a CD.

By the way, if a CD is loaded into the client terminal 2 when the CPU 203 performs the above procedure RT1 of the music presentation process RT1, the CPU 203 performs a procedure RT2 of an album name acquisition process shown in FIG. 28 to acquire an album name of the CD at step SP101.

After starting the procedure RT2 of the album name acquisition process, the CPU 203 at step SP 110 checks whether or not the CPU 203 is connected to the network NT. The CPU 203 proceeds to next step SP111, when affirmative result is obtained after the connection to the network NT.

At step SP111, the CPU 203 reproduces the control data from the CD through the media drive 208, and then generates the CD identification information based on the control data.

The CPU 203 subsequently transmits the CD identification information to the disc information provision server SV5 through the network interface 215 and the network NT.

Accordingly, the CPU 203 acquires the disc information about the CD, which is provided from the disk information provision server SV5 in accordance with the CD identification information, and then proceeds to next step SP112.

At step SP112, based on the disc information acquired from the disc information provision server SV5 and the retrieval key, the CPU 203 determines whether or not the album name of the CD currently loaded into the client terminal 2 is the same as the album name of the album of the artist selected by the user. When the CD loaded is equivalent to the CD of the artist selected by the user, affirmative result is obtained and therefore the CPU 203 proceeds to next step SP113.

At step SP113, to utilize album names included in the disc information as presentation lists for generating the music presentation image 406 later, the CPU 203 acquires the album names from the disk information, and then proceeds to next step SP114 to end the procedure RT2 of the album name acquisition process.

By the way, at step SP112, when the CD currently loaded into the client terminal 2 is different from the CD of the artist selected by the user, negative result is obtained. In this case, the CPU 203 proceeds to step SP114 without acquiring the album names.

At above step SP110, when the CPU 203 is not connected to the network NT due to network jam or the like, negative result is obtained. In this case, the CPU 203 proceeds to next step SP115, and notifies the user that the acquisition of the disc information about the CD failed, and then proceeds to step SP114.

By the way, if the user inputs, on the music presentation image 400 displayed on the display 206, his/her desired artist name (as something indicating a type of music data) into the artist name input section 401 and also selects for example a piece of music (as the presentation unit of music data) through the presentation unit selection section 402 when the CPU 203 starts the procedure RT1 of the music presentation process (At this time, nothing is displayed on the music presentation column 403A and the storage place presentation column 403B), the CPU 203 performs a process in the same way as the one described above using a retrieval key indicating the selected presentation unit (i.e. a piece of music) and the selected type (i.e. artist name).

Accordingly, the CPU 203 acquires names of music data, which correspond to the artist name selected by the user and can be played back from the hard disk, the CD, and the MD; and names of music data, which correspond to the artist name selected by the user and can be played back from the music data delivery server SV1. The CPU 203 then creates a presentation list of music names by putting together the acquired music names and the storage place presentation information indicating storage places where these music data are stored.

Figure 29:
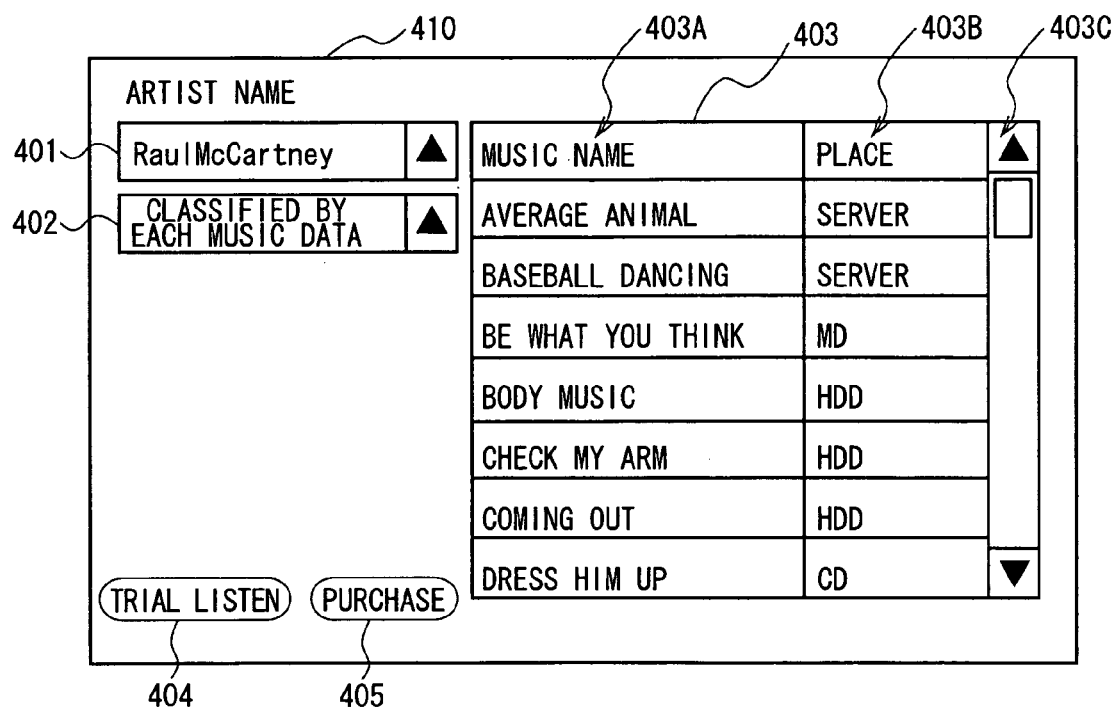
FIG. 29 is a schematic diagram illustrating a way of presentation of music names corresponding to artist names by the music presentation image.

The CPU 203 then puts together the music presentation image data and the presentation list to produce a music presentation image 410 including the presentation list as shown in FIG. 29, and then displays the music presentation image 410 on the display 206.

In this case, the CPU 203 displays, on the music presentation column 403A of the music presentation image 410, names of music data of the artist selected by the user. In addition, the CPU 203 displays, on the storage place presentation column 403B, names of storage places where the music data (whose names are displayed on the music presentation column 403A) are stored such that they are associated with the corresponding music names. The names of storage places include names of the hard disk drive 211, storage media such as CDs and MDs, and the music data delivery server SV1.

By the way, in a case in which there are a lot of pieces of music to be presented to a user and it is difficult to display all the music names in the presentation list at one time on the music presentation column 403A of the music data presentation section 403, the CPU 203 scrolls the music names displayed little by little, along with their storage places' names, on the music presentation column 403 in accordance with the operation to the scroll bar 403C, in the same way as it does for album names.

Accordingly, through the music presentation image 410, the CPU 203 can present names of music data (which correspond to the artist selected by the user and can be played back currently) classified by each music data. At the same time, the CPU 203 can present the storage places where the music data are stored.

In this manner, when the presentation of music data is requested and the artist name is selected as a retrieval key to be used for retrieving music data, the CPU 203 collects names of music data of the artist, which can be played back currently, from the storage media (such as the hard disk, CDs and MDs) and the music data delivery server SV1 available at this time.

The CPU 203 then presents the collected music names as a list through the music presentation image 410 to the user. In this manner, the CPU 203 can easily present playback-able music data without forcing the user to check what kind of music data stored in the hard disk, the CD, the MD and the music data delivery server SV1.

In addition, when playback is requested after the presentation of names of playback-able music data to the user, the CPU 203 plays back music data each time the user selects their names, in the same way as it does when playback is requested after presenting the above album names.

(3) Operation and Effects

With the above configuration, when the presentation of music data is requested and a type of music data to be presented is selected as an artist name, the client terminal 2 of the music related service provision system 1 retrieves and collects, based on the artist name, the music names or album names of the music data of the artist selected by the user out of the music data stored in the hard disk, CD, MD and music data delivery server SV1 available for playback of music data by the client terminal 2.

The client terminal 2 then presents, to the user, the music data of the artist selected by the user through the list showing the collected music names or album names.

As a result, when the user arbitrarily selects the music name or album name to play back corresponding music data, the client terminal 2 plays back the music data of the selected music name or all the music data included in the album of the selected album name from the hard disk, CD, MD and music data delivery server SV1 where the music data is stored to let the user listen to it.

With the above configuration, in response to a presentation request for presentation of playback-able music data of the artist selected by the user, the client terminal 2 collects the music names or album names of the artist selected by the user out of the music data stored in the hard disk, CD, MD and music data delivery server SV1 available for playback of music data, and then presents them to the user. Therefore, the client terminal 2 can easily present the desired types of music data stored in the hard disk, CD, MD and music data delivery server SV1 as the music names or album names, without forcing the user to perform troublesome operation such as checking what kind of music data stored in the hard disk, CD, MD and music data delivery server SV1. Thus, the user can select his/her desired music data easily.

In addition, the client terminal 2 can present the music data of the artist selected by the user in the following manner: it presents music names classified by each piece of music; or it presents album names as groups of the music data. Therefore, the client terminal 2 copes with a case in which the user wants to select the music data presented one by one or some of the music data at one time.

Furthermore, when the client terminal 2 retrieves the playback-able music data of the artist selected by the user, the client terminal 2 utilizes the music data delivery server SV1 that stores a lot of music data. Therefore, in a case in which a CD is not loaded into the client terminal 2; the client terminal 2 is not connected to the external storage and playback device; only a few music data are stored in the hard disk; or music data of a new artist whom the user does not know so much are requested, the client terminal 2 can near-certainly present, to the user, the playback-able music data of the desired artist using the music data delivery server SV1, without forcing the user to perform troublesome operation such as loading CDs into the client terminal 2 and connecting the client terminal 2 to the external storage and playback device.

Even if the client terminal 2 utilizes the music data delivery server SV1 for retrieving music data in that manner, the client terminal 2 allows the user to listen to it on trial before it is purchased, when the playback of the music data stored in the music data delivery server SV1 is requested. Therefore, the user can avoid wasting his/her money on purchasing music data.

Furthermore, the client terminal 2 plays back the desired music data in accordance with the presentation list of the music presentation image 406 and 410 displayed on the display 206. Therefore, the client terminal 2 can easily play back the music data selected without forcing the user to perform troublesome operation such as selecting the hard disk drive 211, the media drive 208, the external storage and playback device, or the music data delivery server SV1 as a function for playback.

Furthermore, when the client terminal 2 creates the album name list by reading out album names corresponding to the artist name from the music management database in the hard disk, the client terminal 2 asks the user to select one of the following methods: a repetition-allowed detection mode, in which the same album names, which meet the retrieval condition indicated by the retrieval key, are repeatedly detected from the storage media and the music data delivery server SV1; and a repetition-not-allowed detection mode, in which the same album names, which meet the retrieval condition indicated by the retrieval key, are not repeatedly detected from the storage media and the music data delivery server SV1.

Accordingly, in a case in which the repetition-allowed detection mode is selected, for example, when the user directs the client terminal 2 to record the music data stored in the CD on the hard disk, the client terminal 2 may not record the music data stored in the CD on the hard disk while playing back the CD in real time. That is to say, the client terminal 2 may record the music data compressed, which is acquired from the music data delivery server SV1, on the hard disk. This allows the client terminal 2 to record it in simple and effective manner.

By contrast, in a case in which the repetition-not-allowed detection mode is selected, for example, prior to retrieving the music data from the music data delivery server SV1, the client terminal 2 retrieves them from the storage media to acquire their music names and album names. This prevents the client terminal 2 from purchasing the music data, which was also stored in the CD loaded into the client terminal 2, from the music data delivery server SV1.

In this manner, when the client terminal 2 creates the album name list by reading out album names corresponding to the artist name from the music management database in the hard disk, the client terminal 2 asks the user to select the repetition-allowed detection mode or the repetition-not-allowed detection mode. Therefore, the user can use the client terminal 2 in any desired manner. Thus, that improves the usability of the client terminal 2.

Figure 30:
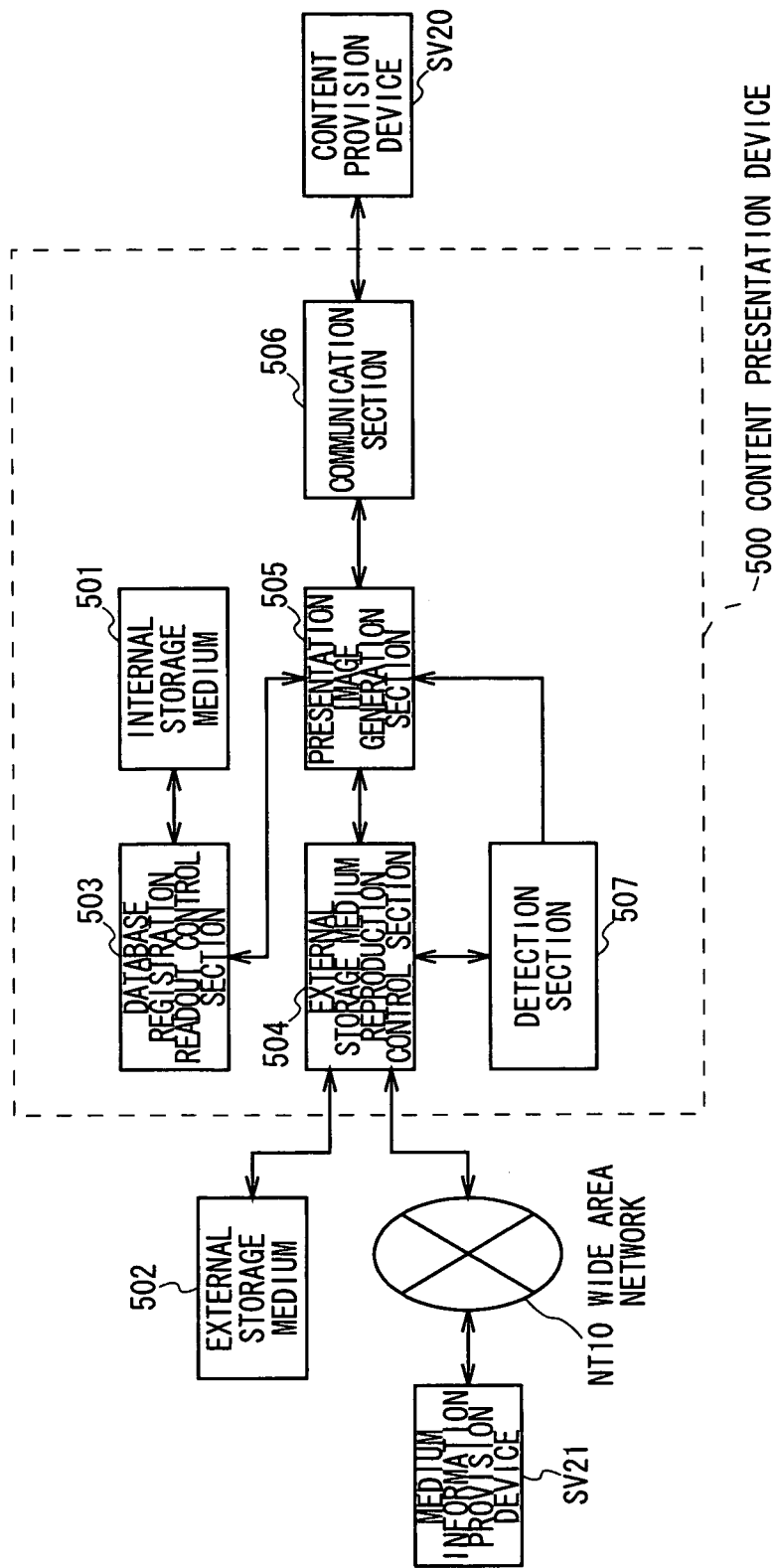
FIG. 30 is a block diagram showing the hardware configuration of a content presentation device according to a second embodiment of the present invention using functional circuit blocks.

[2] Second Embodiment (1) Configuration of Functional Circuit Blocks of Content Presentation Device FIG. 30 shows the hardware configuration of a content presentation device 500 according to a second embodiment of the present invention using functional circuit blocks. The content presentation device 500 includes an internal storage medium 501. In addition, the content presentation device 500 is designed to connect to an external storage medium 502. In the content presentation device 500, a database registration readout control section 503 controls registration and readout to a database installed in the internal storage medium 500 storing one or a plurality of content data. An external storage medium reproduction control section 504 controls reproduction to the external storage medium 502 storing one or a plurality of content data.

With the above configuration, a presentation image generation section 505 of the content presentation device 500 transmits the same retrieval key to the database registration readout control section 503 and the external storage medium reproduction control section 504 to retrieve content data in a desired type.

The database registration readout control section 503 subsequently detects, based on the retrieval key supplied from the presentation image generation section 505, a content name of content data corresponding to the retrieval key from the internal storage medium 501 being under a control of the database registration readout control section 503, and then notifies the presentation image generation section 505 of the content name detected. The external storage medium reproduction control section 504 detects, based on the retrieval key supplied from the presentation image generation section 505, a content name of content data corresponding to the retrieval key from the external storage medium 502 being under a control of the external storage medium reproduction control section 504, and notifies the presentation image generation section 505 of the content name detected. Therefore, the presentation image generation section 505 generates a content presentation image including a list of a content name of content data corresponding to the retrieval key notified by the database registration readout control section 503 and the external storage medium reproduction control section 504.

Actually, the presentation image generation section 505 supplies an artist name as the same retrieval key to the database registration readout control section 503 and the external storage medium reproduction control section 504. The database registration readout control section 503 detects, based on the artist name supplied from the presentation image generation section 505, a content name of content data corresponding to the artist name from the internal storage medium 501 being under the control of the database registration readout control section 503, and then notifies the presentation image generation section 505 of the content name detected along with the artist name. The external storage medium reproduction control section 504 detects, based on the artist name supplied from the presentation image generation section 505, a content name of content data corresponding to the artist name from the external storage medium 502 being under the control of the external storage medium reproduction control section 504, and then notifies the presentation image generation section 505 of the content name detected along with the artist name. Accordingly, the presentation image generation section 505 receives the content name and artist name of the content data corresponding to the artist name notified by the database registration readout control section 503 and the external storage medium reproduction control section 504, and then generates a content presentation image including a list of the content name received and the artist name.

In addition, the presentation image generation section 505 transmits the same retrieval key to a communication section 506 to retrieve content data in a desired type. The communication section 506 transmits the retrieval key supplied from the presentation image generation section 505 to an external content provision device SV20 by communicating with the content provision device SV20. As a result, the communication section 506 receives content attribute information including a content name of a provision-target content data corresponding to the retrieval key from the content provision device SV20, and supplies the content attribute information received to the presentation image generation section 505. Accordingly, the presentation image generation section 505 generates a content presentation image containing a list including the content name included in the content attribute information supplied from the communication section 506 and the content name notified by the database registration readout control section 503 and the external storage medium reproduction control section 504.

Actually, the communication section 506 receives, after transmitting a retrieval key to the content provision device SV20, content attribute information, in which a content name of content data that corresponds to the retrieval key and is to be provided, an artist name, and an address showing a provider of the content data to be provided on a network are associated with one another, from the content provision device SV20. The communication section 506 then supplies the content attribute information to the presentation image generation section 505. In this case, the presentation image generation section 505 supplies the content attribute information supplied from the communication section 506 to the database registration readout control section 503. The database registration readout control section 503 registers the content attribute information supplied from the presentation image generation section 505 in the database of the internal storage medium 501. After that, the presentation image generation section 505 supplies the retrieval-key to the database registration readout control section 503. Accordingly, the database registration readout control section 503 detects, based on the retrieval key supplied from the presentation image generation section 505, a content name of content data corresponding to the retrieval key from the internal storage medium 501 being under a control of the database registration readout control section 503, and then notifies the presentation image generation section 505 of the detected content name along with the content name in the content attribute information.

In addition, in a case in which the communication section 506 receives, after transmitting a retrieval key to the content provision device SV20, content attribute information, in which a content name of content data that corresponds to the retrieval key and is to be provided, an artist name, and an address showing a provider of the content data to be provided on a network are associated with one another, from the content provision device SV20, and then supplies the content attribute information to the presentation image generation section 505, the communication section 506 accesses, after the content name associated with the address included in the list of the content provision image generated by the presentation image generation section 505 is selected, the address associated with the selected content name. The communication section 506 then receives part or all of the content data which is indicated by the selected content name and is transmitted from a provider (not shown) indicated by the address in streaming format.

Furthermore, in a case in which the communication section 506 receives, after transmitting a retrieval key to the content provision device SV20, content attribute information, in which a content name of content data that corresponds to the retrieval key and is to be provided, an artist name, and an address showing a provider of the content data to be provided on a network are associated with one another, from the content provision device SV20, and then supplies the content attribute information to the presentation image generation section 505, the communication section 506 accesses, after the content name associated with the address included in the list of the content provision image generated by the presentation image generation section 505 is selected and a purchase of content data indicated by the selected content name is requested, a content purchase page indicated by the address associated with the selected content name. The communication section 506 then downloads content data indicated by the selected content name by accessing the content purchase page, and then supplies the content data downloaded to the presentation image generation section 505.

In this case, the presentation image generation section 505 supplies the content data downloaded by the communication section 506 to the database registration readout control section 503. Accordingly, the database registration readout control section 503 stores in the internal storage medium 501 the content data which is downloaded by the communication section 506 and then is supplied through the presentation image generation section 503. At this time, the database registration readout control section 503 registers at least the content name and artist name of the downloaded content data, and a memory address on the internal storage medium 501.

In addition to the above configuration, a detection section 507 detects whether or not the external storage medium reproduction control section 504 can access the external storage medium 502. The detection section 507 then notifies the presentation image generation section 505 of a result of the detection. When the detection section 507 detects a fact that the external storage medium reproduction control section 504 can access the external storage medium 502, the presentation image generation section 505 transmits the retrieval key to the external storage medium reproduction control section 504.

The external storage medium reproduction control section 504 reproduces control data stored in a control area on the external storage medium 502, and then generates, based on the control data reproduced, storage medium identification information to be used to identify the external storage medium 502. The external storage medium reproduction control section 504 then acquires, based on the storage medium identification information, medium information to be used to identify content data stored in the external storage medium 502, from the internal storage medium 501 or a medium information provision device SV21 connected via a wide area network NT10.

Furthermore, the external storage medium reproduction control section 504 retrieves, based on the retrieval key supplied from the presentation image generation section 505, the medium information of the external storage medium 502 which is under a control of the external storage medium reproduction control section 504 to detect a content name of content data which is stored in the external storage medium 502 and corresponds to the retrieval key, and then notifies the presentation image generation section 505 of the detected content name.

In this manner, the content presentation device 500 can easily present a content name of content data (which is stored in the internal storage medium 501 and the external storage medium 502) in desired types through the content presentation image, without forcing a user to perform troublesome operation such as checking content data stored in the internal storage medium 501 and the external storage medium 502.

By the way, in the second embodiment of the present invention, as a network on which the provider of the content data which is to be provided exists, the Internet, a local area network with wired or wireless devices and the like can be applied. In addition, as a wide area network by which the content presentation device 500 is connected to the medium information provision device SV21, the Internet can be applied. Furthermore, as a provider of the content data which is to be provided, the content provision device SV20 can be applied. Furthermore, as content data which is presented by the content presentation device 500, music data, movies, photographs, game programs and other content data can be applied. By the way, in a case in which music data is applied as the content data, the presentation image generation section 505 may transmit, as well as an artist name, a name of music genre, a music company which an artist belongs to, and the like as a retrieval key transmitted to the database registration readout control section 503, the external storage medium reproduction control section 504 and the communication section 506.

In the second embodiment of the present invention, in a case in which music data is applied as content data that the content presentation device 500 presents, for example, the content provision server SV20 is equivalent to the music data delivery server SV1 according to the first embodiment of the present invention; the medium information provision device SV21 is equivalent to the disc information provision server SV5 according to the first embodiment of the present invention; and the content presentation device 500 is for example equivalent to the client terminal 2 illustrated by FIG. 2.

In addition, the internal storage medium 501 is for example equivalent to the storage medium 29 of the client terminal 2 illustrated by FIG. 2; and the external storage medium 502 is equivalent to a CD, MD and the like which the external recording media recording and reproducing section 28 of the client terminal 2 can record on or reproduce from. Furthermore, the database registration readout control section 503 is for example equivalent to the control section 23 of the client terminal 2; and the external storage medium reproduction control section 504 is for example equivalent to the external recording media recording and reproducing section 28 of the client terminal 2.

In addition, the presentation image generation section 505 is for example equivalent to the control section 23 of the client terminal 2; and the communication section 506 is for example equivalent to the communication control section 32 of the client terminal 2. Furthermore, the detection section 507 is for example equivalent to the control section 23 of the client terminal 2.

(2) Operation and Effects

With the above configuration, the content presentation device 500 transmits the same retrieval key which the presentation image generation section 505 uses to retrieve content data in desired types to both the database registration readout control section 503, which controls registration and readout to the database installed in the internal storage medium 501 storing one or a plurality of content data, and the external storage medium reproduction control section 504, which controls reproduction to the external storage medium 502 storing one or a plurality of content data.

In the content presentation device 500, the database registration readout control section 503 detects, based on the retrieval key, a content name of content data corresponding to the retrieval key from the internal storage medium 501 being under a control of the database registration readout control section 503, and then notifies the presentation image generation section 505 of the detected content name. In addition, in the content presentation device 500, in the same way, the external storage medium reproduction control section 504 detects, based on the retrieval key, a content name of content data corresponding to the retrieval key from the external storage medium 503 being under a control of the external storage medium reproduction control section 504, and then notifies the presentation image generation section 505 of the detected content name.

As a result; in the content presentation device 500, the presentation image generation section 505 generates the content presentation image including the list of the content name of the content data corresponding to the retrieval key notified by the database registration readout control section 503 and the external storage medium reproduction control section 504.

With the above configuration, in the content presentation device 500, the presentation image generation section 505 transmits the same retrieval key to be used to retrieve content data in desired types to both the database registration readout control section 503 and the external storage medium reproduction control section 504; and the database registration readout control section 503 detects, based on the retrieval key, a content name of content data corresponding to the retrieval key from the internal storage medium 501; and the database registration readout control section 503 notifies the presentation image generation section 505 of the detected content name; and, in the same way, the external storage medium reproduction control section 504 detects, based on the retrieval key, a content name of content data corresponding to the retrieval key from the external storage medium 503; and the external storage medium reproduction control section 504 notifies the presentation image generation section 505 of the detected content name; and then the presentation image generation section 505 generates the content presentation image including the list of the content name of the content data corresponding to the retrieval key notified by the database registration readout control section 503 and the external storage medium reproduction control section 504.

Accordingly, the content presentation device 500 can easily present a content name of content data (which is stored in the internal storage medium 501 and the external storage medium 502) in desired types through the content presentation image, without forcing a user to perform troublesome operation such as checking content data stored in the internal storage medium 501 and the external storage medium 502. As a result, the content presentation device 500 allows a user to select his/her desired content data easily.

[3] Other Embodiments

In the above-noted first embodiment, to present playback-able music data, an artist name is selected by a user as a type of music data. However, the present invention is not limited to this. As a type of music data, a name of music genre and a music company which an artist belongs to and the like may be selected.

In addition, in the above-noted first embodiment, music data are presented to a user. However, the present invention is not limited to this. Other content data, such as movies, photographs and game programs, may be presented.

Furthermore, in the above-noted first embodiment, the sequence of the music presentation process illustrated by FIG. 22 retrieves music data corresponding to an artist in the following order: a CD, a MD, the music data delivery server SV1, and the hard disk. However, the present invention is not limited to this. The order of retrieval may be not limited to the one illustrated by FIG. 22. To cope with problems such as processing load, other orders can be applied.

In addition, a user does not have to listen to music data on trial before purchasing them from the music data delivery server SV1. A user may purchase music data without doing trial listening. A user may listen to music data on trial but not purchase them.

Furthermore, with the music data stored in the music data delivery server SV1, the music data delivery server SV1 may transmit the whole music data in streaming format to the client terminal 2 as if the music data delivery server SV1 seems to be storage media. This allows a user to listen to the music data without purchasing them.

Furthermore, in the above-noted first embodiment, the sequence of the music playback process illustrated by FIG. 25 plays back playback-able music data corresponding to an artist in the following order: the hard disk, a CD, a MD, and the music data delivery server SV1. However, the present invention is not limited to this. The order of playback may be specified by a user.

Furthermore, in the above-noted first and second embodiment, as a content presentation device according to an embodiment of the present invention, the client terminal 2 and content presentation device 500 illustrated by FIGS. 1 to 30 are applied. However, the present invention is not limited to this. Various content presentation devices (for example, an information processing device which can playback or acquire content data from different storage media), such as personal computers, mobile phones, PDA (Personal Digital Assistance), and a game machine capable of connecting to a network, can be applied.

By the way, in the above-noted first embodiment, the hardware circuit blocks, the functional circuit blocks and the program modules are incorporated in the client terminal 2. However, the present invention is not limited to this. The hardware circuit blocks, the functional circuit blocks and the program modules may be incorporated in mobile phones, personal computers and other terminals. A device with the hardware circuit blocks, the functional circuit blocks and the program modules can perform processes in the same way as the above client terminal 2.

Furthermore, in the above-noted first embodiment, as a broadcast which the client terminal 2 can receive, a radio broadcast service provided by radio stations is applied. However, the present invention is not limited to this. The client terminal 2 may receive television programs broadcast from television stations, and also acquire various broadcast information, which is related to the television programs, from a server on the network NT.

Furthermore, in the above-noted first embodiment, the presentation image generation module M1, the database registration readout control module M2, the CD playback control module M3, the MD playback control module M4 and the communication module M5 are applied as a content presentation program according to an embodiment of the present invention. However, the present invention is not limited to this. Other types of programs can be applied as the content presentation program.

In the above-noted first and second embodiment, as an internal storage medium storing one or a plurality of content data, the storage medium 29 of the client terminal 2, the hard disk of the hard disk drive 211, and the internal storage medium 501 of the content presentation device 500 are applied as shown in FIG. 1 to FIG. 30. However, the present invention is not limited to this. A semiconductor memory and other types of internal storage media can be applied.

Furthermore, in the above-noted first and second embodiments, as database registration readout control means that controls registration and readout to a database installed in an internal storage medium storing one or a plurality of content data, the control section 23 of the client terminal 2, the CPU 203 which performs processes based on the database registration readout control module M2, and the database registration readout control section 503 of the content presentation device 500 are applied. However, the present invention is not limited to this. A database registration readout control circuit, which is a hardware circuit capable of performing processes in the same way as the CPU 203 that performs processes based on the database registration readout control module M2, and the like can be applied as the database registration readout control means.

Furthermore, in the above-noted first and second embodiments, as an external storage medium storing one or a plurality of content data, the CD, the MD, and the external storage medium 502 connected to the content presentation device 500 are applied as shown in FIG. 1 to FIG. 30. However, the present invention is not limited to this. Other types of external storage media capable of storing content data and connecting to the client terminal 2 from the outside, such as a semiconductor memory, an optical disc, a hard disk of an external hard disk drive, a DVD which an external device can playback, can be applied as the external storage medium.

Furthermore, in the above-noted first and second embodiments, as an external storage medium reproduction control means that controls reproduction to an external storage medium storing one or a plurality of content data, the external recording media recording and reproducing section 28 of the client terminal 2, the CPU 203 which perform processes based on the CD playback control module M3 and the MD playback control module M4, and the external storage medium reproduction control section 504 of the content presentation device 500 are applied, as shown in FIG. 1 to FIG. 30. However, the present invention is not limited to this. An external storage medium reproduction control circuit, which is a hardware circuit capable of performing processes in the same way as the CPU 203 that performs processes based on the CD playback control module M3 and the MD playback control module M4, and the like can be applied as the external storage medium reproduction control means.

Furthermore, in the first and second embodiments, as presentation image generation means that generates, after transmitting the same retrieval key to the database registration readout control means and the external storage medium reproduction control means to retrieve content data in desired types, a content presentation image including a list of a content name of content data corresponding to a retrieval key notified by the database registration readout control means and the external storage medium reproduction control means, the control section 23 of the client terminal 2, the CPU 203 which performs processes based on the presentation image generation module M1, and the presentation image generation section 505 of the content presentation device 500 are applied. However, the present invention is not limited to this. A presentation image generation circuit, which is a hardware circuit capable of performing processes in the same way as the CPU 203 that performs processes based on the presentation image generation module M1, and the like can be applied as the presentation image generation means.

Furthermore, in the above-noted first and second embodiments, as communication means that receives, by communicating with an external content provision device, from the content provision device content attribute information including a content name of content data which corresponds to a retrieval key and is to be provided by transmitting the retrieval key supplied from the presentation image generation means to the content provision device, and then supplies the received content attribute information to the presentation image generation means, the communication control section 32 of the client terminal 2 capable of communicating with the music data delivery server SV1 which is equivalent to the external content provision device, the CPU 203 which performs processes based on the communication module M5, and the communication section 506 of the content presentation device 500 are applied. However, the present invention is not limited to this. A communication circuit, which is a hardware circuit capable of performing processes in the same way as the CPU 203 that performs processes based on the communication module M5, and the like can be applied as the communication means.

Furthermore, in the first and second embodiments, as detection means that detects whether or not the external storage medium reproduction control means can access the external storage medium, the control section 23 of the client terminal 2, the CPU 203 which performs processes based on the presentation image generation module M1 (especially, the audio user interface 253), and the detection section 507 of the content presentation device 500 are applied. However, the present invention is not limited to this. A detection circuit, which is a hardware circuit capable of performing processes in the same way as the CPU 203 which performs processes based on the presentation image generation module M1 (especially, the audio user interface 253), and the like can be applied as the detection means.

INDUSTRIAL APPLICABILITY

The present invention can be applied to a content presentation device such as a personal computer, a music playback device, a hard disk recorder, and the like.

DESCRIPTION OF SYMBOLS

1 . . . MUSIC RELATED SERVICE PROVISION SYSTEM, 2 . . . CLIENT TERMINAL, SV1 . . . MUSIC DATA DELIVERY SERVER, 23 . . . CONTROL SECTION, 28 . . . EXTERNAL RECORDING MEDIA RECORDING AND REPRODUCING SECTION, 29 . . . STORAGE MEDIUM, 32 . . . COMMUNICATION CONTROL SECTION, 203 . . . CPU, 208 . . . MEDIA DRIVE, 211 . . . HARD DISK DRIVE, 214 . . . COMMUNICATION PROCESSING SECTION, 215 . . . NETWORK INTERFACE, 216 . . . EXTERNAL DEVICE INTERFACE, 400, 406, 410 . . . MUSIC PRESENTATION IMAGE, M1 . . . PRESENTATION IMAGE GENERATION MODULE, M2 . . . DATABASE REGISTRATION READOUT CONTROL MODULE, M3 . . . CD PLAYBACK CONTROL MODULE, M4 . . . MD PLAYBACK CONTROL MODULE, M5 . . . COMMUNICATION

MODULE, RT1 ... PROCEDURE OF MUSIC PRESENTATION PROCESS, SRT531 ... SUBROUTINE OF RELEVANT MUSIC ATTRIBUTE INFORMATION ACQUISITION PROCESS, RT2 ... PROCEDURE OF ALBUM NAME ACQUISITION PROCESS

The invention claimed is:

1. A content presentation apparatus, comprising:
  a processing unit configured to control a registration to and a readout from a database in an internal storage medium storing a first content data, to control a reproduction from an external storage medium storing a second content data, and to retrieve a content name of said first content data in response to a transmission of a retrieval key and a content name of said second content data in response to a transmission of said retrieval key; and
  a network interface that transmits said retrieval key over a network, and receives a content name of a third content data and content identification information of the third content data over said network, in response to a transmission of said retrieval key over said network, wherein the network interface transmits said retrieval key and the content identification information of the third content data over said network, wherein the network interface receives a content name of a fourth content data over said network in response to a transmission of said retrieval key and the content identification information of the third content data over said network,
  the processing unit further configured to generate a content presentation image including said content name of said first content data, said content name of said second content data, and said content name of said third content data, to detect, based on said retrieval key, said content name of said first content data, and to detect, based on said retrieval key, said content name of said second content data, the content presentation image further including said content name of said fourth content data.

2. The content presentation apparatus according to claim 1, wherein said content name of said first content data is defined by at least one of an album name or a music name.

3. The content presentation apparatus according to claim 1, wherein said retrieval key is defined by an artist name.

4. The content presentation apparatus according to claim 1, wherein said network interface receives, in response to a transmission of said retrieval key over said network, an address of said third content data on said network.

5. The content presentation apparatus according to claim 4, wherein said network interface accesses said address of said third content data on said network, when said content name of said third content data in said content presentation image is selected.

6. The content presentation apparatus according to claim 5, wherein said network interface receives a part of said third content data in a streaming format from said address.

7. The content presentation apparatus according to claim 1, wherein said external storage medium is a Mini Disk or a Compact Disc.

8. The content presentation apparatus according to claim 1, wherein said external storage medium is a hard disk.

9. A content presentation method implemented by a content presentation apparatus, the content presentation method comprising:
  controlling a registration to and a readout from a database in an internal storage medium storing a first content data;
  controlling a reproduction from an external storage medium storing a second content data;
  detecting, based on a retrieval key, a content name of said first content data;
  retrieving, with said content presentation apparatus, said content name of said first content data in response to a transmission of said retrieval key;
  detecting, based on said retrieval key, a content name of said second content data;
  retrieving, with said content presentation apparatus, said content name of said second content data in response to a transmission of said retrieval key;
  transmitting said retrieval key over a network;
  receiving, with said content presentation apparatus, a content name of a third content data and content identification information of the third content data over said network, in response to a transmission of said retrieval key over said network;
  transmitting said retrieval key and the content identification information of the third content data over said network;
  receiving, with said content presentation apparatus, a content name of a fourth content data over said network in response to a transmission of said retrieval key and the content identification information of the third content data over said network; and
  generating, with said content presentation apparatus, a content presentation image including said content name of said first content data, said content name of said second content data, said content name of said third content data, and said content name of said fourth content data.

* * * * *